United States Patent
Haribhakti et al.

(10) Patent No.: US 12,367,428 B2
(45) Date of Patent: *Jul. 22, 2025

(54) APPARATUSES, METHODS, AND COMPUTER PROGRAM PRODUCTS FOR PROGRAMMATICALLY PARSING, CLASSIFYING, AND LABELING DATA OBJECTS

(71) Applicants: ATLASSIAN PTY LTD., Sydney (AU); ATLASSIAN US, INC., San Francisco, CA (US)

(72) Inventors: Rupal Haribhakti, Cupertino, CA (US); Aaron Gentleman, San Jose, CA (US)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,656

(22) Filed: Apr. 17, 2024

(65) Prior Publication Data
US 2024/0281720 A1 Aug. 22, 2024

Related U.S. Application Data

(63) Continuation of application No. 17/138,110, filed on Dec. 30, 2020, now Pat. No. 11,989,632.

(51) Int. Cl.
*G06F 18/214* (2023.01)
*G06F 16/35* (2025.01)
(Continued)

(52) U.S. Cl.
CPC ............ *G06N 20/10* (2019.01); *G06F 16/35* (2019.01); *G06F 18/214* (2023.01);
(Continued)

(58) Field of Classification Search
CPC ....... G06N 20/10; G06F 16/35; G06F 18/214; G06F 18/217; G06F 18/2411; G06F 18/2451

See application file for complete search history.

(56) References Cited

U.S. PATENT DOCUMENTS 6,516,315 B1  2/2003  Gupta
10,542,004 B1  1/2020  Perez et al.
(Continued)

OTHER PUBLICATIONS

Classify Sensitive Data to Support Data Management Policies, https://help.salesforce.com/articleView?id=data_classification_intro.htm&type=5, [retrieved from Internet Mar. 30, 2021].
(Continued)

*Primary Examiner* — Cheyne D Ly
(74) *Attorney, Agent, or Firm* — Alston & Bird LLP

(57) ABSTRACT

Methods, apparatuses, or computer program products are disclosed providing for the dynamic data classification of data objects. Examples enable prediction of candidate data classification labels for data objects associated with one or more applications, services, or computing devices. Examples enable the assignment of one or more data classification labels to a data object for transmission to one or more computing devices. Examples enable the interactive and progressive application of machine learning techniques to data classification systems to assign data classification labels with probable certainty. Examples enable the tracking, monitoring, storage, sorting, and retrieval of labeled data objects. Examples provide for access control configuration of services to restrict or allow access to data objects based on data classifications and other service parameters.

21 Claims, 26 Drawing Sheets

(51) Int. Cl.
  *G06F 18/21*     (2023.01)
  *G06F 18/2411*   (2023.01)
  *G06F 18/2451*   (2023.01)
  *G06N 20/10*     (2019.01)

(52) U.S. Cl.
  CPC ........ *G06F 18/217* (2023.01); *G06F 18/2411* (2023.01); *G06F 18/2451* (2023.01)

(56) References Cited

U.S. PATENT DOCUMENTS

| | | |
|---|---|---|
| 10,810,472 B2 | 10/2020 | Malak et al. |
| 11,250,033 B2 | 2/2022 | Doyle |
| 11,989,632 B2 * | 5/2024 | Haribhakti ............ G06F 18/214 |
| 2010/0107225 A1 | 4/2010 | Spencer et al. |
| 2011/0162057 A1 | 6/2011 | Gottumukkala et al. |
| 2015/0200971 A1 | 7/2015 | Nishizawa et al. |
| 2017/0154269 A1 | 6/2017 | Guttmann |
| 2021/0034762 A1 | 2/2021 | Wu et al. |

OTHER PUBLICATIONS

Scalable data classification for security and privacy, https://engineering.fb.com/2020/07/21/security/data-classification-system, Jul. 21, 2020.
U.S. Appl. No. 17/138,110, filed Dec. 30, 2020, U.S. Pat. No. 11,989,632, Issued.

* cited by examiner

902 — Example output: [ [ "Company name", "UGC/Label" ], [...], [...] ]

FIG. 9A

904 — Example output: [ [ "a policy name", "UGC/Label" ], [...], [...] ]

906A →  - name: status
         in: query
908A →   description: |-
           The status of the content that the attachment is being added to.
         required: true
910 →   type: string
         enum:
           - current
           - draft 906B →  - name: comment
         in: formData
908B →   description: |-
           The comment for the attachment that is being
           added by a user. If you specify a comment, then every file must
           have a comment and the comments must be in the same order as
           the files. Alternatively, don't specify comments.
         required: false
         type: file

FIG. 9C

```
/api/admin/v1/orgs/{orgId}/policies get orgId predection: UGC/Label
/api/admin/v1/orgs/{orgId}/policies get cursor predection: UGC
/PrimaryIdentifier
/api/admin/v1/orgs/{orgId}/policies get type predection: UGC
/PrimaryIdentifier
/api/admin/v1/orgs/{orgId}/policies post orgId predection: UGC/Label
/api/admin/v1/orgs/{orgId}/policies/{policyId} get orgId predection: UGC
/Label
/api/admin/v1/orgs/{orgId}/policies/{policyId} get policyId predection:
UGC/PrimaryIdentifier
/api/admin/v1/orgs/{orgId}/policies/{policyId} put orgId predection: UGC
/Label
/api/admin/v1/orgs/{orgId}/policies/{policyId} put policyId predection:
UGC/Primary
/api/admin/v1/orgs/{orgId}/policies/{policyId} delete orgId predection:
UGC/Label
/api/admin/v1/orgs/{orgId}/policies/{policyId} delete policyId
predection: UGC/PrimaryIdentifier
/api/admin/v1/orgs/{orgId}/policies/{policyId}/resources post orgId
predection: UGC/Label
/api/admin/v1/orgs/{orgId}/policies/{policyId}/resources post policyId
predection: UGC/PrimaryIdentifier
```

```
/api/organisations/{orgId}/apiTokens/{apiTokenId} delete apiTokenId
predection: PII/DirectRestrictedIdentifier
/api/organisations/{orgId}/apiTokens/{apiTokenId} delete orgId
predection: UGC/Label
/api/organisations/{orgId}/apiTokens get scrollId predection: UGC
/PrimaryIdentifier
/api/organisations/{orgId}/apiTokens get orgId predection: UGC/Label
```

APPARATUSES, METHODS, AND COMPUTER PROGRAM PRODUCTS FOR PROGRAMMATICALLY PARSING, CLASSIFYING, AND LABELING DATA OBJECTS

CROSS REFERENCE TO RELATED APPLICATIONS

This application is a continuation of U.S. patent application Ser. No. 17/138,110, filed Dec. 30, 2020, the contents of which are hereby incorporated by reference in its entirety.

BACKGROUND

Various methods, apparatuses, and systems are configured to provide techniques for associating data classifications with data objects extracted from a data object repository. Applicant has identified many deficiencies and problems associated with existing methods, apparatuses, and systems for identification and tracking of data structures transferred amongst application programming interface pathways and stored in association with a service or application. Through applied effort, ingenuity, and innovation, these identified deficiencies and problems have been solved by developing solutions that are configured in accordance with the embodiments of the present disclosure, many examples of which are described in detail herein.

SUMMARY

According to one aspect of the present disclosure, an apparatus is provided for applying data classification labels to a data object, the apparatus comprising at least one processor and at least one memory including program code that with the at least one processor, cause the apparatus to retrieve one or more data objects from a data object repository, wherein the one or more data objects each comprise a data object identifier, an origin identifier, and one or more text based data elements. In some embodiments, the at least one memory including the program code that with the at least one processor, further cause the apparatus to parse the one or more text based data elements into a plurality of word based data elements. In some embodiments, the at least one memory including the program code that with the at least one processor, further cause the apparatus to generate a vector data object from the plurality of word based data elements, the vector data object comprising one or more vector data elements. In some embodiments, the at least one memory including the program code that with the at least one processor, further cause the apparatus to map the vector data object to a trained data classification vector data set to determine a data classification label for the vector data object. In some embodiments, the at least one memory including the program code that with the at least one processor, further cause the apparatus to update a labeled data object repository to associate the data classification label for the vector data object with the plurality of word based data elements, the data object identifier, and the origin identifier.

In some embodiments, an access control configuration is generated based on one or more predefined access parameters comprising one or more of the data object identifier, the origin identifier, one or more data classification labels, one or more service identifiers, or one or more application programming interfaces. In some embodiments, the access control configuration comprises one or more rules to instruct at least a service proxy to allow or restrict access to a labeled data object based on the one or more predefined access parameters. In some embodiments, the vector data object and the trained data classification vector data set each define a common vector data structure. In some embodiments, the vector data object and the trained data classification vector data set each define one or more common vector data elements. In some embodiments, the trained data classification vector data set is generated by training a support vector classifier with a labeled data object corpus. In some embodiments, the trained data classification vector data set is generated by training a linear support vector classifier with a labeled data object corpus. In some embodiments, the data object repository is the labeled data object repository. In some embodiments, the mapping of the vector data object to the trained data classification vector data set generates at least one candidate data classification label for the vector data object. In some embodiments, the at least one memory including the program code that with the at least one processor, further cause the apparatus to output the at least one candidate data classification label to a truth interface. In some embodiments, the at least one memory including the program code that with the at least one processor, further cause the apparatus to receive a truth selection indication in response to outputting the at least one candidate data classification label to the truth interface. In some embodiments, the at least one memory including the program code that with the at least one processor, further cause the apparatus to determine the data classification label for the vector data object based on the truth selection indication. In some embodiments, the at least one memory including the program code that with the at least one processor, further cause the apparatus to remove, from the one or more text based data elements, one or more stop word based data elements, wherein the one or more stop word based data elements comprises one or more of a period, comma, underscore, or space. In some embodiments, the at least one memory including the program code that with the at least one processor, further cause the apparatus to generate, from the plurality of word based data elements, a second plurality of word based data elements, wherein the second plurality of word based data elements comprise lower case text.

In some embodiments, the at least one memory including the program code that with the at least one processor, further cause the apparatus to determine, based on the one or more data objects, an application programming interface pathway associated with the one or more data objects. In some embodiments, the at least one memory including the program code that with the at least one processor, further cause the apparatus to generate, based on at least the vector data object and the application programming interface pathway, a second vector data object. In some embodiments, the at least one memory including the program code that with the at least one processor, further cause the apparatus to map the second vector data object to a second trained data classification vector data set to determine at least a second data classification label for the vector data object. In some embodiments, a respective data classification label comprises one or more classifications of user generated content, personally identifiable information, usage related data, security related data, specific related data, or commerce related data. In some embodiments, the respective data classification label further comprises one or more sub-classifications associated with user generated content, personally identifiable information, usage related data, security related data, specific related data, or commerce related data. In some embodiments, the at least one memory including the program code that with the at least one processor, further cause the apparatus to determine an amount of commonality between the plurality of word based data elements of the vector data object and one or more descriptive terms mapped to the data classification label for the vector data object. In some embodiments, the at least one memory including the program code that with the at least one processor, further cause the apparatus to determine a data classification label accuracy score based on at least the amount of commonality.

In some embodiments, the at least one memory including the program code that with the at least one processor, further cause the apparatus to retrieve a data classification label accuracy score threshold from a data object repository. In some embodiments, the at least one memory including the program code that with the at least one processor, further cause the apparatus to determine that the data classification label accuracy score is less than the data classification label accuracy score threshold. In some embodiments, the at least one memory including the program code that with the at least one processor, further cause the apparatus to in response map the vector data object to another trained data classification vector data set to determine another data classification label for the vector data object.

According to another aspect of the present disclosure, a non-transitory computer readable storage medium comprising instructions is provided for applying data classification labels to a data object, when executed by a processor, cause an apparatus comprising at least one processor and at least one memory to retrieve one or more data objects from a data object repository, wherein the one or more data objects each comprise a data object identifier, an origin identifier, and one or more text based data elements. In some embodiments, the non-transitory computer readable storage medium further comprises instructions that when executed by the processor, further causes the apparatus comprising the at least one processor and the at least one memory to parse the one or more text based data elements into a plurality of word based data elements. In some embodiments, the non-transitory computer readable storage medium further comprises instructions that when executed by the processor, further causes the apparatus comprising the at least one processor and the at least one memory to generate a vector data object from the plurality of word based data elements, the vector data object comprising one or more vector data elements. In some embodiments, the non-transitory computer readable storage medium further comprises instructions that when executed by the processor, further causes the apparatus comprising the at least one processor and the at least one memory to map the vector data object to a trained data classification vector data set to determine a data classification label for the vector data object. In some embodiments, the non-transitory computer readable storage medium further comprises instructions that when executed by the processor, further causes the apparatus comprising the at least one processor and the at least one memory to update a labeled data object repository to associate the data classification label for the vector data object with the plurality of word based data elements, the data object identifier, and the origin identifier.

In some embodiments, an access control configuration is generated based on one or more predefined access parameters comprising one or more of the data object identifier, the origin identifier, one or more data classification labels, one or more service identifiers, or one or more application programming interfaces. In some embodiments, the access control configuration comprises one or more rules to instruct at least a service proxy to allow or restrict access to a labeled data object based on the one or more predefined access parameters. In some embodiments, the vector data object and the trained data classification vector data set each define a common vector data structure. In some embodiments, the vector data object and the trained data classification vector data set each define one or more common vector data elements. In some embodiments, the trained data classification vector data set is generated by training a support vector classifier with a labeled data object corpus. In some embodiments, the trained data classification vector data set is generated by training a linear support vector classifier with a labeled data object corpus. In some embodiments, the data object repository is the labeled data object repository. In some embodiments, the mapping of the vector data object to the trained data classification vector data set generates at least one candidate data classification label for the vector data object. In some embodiments, the non-transitory computer readable storage medium further comprises instructions that when executed by the processor, further causes the apparatus comprising the at least one processor and the at least one memory to output the at least one candidate data classification label to a truth interface. In some embodiments, the non-transitory computer readable storage medium further comprises instructions that when executed by the processor, further causes the apparatus comprising the at least one processor and the at least one memory to receive a truth selection indication in response to outputting the at least one candidate data classification label to the truth interface. In some embodiments, the non-transitory computer readable storage medium further comprises instructions that when executed by the processor, further causes the apparatus comprising the at least one processor and the at least one memory to determine the data classification label for the vector data object based on the truth selection indication. In some embodiments, the non-transitory computer readable storage medium further comprises instructions that when executed by the processor, further causes the apparatus comprising the at least one processor and the at least one memory to remove, from the one or more text based data elements, one or more stop word based data elements, wherein the one or more stop word based data elements comprises one or more of a period, comma, underscore, or space. In some embodiments, the non-transitory computer readable storage medium further comprises instructions that when executed by the processor, further causes the apparatus comprising the at least one processor and the at least one memory to generate, from the plurality of word based data elements, a second plurality of word based data elements, wherein the second plurality of word based data elements comprise lower case text.

In some embodiments, the non-transitory computer readable storage medium further comprises instructions that when executed by the processor, further causes the apparatus comprising the at least one processor and the at least one memory to determine, based on the one or more data objects, an application programming interface pathway associated with the one or more data objects. In some embodiments, the non-transitory computer readable storage medium further comprises instructions that when executed by the processor, further causes the apparatus comprising the at least one processor and the at least one memory to generate, based on at least the vector data object and the application programming interface pathway, a second vector data object. In some embodiments, the non-transitory computer readable storage medium further comprises instructions that when executed by the processor, further causes the apparatus comprising the at least one processor and the at least one memory to map the second vector data object to a second trained data classification vector data set to determine at least a second data classification label for the vector data object. In some embodiments, a respective data classification label comprises one or more classifications of user generated content, personally identifiable information, usage related data, security related data, specific related data, or commerce related data. In some embodiments, the respective data classification label further comprises one or more sub-classifications associated with user generated content, personally identifiable information, usage related data, security related data, specific related data, or commerce related data. In some embodiments, the non-transitory computer readable storage medium further comprises instructions that when executed by the processor, further causes the apparatus comprising the at least one processor and the at least one memory to determine an amount of commonality between the plurality of word based data elements of the vector data object and one or more descriptive terms mapped to the data classification label for the vector data object. In some embodiments, the non-transitory computer readable storage medium further comprises instructions that when executed by the processor, further causes the apparatus comprising the at least one processor and the at least one memory to determine a data classification label accuracy score based on at least the amount of commonality.

In some embodiments, the non-transitory computer readable storage medium further comprises instructions that when executed by the processor, further causes the apparatus comprising the at least one processor and the at least one memory to retrieve a data classification label accuracy score threshold from a data object repository. In some embodiments, the non-transitory computer readable storage medium further comprises instructions that when executed by the processor, further causes the apparatus comprising the at least one processor and the at least one memory to determine that the data classification label accuracy score is less than the data classification label accuracy score threshold. In some embodiments, the non-transitory computer readable storage medium further comprises instructions that when executed by the processor, further causes the apparatus comprising the at least one processor and the at least one memory to in response map the vector data object to another trained data classification vector data set to determine another data classification label for the vector data object.

According to another aspect of the present disclosure, a computer implemented method is provided for applying data classification labels to a data object, comprising retrieving one or more data objects from a data object repository, wherein the one or more data objects each comprise a data object identifier, an origin identifier, and one or more text based data elements. In some embodiments, the computer implemented method further comprises parsing the one or more text based data elements into a plurality of word based data elements. In some embodiments, the computer implemented method further comprises generating a vector data object from the plurality of word based data elements, the vector data object comprising one or more vector data elements. In some embodiments, the computer implemented method further comprises mapping the vector data object to a trained data classification vector data set to determine a data classification label for the vector data object. In some embodiments, the computer implemented method further comprises updating a labeled data object repository to associate the data classification label for the vector data object with the plurality of word based data elements, the data object identifier, and the origin identifier.

In some embodiments, an access control configuration is generated based on one or more predefined access parameters comprising one or more of the data object identifier, the origin identifier, one or more data classification labels, one or more service identifiers, or one or more application programming interfaces. In some embodiments, the access control configuration comprises one or more rules to instruct at least a service proxy to allow or restrict access to a labeled data object based on the one or more predefined access parameters. In some embodiments, the vector data object and the trained data classification vector data set each define a common vector data structure. In some embodiments, the vector data object and the trained data classification vector data set each define one or more common vector data elements. In some embodiments, the trained data classification vector data set is generated by training a support vector classifier with a labeled data object corpus. In some embodiments, the trained data classification vector data set is generated by training a linear support vector classifier with a labeled data object corpus. In some embodiments, the data object repository is the labeled data object repository. In some embodiments, the mapping of the vector data object to the trained data classification vector data set generates at least one candidate data classification label for the vector data object. In some embodiments, the computer implemented method further comprises outputting the at least one candidate data classification label to a truth interface. In some embodiments, the computer implemented method further comprises receiving a truth selection indication in response to outputting the at least one candidate data classification label to the truth interface. In some embodiments, the computer implemented method further comprises determining the data classification label for the vector data object based on the truth selection indication. In some embodiments, the computer implemented method further comprises removing, from the one or more text based data elements, one or more stop word based data elements, wherein the one or more stop word based data elements comprises one or more of a period, comma, underscore, or space. In some embodiments, the computer implemented method further comprises generating, from the plurality of word based data elements, a second plurality of word based data elements, wherein the second plurality of word based data elements comprise lower case text.

In some embodiments, the computer implemented method further comprises determining, based on the one or more data objects, an application programming interface pathway associated with the one or more data objects. In some embodiments, the computer implemented method further comprises generating, based on at least the vector data object and the application programming interface pathway, a second vector data object. In some embodiments, the computer implemented method further comprises mapping the second vector data object to a second trained data classification vector data set to determine at least a second data classification label for the vector data object. In some embodiments, a respective data classification label comprises one or more classifications of user generated content, personally identifiable information, usage related data, security related data, specific related data, or commerce related data. In some embodiments, the respective data classification label further comprises one or more sub-classifications associated with user generated content, personally identifiable information, usage related data, security related data, specific related data, or commerce related data. In some embodiments, the computer implemented method further comprises determining an amount of commonality between the plurality of word based data elements of the vector data object and one or more descriptive terms mapped to the data classification label for the vector data object. In some embodiments, the computer implemented method further comprises determining a data classification label accuracy score based on at least the amount of commonality.

In some embodiments, the computer implemented method further comprises retrieving a data classification label accuracy score threshold from a data object repository. In some embodiments, the computer implemented method further comprises determining that the data classification label accuracy score is less than the data classification label accuracy score threshold. In some embodiments, the computer implemented method further comprises in response mapping the vector data object to another trained data classification vector data set to determine another data classification label for the vector data object.

According to another aspect of the present disclosure, an apparatus is provided for detection of data object classification label errors, the apparatus comprising at least one processor and at least one memory including program code that with the at least one processor, cause the apparatus to retrieve a labeled data object from a data object repository, wherein the labeled data object comprises a data object identifier, an origin identifier, one or more text based data elements, and a first data classification label set. In some embodiments, the at least one memory including the program code that with the at least one processor, further cause the apparatus to parse the one or more text based data elements into a plurality of word based data elements. In some embodiments, the at least one memory including the program code that with the at least one processor, further cause the apparatus to generate a vector data object from the plurality of word based data elements, the vector data object comprising one or more vector data elements. In some embodiments, the at least one memory including the program code that with the at least one processor, further cause the apparatus to map the vector data object to a trained data classification vector data set to determine a second data classification label set for the vector data object. In some embodiments, the at least one memory including the program code that with the at least one processor, further cause the apparatus to determine at least one missing data classification label defined by the second data classification label set and not defined by the first data classification label set. In some embodiments, the at least one memory including the program code that with the at least one processor, further cause the apparatus to generate a data classification label error notification based on the at least one missing data classification label, wherein the data classification label error notification comprises the data object identifier, the origin identifier, and the at least one missing data classification label.

In some embodiments, the at least one memory including the program code that with the at least one processor, further cause the apparatus to transmit the data classification label error notification to one or more computing devices, wherein the data classification label error notification is renderable via one or more display devices associated with the one or more computing devices. In some embodiments, the at least one memory including the program code that with the at least one processor, further cause the apparatus to output the at least one missing data classification label to a truth interface. In some embodiments, the at least one memory including the program code that with the at least one processor, further cause the apparatus to receive a truth selection indication in response to outputting the at least one missing data classification label to the truth interface. In some embodiments, the at least one memory including the program code that with the at least one processor, further cause the apparatus to determine to update a labeled data object repository to associate the at least one missing data classification label for the vector data object with the plurality of word based data elements, the data object identifier, and the origin identifier.

In some embodiments, the data object repository is the labeled data object repository. In some embodiments, the data classification label error notification comprises a descriptive text message. In some embodiments, the vector data object and the trained data classification vector data set each define a common vector data structure. In some embodiments, the vector data object and the trained data classification vector data set each define one or more common vector data elements. In some embodiments, the trained data classification vector data set is generated by training a support vector classifier with a labeled data object corpus. In some embodiments, the trained data classification vector data set is generated by training a linear support vector classifier with a labeled data object corpus.

According to another aspect of the present disclosure, a non-transitory computer readable storage medium comprising instructions is provided for detection of data object classification label errors, when executed by a processor, cause an apparatus comprising at least one processor and at least one memory to retrieve a labeled data object from a data object repository, wherein the labeled data object comprises a data object identifier, an origin identifier, one or more text based data elements, and a first data classification label set. In some embodiments, the non-transitory computer readable storage medium further comprises instructions that when executed by the processor, further causes the apparatus comprising the at least one processor and the at least one memory to parse the one or more text based data elements into a plurality of word based data elements. In some embodiments, the non-transitory computer readable storage medium further comprises instructions that when executed by the processor, further causes the apparatus comprising the at least one processor and the at least one memory to generate a vector data object from the plurality of word based data elements, the vector data object comprising one or more vector data elements. In some embodiments, the non-transitory computer readable storage medium further comprises instructions that when executed by the processor, further causes the apparatus comprising the at least one processor and the at least one memory to map the vector data object to a trained data classification vector data set to determine a second data classification label set for the vector data object. In some embodiments, the non-transitory computer readable storage medium further comprises instructions that when executed by the processor, further causes the apparatus comprising the at least one processor and the at least one memory to determine at least one missing data classification label defined by the second data classification label set and not defined by the first data classification label set. In some embodiments, the non-transitory computer readable storage medium further comprises instructions that when executed by the processor, further causes the apparatus comprising the at least one processor and the at least one memory to generate a data classification label error notification based on the at least one missing data classification label, wherein the data classification label error notification comprises the data object identifier, the origin identifier, and the at least one missing data classification label.

In some embodiments, the non-transitory computer readable storage medium further comprises instructions that when executed by the processor, further causes the apparatus comprising the at least one processor and the at least one memory to transmit the data classification label error notification to one or more computing devices, wherein the data classification label error notification is renderable via one or more display devices associated with the one or more computing devices.

In some embodiments, the non-transitory computer readable storage medium further comprises instructions that when executed by the processor, further causes the apparatus comprising the at least one processor and the at least one memory to output the at least one missing data classification label to a truth interface. In some embodiments, the non-transitory computer readable storage medium further comprises instructions that when executed by the processor, further causes the apparatus comprising the at least one processor and the at least one memory to receive a truth selection indication in response to outputting the at least one missing data classification label to the truth interface. In some embodiments, the non-transitory computer readable storage medium further comprises instructions that when executed by the processor, further causes the apparatus comprising the at least one processor and the at least one memory to determine to update a labeled data object repository to associate the at least one missing data classification label for the vector data object with the plurality of word based data elements, the data object identifier, and the origin identifier.

In some embodiments, the data object repository is the labeled data object repository. In some embodiments, the data classification label error notification comprises a descriptive text message. In some embodiments, the vector data object and the trained data classification vector data set each define a common vector data structure. In some embodiments, the vector data object and the trained data classification vector data set each define one or more common vector data elements. In some embodiments, the trained data classification vector data set is generated by training a support vector classifier with a labeled data object corpus. In some embodiments, the trained data classification vector data set is generated by training a linear support vector classifier with a labeled data object corpus.

According to another aspect of the present disclosure, a computer implemented method is provided for detection of data object classification label errors, comprising retrieving a labeled data object from a data object repository, wherein the labeled data object comprises a data object identifier, an origin identifier, one or more text based data elements, and a first data classification label set. In some embodiments, the computer implemented method further comprises parsing the one or more text based data elements into a plurality of word based data elements. In some embodiments, the computer implemented method further comprises generating a vector data object from the plurality of word based data elements, the vector data object comprising one or more vector data elements. In some embodiments, the computer implemented method further comprises mapping the vector data object to a trained data classification vector data set to determine a second data classification label set for the vector data object. In some embodiments, the computer implemented method further comprises determining at least one missing data classification label defined by the second data classification label set and not defined by the first data classification label set. In some embodiments, the computer implemented method further comprises generating a data classification label error notification based on the at least one missing data classification label, wherein the data classification label error notification comprises the data object identifier, the origin identifier, and the at least one missing data classification label.

In some embodiments, the computer implemented method further comprises transmitting the data classification label error notification to one or more computing devices, wherein the data classification label error notification is renderable via one or more display devices associated with the one or more computing devices.

In some embodiments, the computer implemented method further comprises outputting the at least one missing data classification label to a truth interface. In some embodiments, the computer implemented method further comprises receiving a truth selection indication in response to outputting the at least one missing data classification label to the truth interface. In some embodiments, the computer implemented method further comprises determining to update a labeled data object repository to associate the at least one missing data classification label for the vector data object with the plurality of word based data elements, the data object identifier, and the origin identifier.

In some embodiments, the data object repository is the labeled data object repository. In some embodiments, the data classification label error notification comprises a descriptive text message. In some embodiments, the vector data object and the trained data classification vector data set each define a common vector data structure. In some embodiments, the vector data object and the trained data classification vector data set each define one or more common vector data elements. In some embodiments, the trained data classification vector data set is generated by training a support vector classifier with a labeled data object corpus. In some embodiments, the trained data classification vector data set is generated by training a linear support vector classifier with a labeled data object corpus.

According to another aspect of the present disclosure, an apparatus is provided for generating notifications based on data object distribution events, the apparatus comprising at least one processor and at least one memory including program code that with the at least one processor, cause the apparatus to receive an interaction input from a computing device, wherein the interaction input defines at least a data object identifier and an application programming interface pathway. In some embodiments, the at least one memory including the program code that with the at least one processor, further cause the apparatus to retrieve a labeled data object from a data object repository based on the data object identifier, wherein the labeled data object comprises the data object identifier and a data classification label set. In some embodiments, the at least one memory including the program code that with the at least one processor, further cause the apparatus to determine a target recipient identifier for the labeled data object based on the application programming interface pathway, wherein the target recipient identifier is one or more of a computing device, a service, an application, or a data object repository. In some embodiments, the at least one memory including the program code that with the at least one processor, further cause the apparatus to generate a data classification label restricted usage notification based on the data classification label set for the labeled data object and the target recipient identifier, wherein the data classification label restricted usage notification comprises the data object identifier, at least one data classification label of the data classification label set, and the target recipient identifier.

In some embodiments, the at least one memory including the program code that with the at least one processor, further cause the apparatus to transmit the data classification label restricted usage notification to one or more computing devices, wherein the data classification label restricted usage notification is renderable via one or more display devices associated with the one or more computing devices.

In some embodiments, the at least one memory including the program code that with the at least one processor, further cause the apparatus to output at least the data object identifier and the target recipient identifier to a permission interface. In some embodiments, the at least one memory including the program code that with the at least one processor, further cause the apparatus to receive a permission selection indication in response to outputting at least the data object identifier and the target recipient identifier to the permission interface. In some embodiments, the at least one memory including the program code that with the at least one processor, further cause the apparatus to determine to restrict accessibility to the labeled data object associated with the data object identifier by a target recipient associated with the target recipient identifier based on the permission selection indication. In some embodiments, the at least one data classification label of the data classification label set is associated with personally identifiable information or security related data.

According to another aspect of the present disclosure, a non-transitory computer readable storage medium comprising instructions is provided for generating notifications based on data object distribution events, when executed by a processor, cause an apparatus comprising at least one processor and at least one memory to receive an interaction input from a computing device, wherein the interaction input defines at least a data object identifier and an application programming interface pathway. In some embodiments, the non-transitory computer readable storage medium further comprises instructions that when executed by the processor, further causes the apparatus comprising the at least one processor and the at least one memory to retrieve a labeled data object from a data object repository based on the data object identifier, wherein the labeled data object comprises the data object identifier and a data classification label set. In some embodiments, the non-transitory computer readable storage medium further comprises instructions that when executed by the processor, further causes the apparatus comprising the at least one processor and the at least one memory to determine a target recipient identifier for the labeled data object based on the application programming interface pathway, wherein the target recipient identifier is one or more of a computing device, a service, an application, or a data object repository. In some embodiments, the non-transitory computer readable storage medium further comprises instructions that when executed by the processor, further causes the apparatus comprising the at least one processor and the at least one memory to generate a data classification label restricted usage notification based on the data classification label set for the labeled data object and the target recipient identifier, wherein the data classification label restricted usage notification comprises the data object identifier, at least one data classification label of the data classification label set, and the target recipient identifier.

In some embodiments, the non-transitory computer readable storage medium further comprises instructions that when executed by the processor, further causes the apparatus comprising the at least one processor and the at least one memory to transmit the data classification label restricted usage notification to one or more computing devices, wherein the data classification label restricted usage notification is renderable via one or more display devices associated with the one or more computing devices.

In some embodiments, the non-transitory computer readable storage medium further comprises instructions that when executed by the processor, further causes the apparatus comprising the at least one processor and the at least one memory to output at least the data object identifier and the target recipient identifier to a permission interface. In some embodiments, the non-transitory computer readable storage medium further comprises instructions that when executed by the processor, further causes the apparatus comprising the at least one processor and the at least one memory to receive a permission selection indication in response to outputting at least the data object identifier and the target recipient identifier to the permission interface. In some embodiments, the non-transitory computer readable storage medium further comprises instructions that when executed by the processor, further causes the apparatus comprising the at least one processor and the at least one memory to determine to restrict accessibility to the labeled data object associated with the data object identifier by a target recipient associated with the target recipient identifier based on the permission selection indication. In some embodiments, the at least one data classification label of the data classification label set is associated with personally identifiable information or security related data.

According to another aspect of the present disclosure, a computer implemented method is provided for generating notifications based on data object distribution events, comprising receiving an interaction input from a computing device, wherein the interaction input defines at least a data object identifier and an application programming interface pathway. In some embodiments, the computer implemented method further comprises retrieving a labeled data object from a data object repository based on the data object identifier, wherein the labeled data object comprises the data object identifier and a data classification label set. In some embodiments, the computer implemented method further comprises determining a target recipient identifier for the labeled data object based on the application programming interface pathway, wherein the target recipient identifier is one or more of a computing device, a service, an application, or a data object repository. In some embodiments, the computer implemented method further comprises generating a data classification label restricted usage notification based on the data classification label set for the labeled data object and the target recipient identifier, wherein the data classification label restricted usage notification comprises the data object identifier, at least one data classification label of the data classification label set, and the target recipient identifier.

In some embodiments, the computer implemented method further comprises transmitting the data classification label restricted usage notification to one or more computing devices, wherein the data classification label restricted usage notification is renderable via one or more display devices associated with the one or more computing devices.

In some embodiments, the computer implemented method further comprises outputting at least the data object identifier and the target recipient identifier to a permission interface. In some embodiments, the computer implemented method further comprises receiving a permission selection indication in response to outputting at least the data object identifier and the target recipient identifier to the permission interface. In some embodiments, the computer implemented method further comprises determining to restrict accessibility to the labeled data object associated with the data object identifier by a target recipient associated with the target recipient identifier based on the permission selection indication. In some embodiments, the at least one data classification label of the data classification label set is associated with personally identifiable information or security related data.

According to another aspect of the present disclosure, an apparatus is provided for data object request authorization, the apparatus comprising at least one processor and at least one memory including program code that with the at least one processor, cause the apparatus to receive a validation request interaction input from a first computing device, wherein the validation request interaction input defines at least a data object identifier, a first service identifier, and a second service identifier. In some embodiments, the at least one memory including the program code that with the at least one processor, further cause the apparatus to retrieve an access control configuration from a second computing device. In some embodiments, the at least one memory including the program code that with the at least one processor, further cause the apparatus to determine a data object based on the data object identifier, wherein the data object is associated with one or more data classification labels. In some embodiments, the at least one memory including the program code that with the at least one processor, further cause the apparatus to determine a first service based on the first service identifier. In some embodiments, the at least one memory including the program code that with the at least one processor, further cause the apparatus to determine a second service based on the second service identifier. In some embodiments, the at least one memory including the program code that with the at least one processor, further cause the apparatus to determine that the first service is authorized to communicate with the second service based on at least the access control configuration. In some embodiments, the at least one memory including the program code that with the at least one processor, further cause the apparatus to determine that the data object is authorized for transmission to the second service based on at least the one or more data classification labels.

In some embodiments, the at least one memory including the program code that with the at least one processor, further cause the apparatus to output at least the data object identifier and a target recipient identifier to a permission interface. In some embodiments, the at least one memory including the program code that with the at least one processor, further cause the apparatus to receive a permission selection indication in response to outputting at least the data object identifier and the target recipient identifier to the permission interface. In some embodiments, the at least one memory including the program code that with the at least one processor, further cause the apparatus to determine to restrict accessibility to a labeled data object associated with the data object identifier by a target recipient associated with the target recipient identifier based on the permission selection indication.

In some embodiments, the at least one memory including the program code that with the at least one processor, further cause the apparatus to determine a first application programming interface based on the first service identifier. In some embodiments, the at least one memory including the program code that with the at least one processor, further cause the apparatus to determine a second application programming interface based on the second service identifier. In some embodiments, the at least one memory including the program code that with the at least one processor, further cause the apparatus to determine that the first application programming interface is authorized to communicate with the second application programming interface based on at least the access control configuration.

In some embodiments, the access control configuration is generated based on one or more predefined access parameters comprising one or more of the data object identifier, an origin identifier, the one or more data classification labels, one or more service identifiers, or one or more application programming interfaces. In some embodiments, the access control configuration comprises one or more rules to instruct at least a service proxy to allow or restrict access to a labeled data object based on the one or more predefined access parameters. In some embodiments, the validation request interaction input further defines a request to transmit the data object of the data object identifier from the first service of the first service identifier to the second service of the second service identifier.

In some embodiments, the at least one memory including the program code that with the at least one processor, further cause the apparatus to approve the request to transmit the data object. In some embodiments, the at least one memory including the program code that with the at least one processor, further cause the apparatus to transmit the data object from the first service to the second service via a communication interface, wherein the communication interface is between a first service proxy of the first service and a second service proxy of the second service.

According to another aspect of the present disclosure, a non-transitory computer readable storage medium comprising instructions is provided for data object request authorization, when executed by a processor, cause an apparatus comprising at least one processor and at least one memory to receive a validation request interaction input from a first computing device, wherein the validation request interaction input defines at least a data object identifier, a first service identifier, and a second service identifier. In some embodiments, the non-transitory computer readable storage medium further comprises instructions that when executed by the processor, further causes the apparatus comprising the at least one processor and the at least one memory to retrieve an access control configuration from a second computing device. In some embodiments, the non-transitory computer readable storage medium further comprises instructions that when executed by the processor, further causes the apparatus comprising the at least one processor and the at least one memory to determine a data object based on the data object identifier, wherein the data object is associated with one or more data classification labels. In some embodiments, the non-transitory computer readable storage medium further comprises instructions that when executed by the processor, further causes the apparatus comprising the at least one processor and the at least one memory to determine a first service based on the first service identifier. In some embodiments, the non-transitory computer readable storage medium further comprises instructions that when executed by the processor, further causes the apparatus comprising the at least one processor and the at least one memory to determine a second service based on the second service identifier. In some embodiments, the non-transitory computer readable storage medium further comprises instructions that when executed by the processor, further causes the apparatus comprising the at least one processor and the at least one memory to determine that the first service is authorized to communicate with the second service based on at least the access control configuration. In some embodiments, the non-transitory computer readable storage medium further comprises instructions that when executed by the processor, further causes the apparatus comprising the at least one processor and the at least one memory to determine that the data object is authorized for transmission to the second service based on at least the one or more data classification labels.

In some embodiments, the non-transitory computer readable storage medium further comprises instructions that when executed by the processor, further causes the apparatus comprising the at least one processor and the at least one memory to output at least the data object identifier and a target recipient identifier to a permission interface. In some embodiments, the non-transitory computer readable storage medium further comprises instructions that when executed by the processor, further causes the apparatus comprising the at least one processor and the at least one memory to receive a permission selection indication in response to outputting at least the data object identifier and the target recipient identifier to the permission interface. In some embodiments, the non-transitory computer readable storage medium further comprises instructions that when executed by the processor, further causes the apparatus comprising the at least one processor and the at least one memory to determine to restrict accessibility to a labeled data object associated with the data object identifier by a target recipient associated with the target recipient identifier based on the permission selection indication.

In some embodiments, the non-transitory computer readable storage medium further comprises instructions that when executed by the processor, further causes the apparatus comprising the at least one processor and the at least one memory to determine a first application programming interface based on the first service identifier. In some embodiments, the non-transitory computer readable storage medium further comprises instructions that when executed by the processor, further causes the apparatus comprising the at least one processor and the at least one memory to determine a second application programming interface based on the second service identifier. In some embodiments, the non-transitory computer readable storage medium further comprises instructions that when executed by the processor, further causes the apparatus comprising the at least one processor and the at least one memory to determine that the first application programming interface is authorized to communicate with the second application programming interface based on at least the access control configuration.

In some embodiments, the access control configuration is generated based on one or more predefined access parameters comprising one or more of the data object identifier, an origin identifier, the one or more data classification labels, one or more service identifiers, or one or more application programming interfaces. In some embodiments, the access control configuration comprises one or more rules to instruct at least a service proxy to allow or restrict access to a labeled data object based on the one or more predefined access parameters. In some embodiments, the validation request interaction input further defines a request to transmit the data object of the data object identifier from the first service of the first service identifier to the second service of the second service identifier.

In some embodiments, the non-transitory computer readable storage medium further comprises instructions that when executed by the processor, further causes the apparatus comprising the at least one processor and the at least one memory to approve the request to transmit the data object.

In some embodiments, the non-transitory computer readable storage medium further comprises instructions that when executed by the processor, further causes the apparatus comprising the at least one processor and the at least one memory to transmit the data object from the first service to the second service via a communication interface, wherein the communication interface is between a first service proxy of the first service and a second service proxy of the second service.

According to another aspect of the present disclosure, a computer implemented method is provided for data object request authorization, when executed by a processor, comprising receiving a validation request interaction input from a first computing device, wherein the validation request interaction input defines at least a data object identifier, a first service identifier, and a second service identifier. In some embodiments, the computer implemented method further comprises retrieving an access control configuration from a second computing device. In some embodiments, the computer implemented method further comprises determining a data object based on the data object identifier, wherein the data object is associated with one or more data classification labels. In some embodiments, the computer implemented method further comprises determining a first service based on the first service identifier. In some embodiments, the computer implemented method further comprises determining a second service based on the second service identifier. In some embodiments, the computer implemented method further comprises determining that the first service is authorized to communicate with the second service based on at least the access control configuration. In some embodiments, the computer implemented method further comprises determining that the data object is authorized for transmission to the second service based on at least the one or more data classification labels.

In some embodiments, the computer implemented method further comprises outputting at least the data object identifier and a target recipient identifier to a permission interface. In some embodiments, the computer implemented method further comprises receiving a permission selection indication in response to outputting at least the data object identifier and the target recipient identifier to the permission interface. In some embodiments, the computer implemented method further comprises determining to restrict accessibility to a labeled data object associated with the data object identifier by a target recipient associated with the target recipient identifier based on the permission selection indication.

In some embodiments, the computer implemented method further comprises determining a first application programming interface based on the first service identifier. In some embodiments, the computer implemented method further comprises determining a second application programming interface based on the second service identifier. In some embodiments, the computer implemented method further comprises determining that the first application programming interface is authorized to communicate with the second application programming interface based on at least the access control configuration.

In some embodiments, the access control configuration is generated based on one or more predefined access parameters comprising one or more of the data object identifier, an origin identifier, the one or more data classification labels, one or more service identifiers, or one or more application programming interfaces. In some embodiments, the access control configuration comprises one or more rules to instruct at least a service proxy to allow or restrict access to a labeled data object based on the one or more predefined access parameters. In some embodiments, the validation request interaction input further defines a request to transmit the data object of the data object identifier from the first service of the first service identifier to the second service of the second service identifier.

In some embodiments, the computer implemented method further comprises approving the request to transmit the data object. In some embodiments, the computer implemented method further comprises transmitting the data object from the first service to the second service via a communication interface, wherein the communication interface is between a first service proxy of the first service and a second service proxy of the second service.

Various other aspects are also described in the following detailed description and in the attached claims.

BRIEF DESCRIPTION OF THE DRAWINGS

Figure 1:
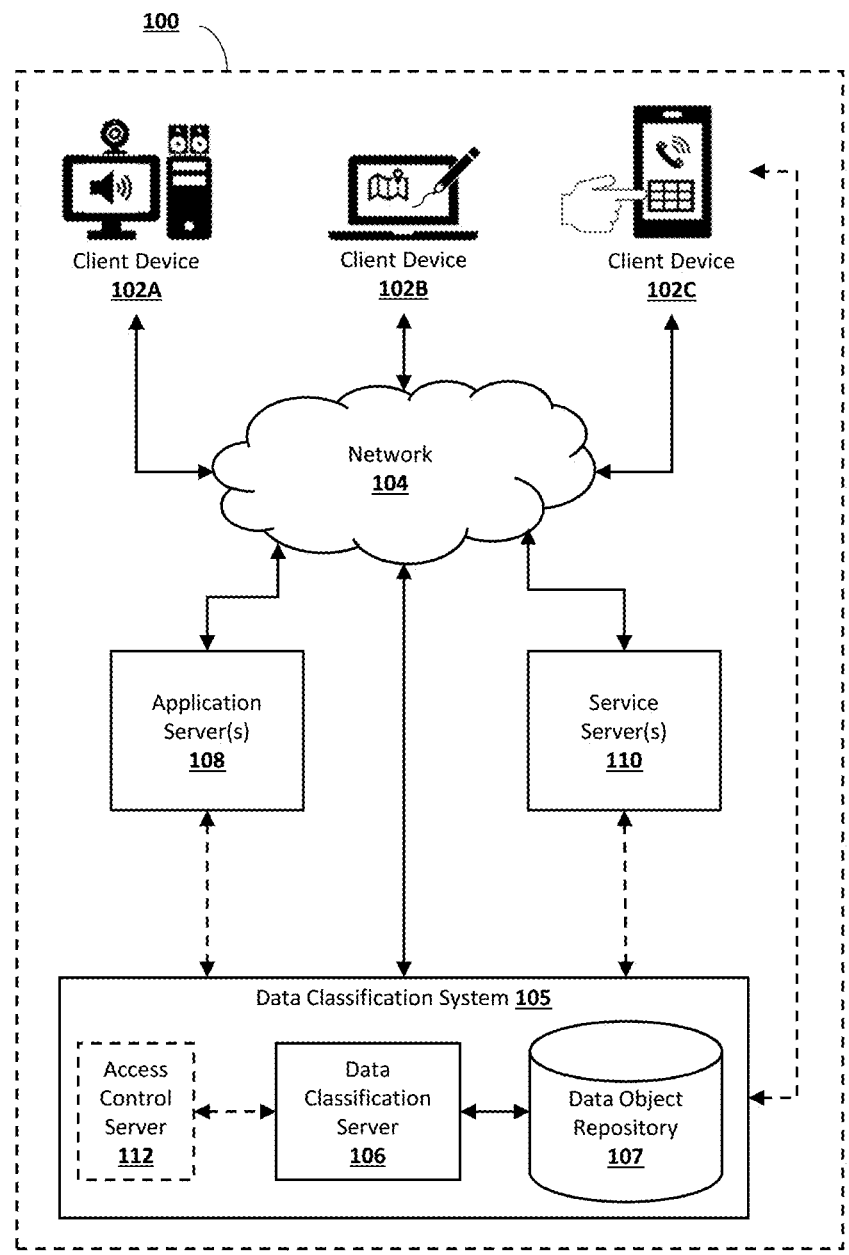

Having thus described some embodiments in general terms, references will now be made to the accompanying drawings, which are not drawn to scale, and wherein:

FIG. 1 is a block diagram of an example data classification system within which at least some embodiments of the present disclosure may operate.

Figure 2:
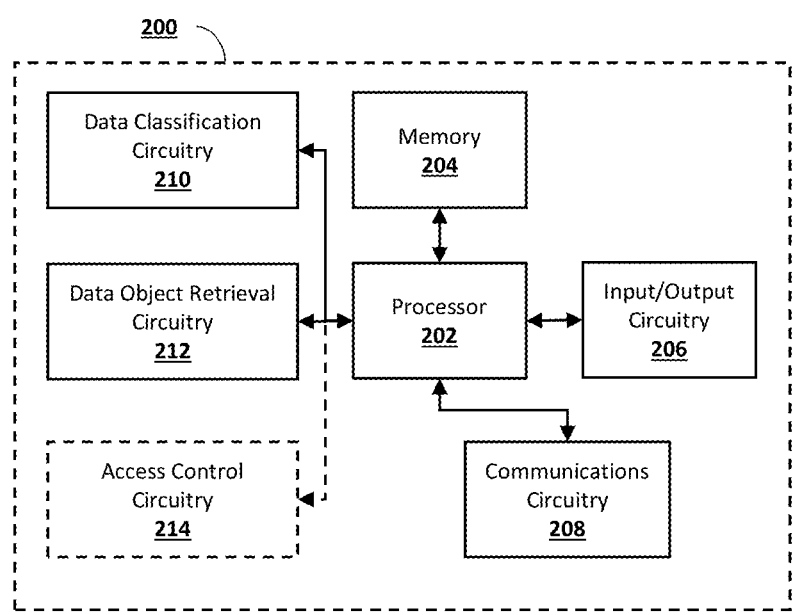

FIG. 2 is a block diagram of an example data classification system apparatus configured in accordance with at least some embodiments of the present disclosure.

Figure 3:
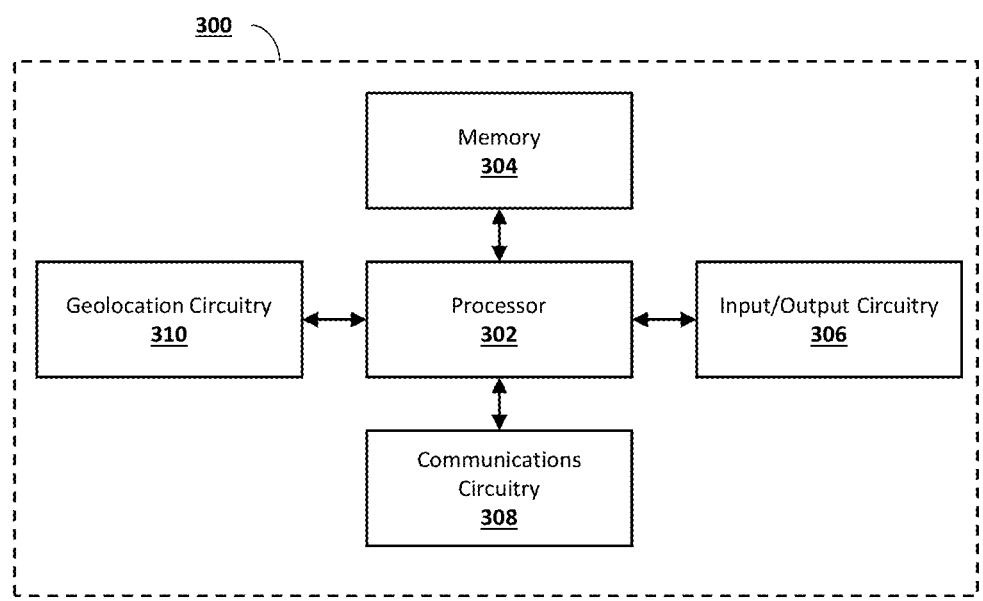

FIG. 3 is a block diagram of an example computing device configured in accordance with at least some embodiments of the present disclosure.

Figure 4:
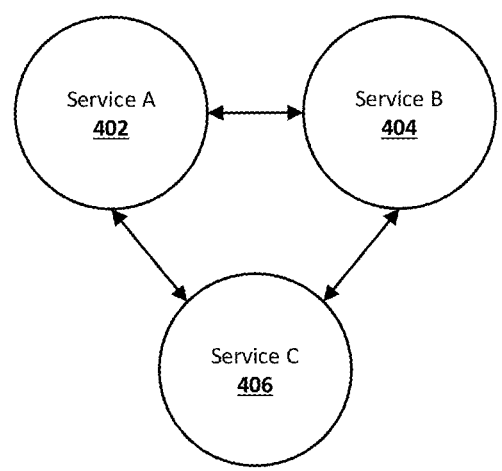

FIG. 4 is a block diagram of example services in accordance with at least some embodiments of the present disclosure.

Figure 5:
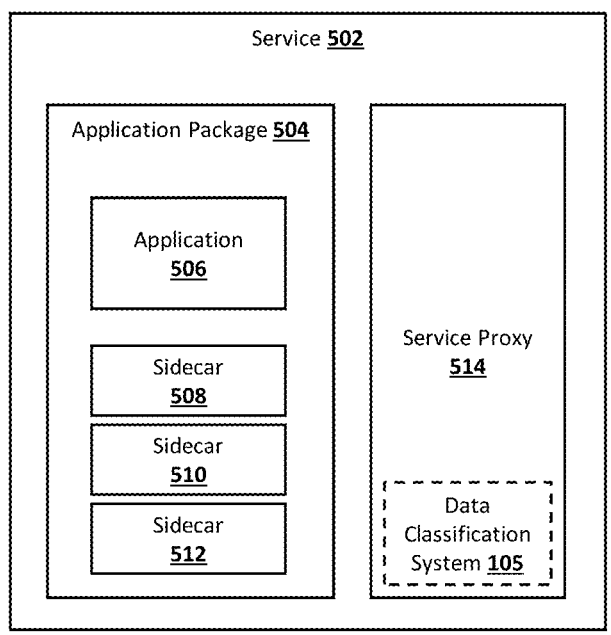

FIG. 5 is a block diagram of an example service architecture in accordance with at least some embodiments of the present disclosure.

Figure 6A:
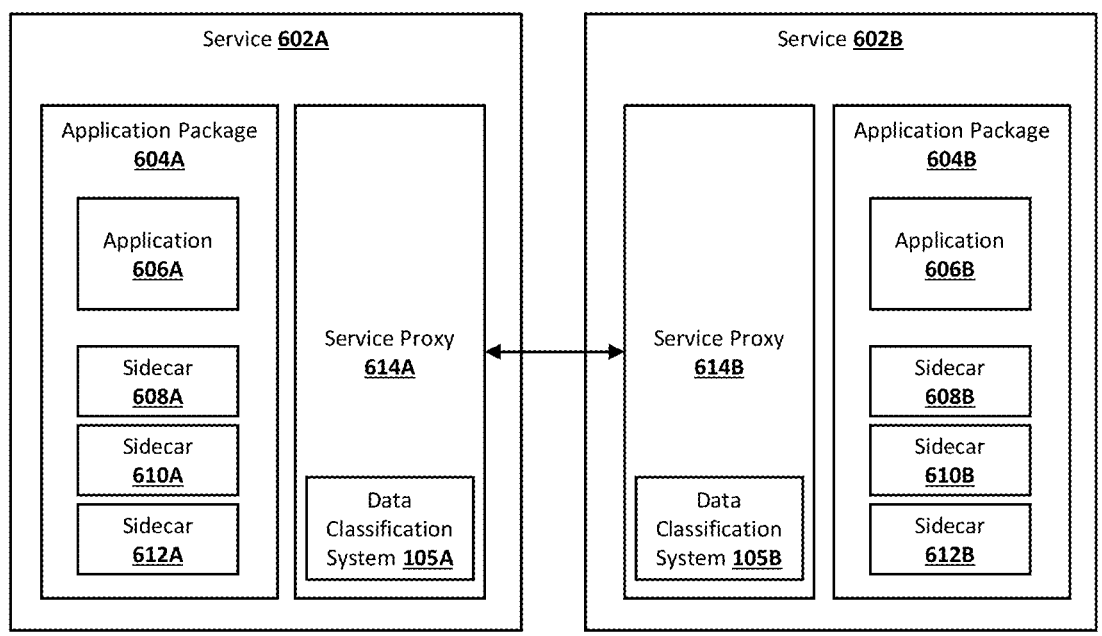

FIG. 6A is a block diagram of an example service in accordance with at least some embodiments of the present disclosure.

Figure 6B:
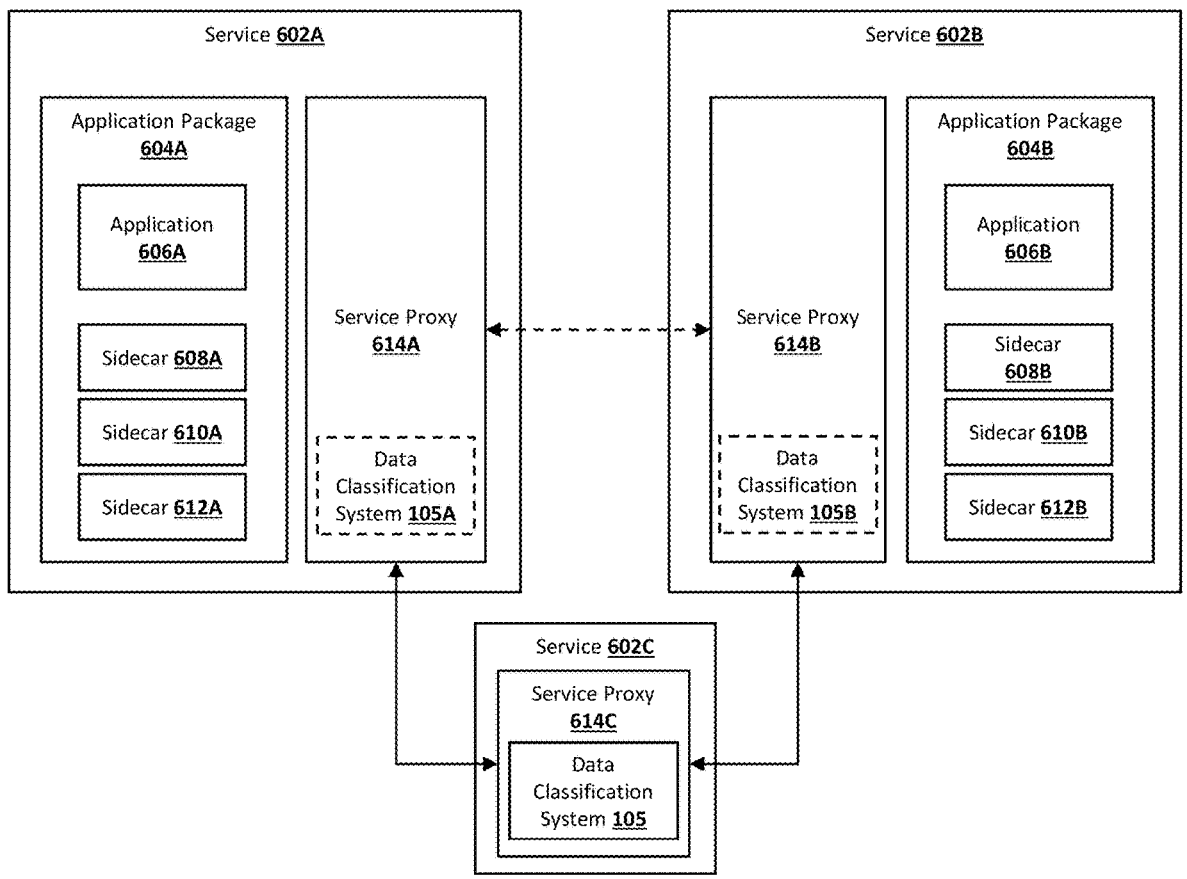

FIG. 6B is a block diagram of example services in accordance with at least some embodiments of the present disclosure.

Figure 7:
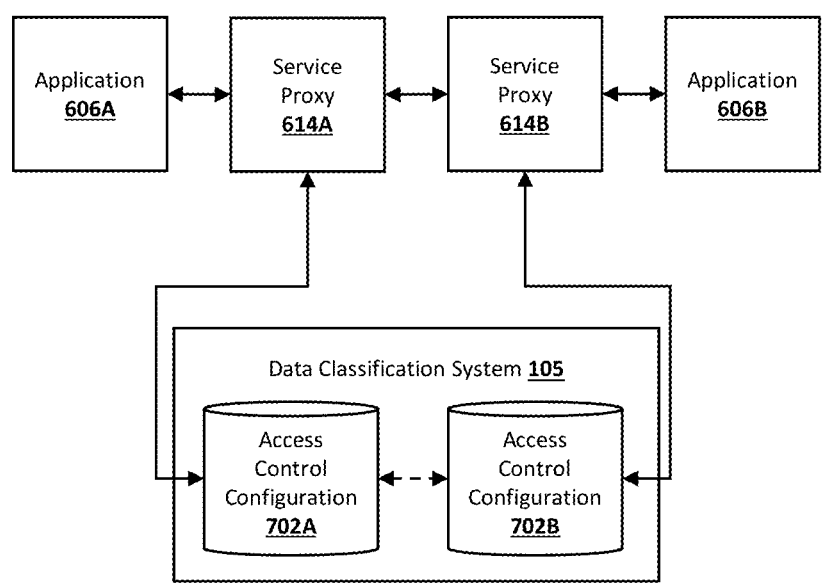

FIG. 7 is a block diagram of an example service proxy architecture in accordance with at least some embodiments of the present disclosure.

Figure 8:
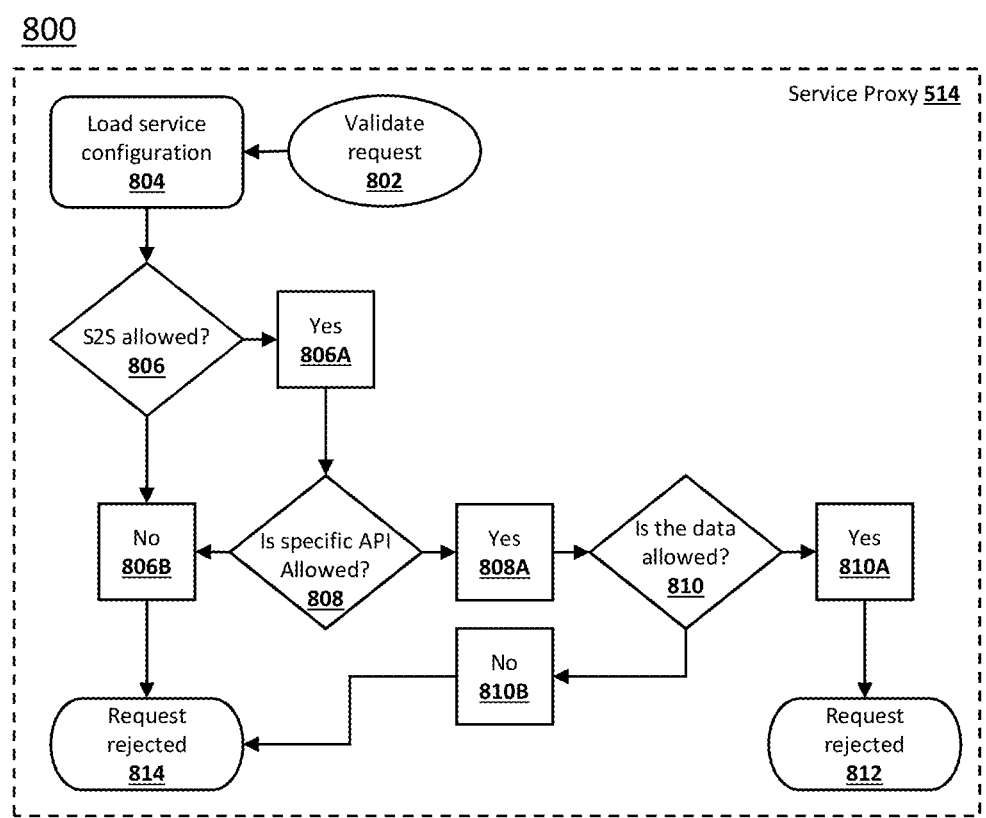

FIG. 8 is a flowchart of a request authorization workflow in accordance with at least some embodiments of the present disclosure.

FIGS. 9A, 9B, and 9C are example data objects output by an application or service in accordance with at least some embodiments of the present disclosure.

Figure 10:
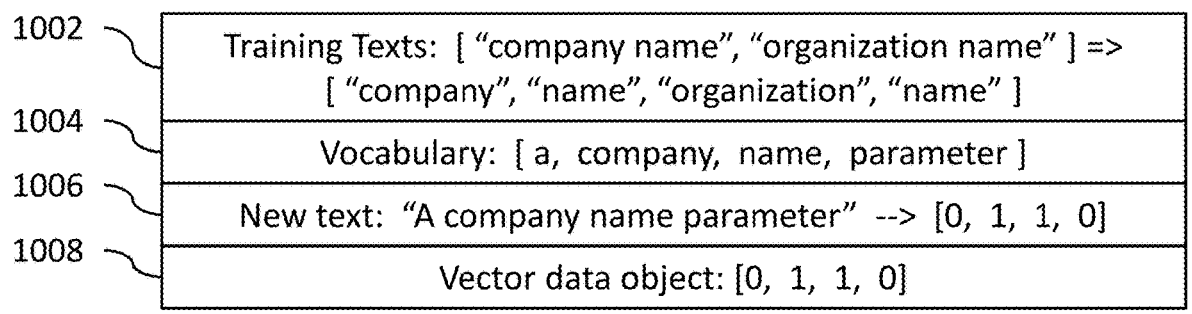

FIG. 10 illustrates an operational example of a data object vectorization operation performed in accordance with at least some embodiments of the present disclosure.

FIGS. 11A and 11B illustrate operational examples of data classification label predictions applied to data objects in accordance with at least some embodiments of the present disclosure.

Figure 12:
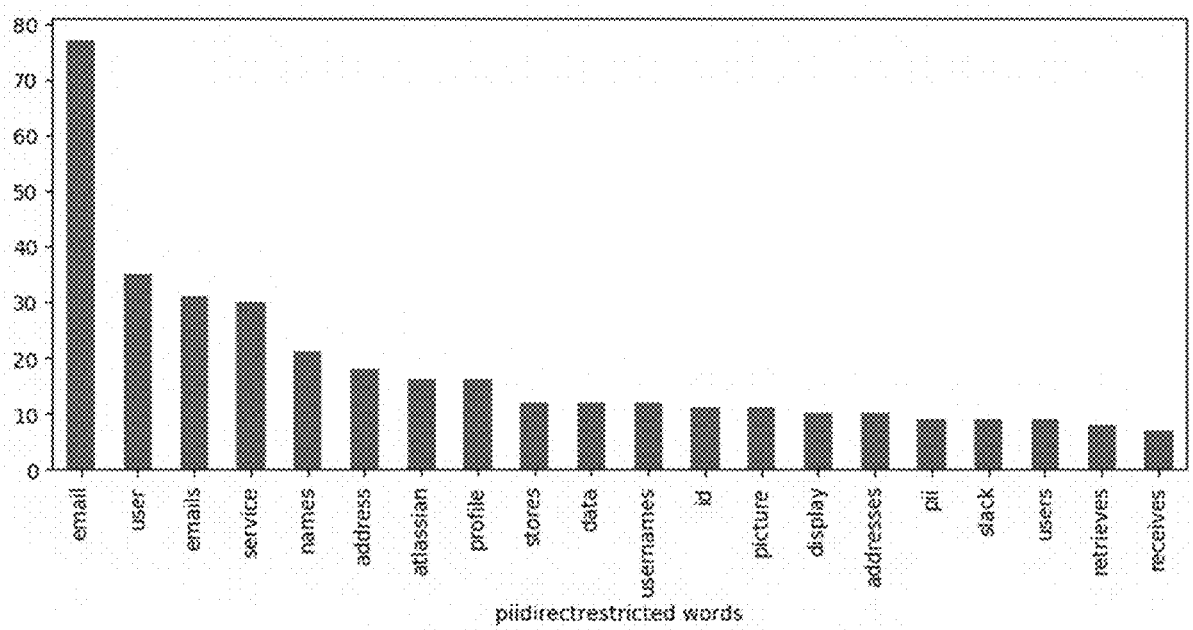

FIG. 12 is a distribution chart for a data classification label in accordance with at least some embodiments of the present disclosure.

Figure 13:
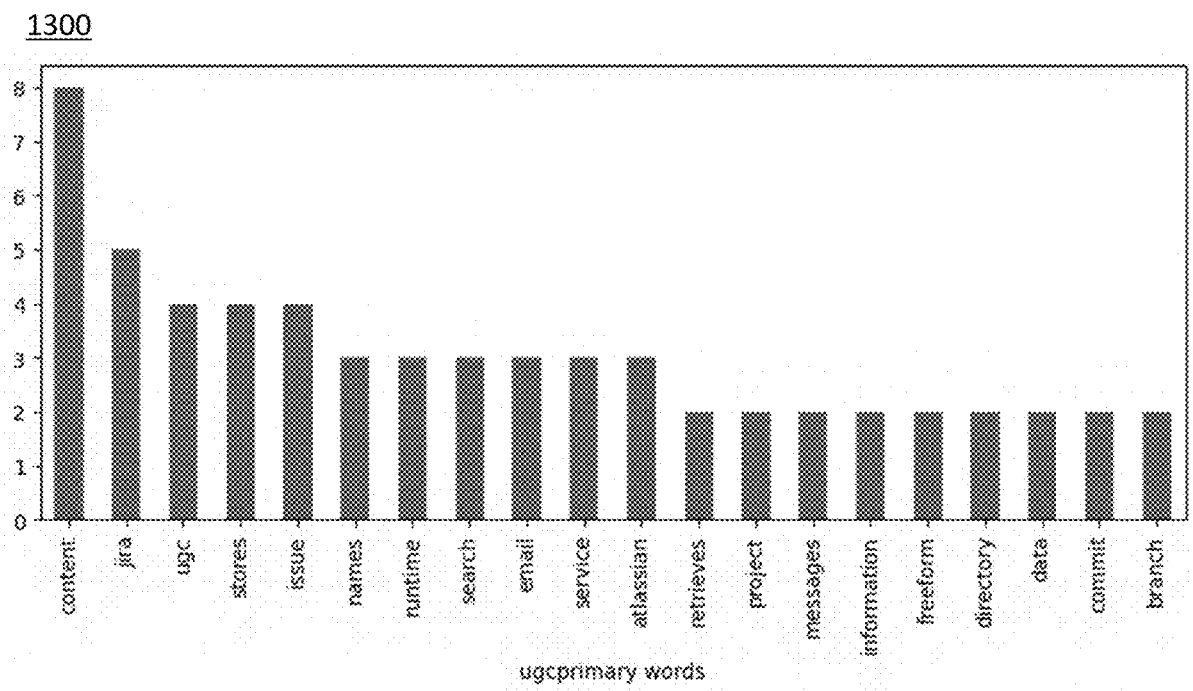

FIG. 13 is a distribution chart for a data classification label in accordance with at least some embodiments of the present disclosure.

Figure 14:
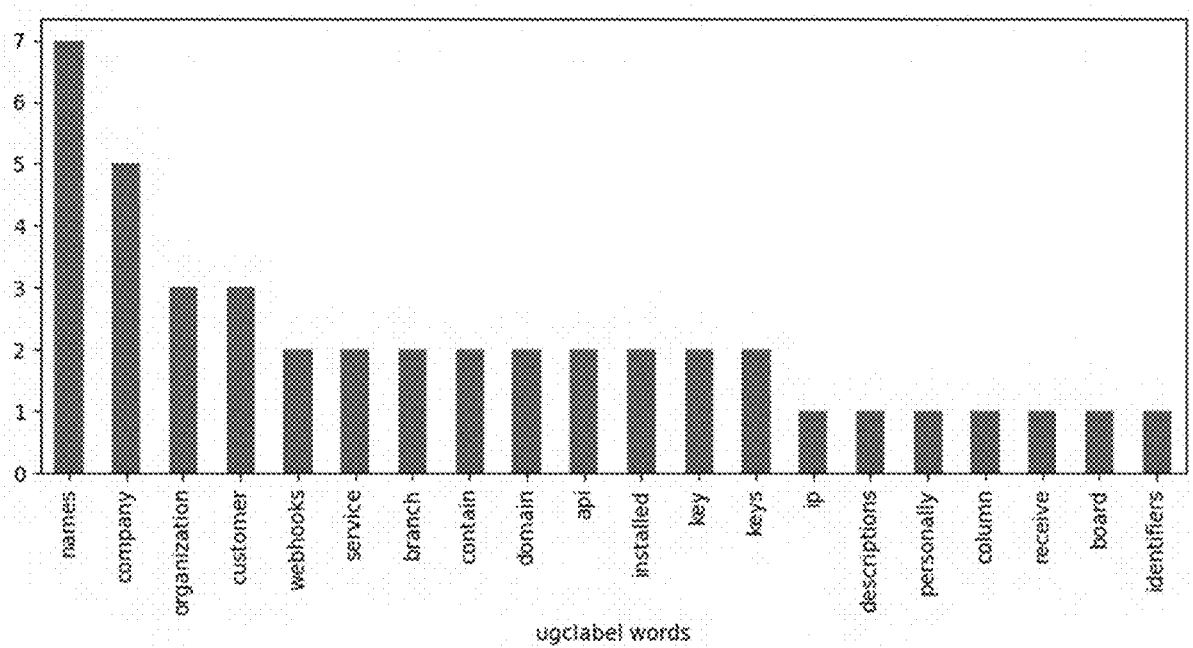

FIG. 14 is a distribution chart for a data classification label in accordance with at least some embodiments of the present disclosure.

Figure 15:
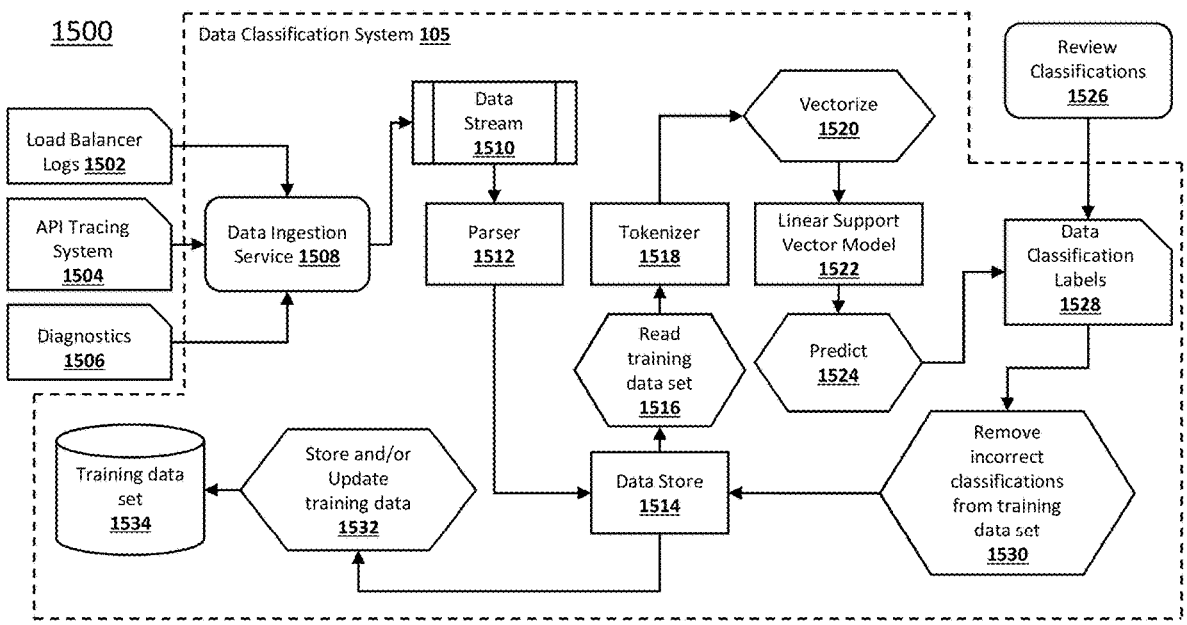

FIG. 15 is a flowchart of a machine learning pipeline workflow in accordance with at least some embodiments of the present disclosure.

Figure 16A:
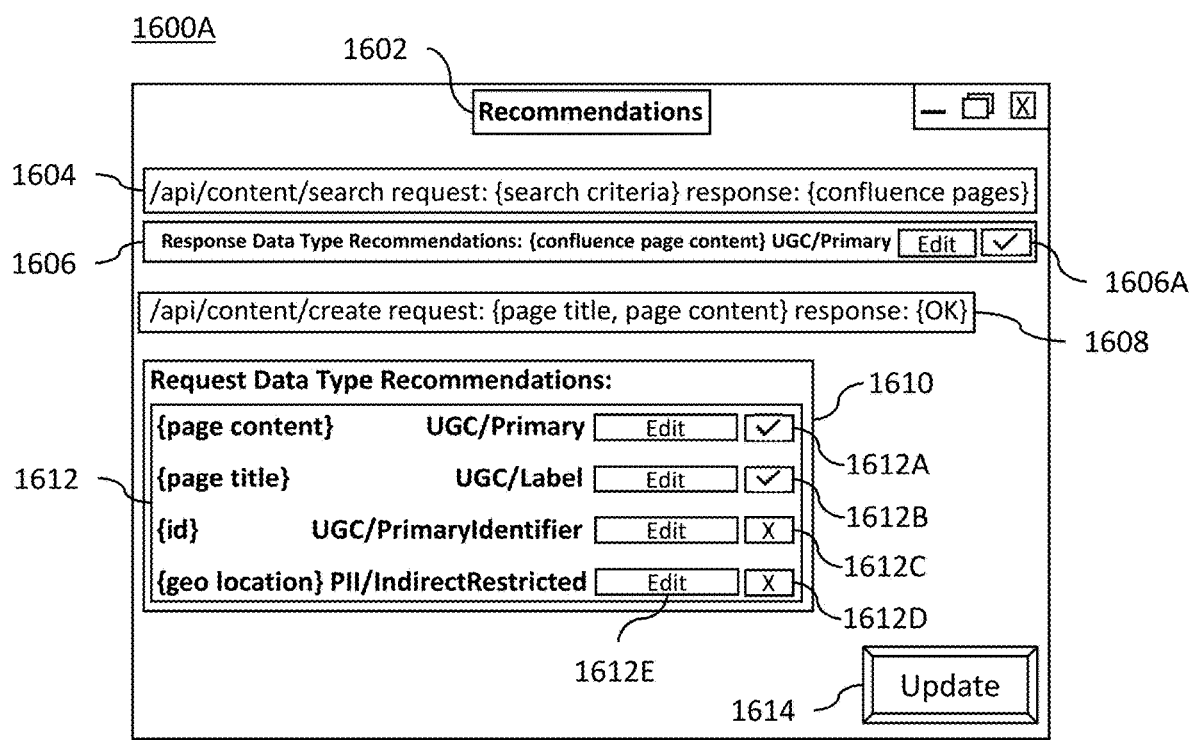

FIG. 16A illustrates an exemplary interface configured in accordance with at least some embodiments of the present disclosure.

Figure 16B:
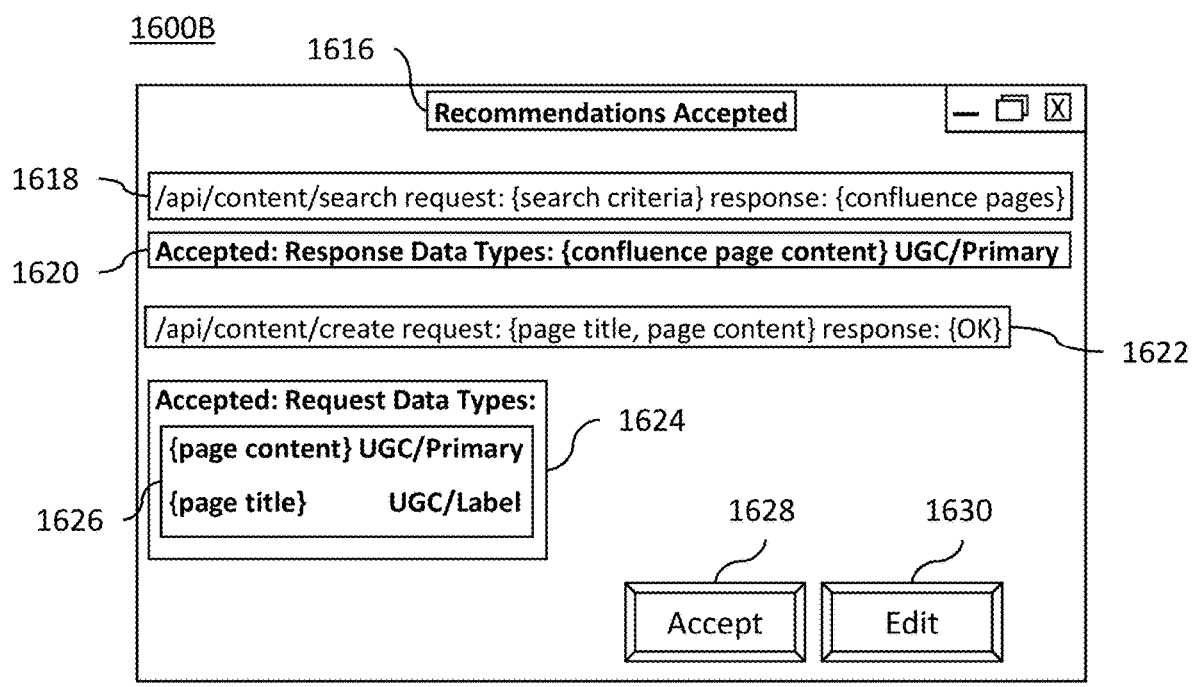

FIG. 16B illustrates an exemplary interface configured in accordance with at least some embodiments of the present disclosure.

Figure 17A:
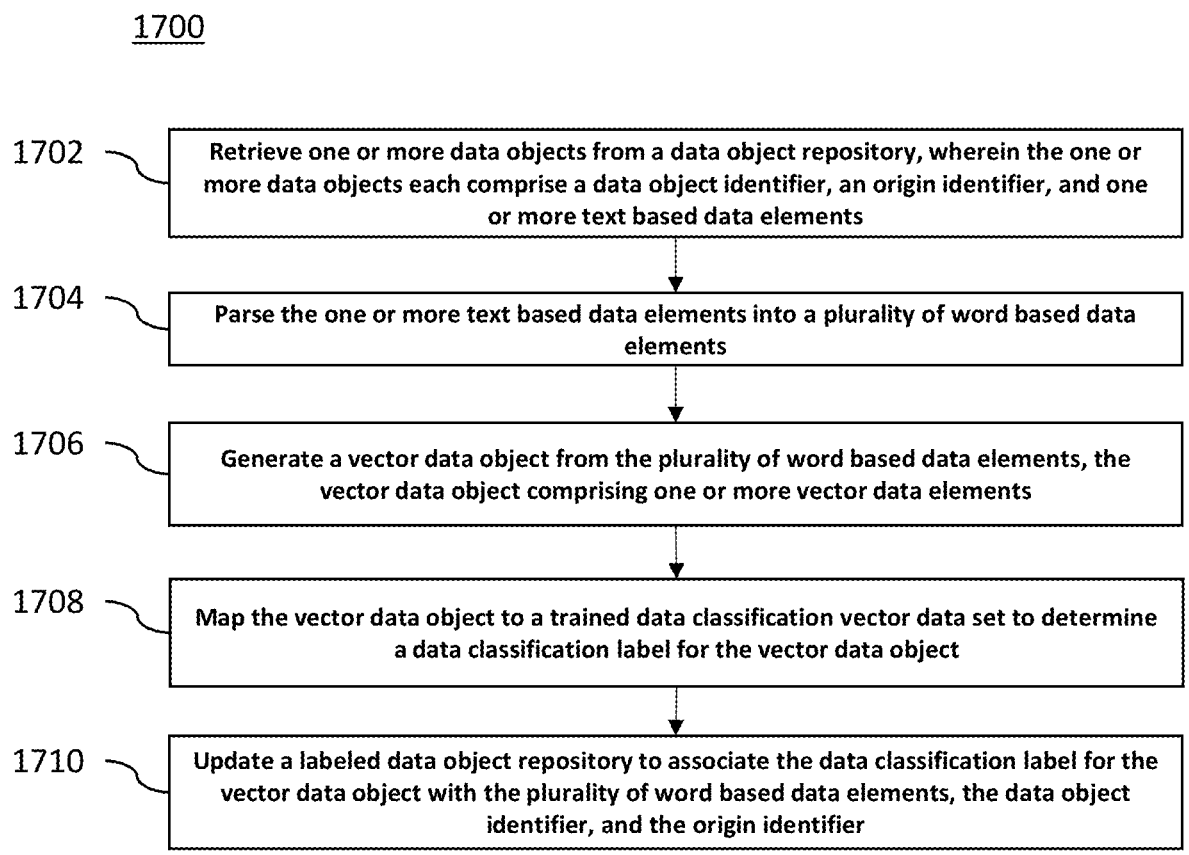
Figure 17B:
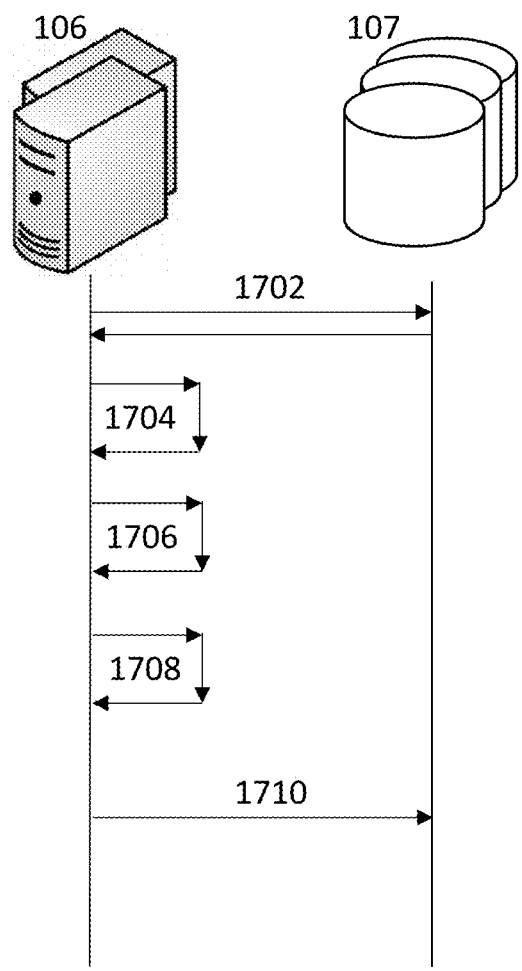

FIGS. 17A and 17B illustrate exemplary operations for the determination of data classification labels associated with data objects, for use with embodiments of the present disclosure.

Figure 18A:
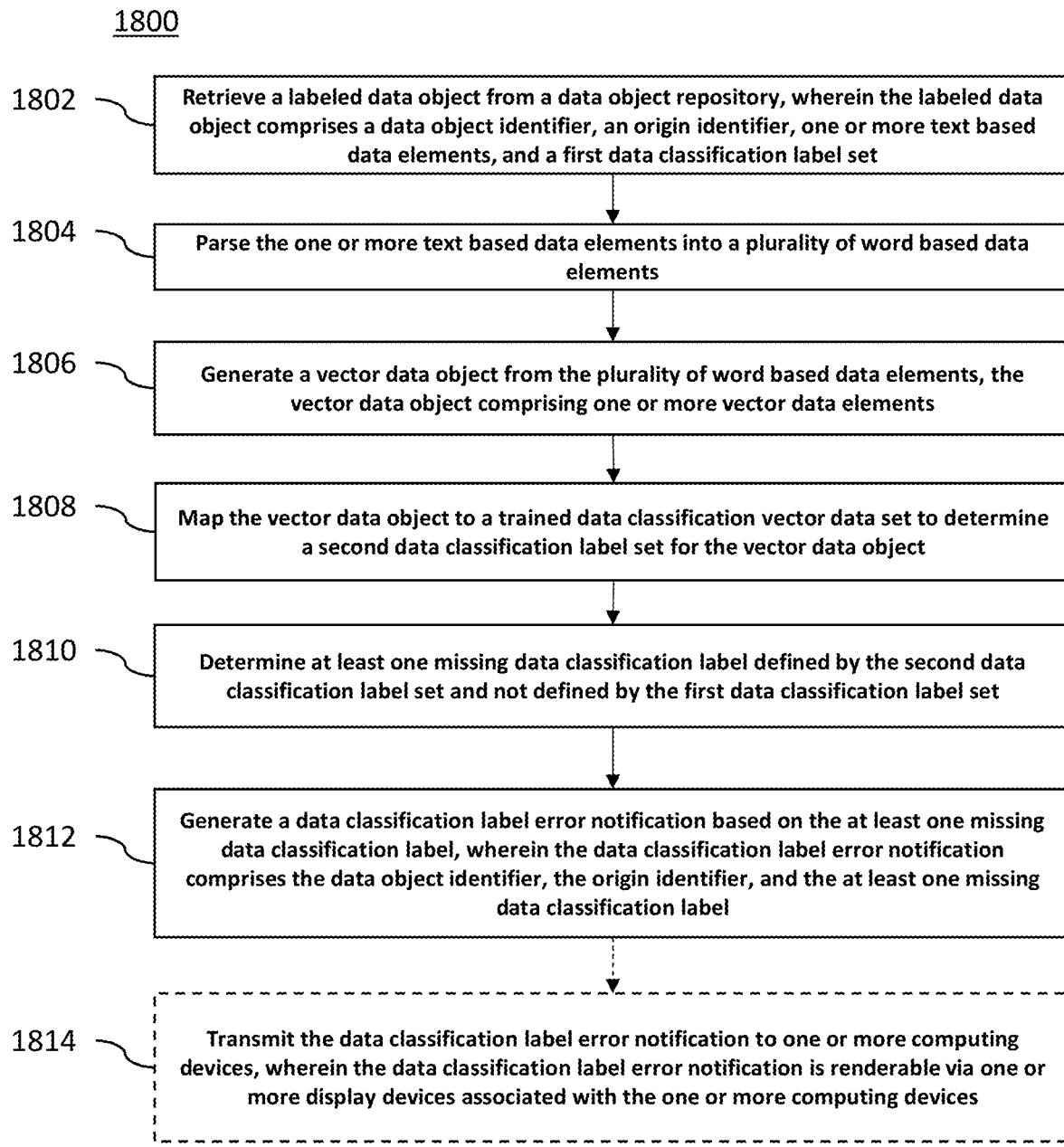
Figure 18B:
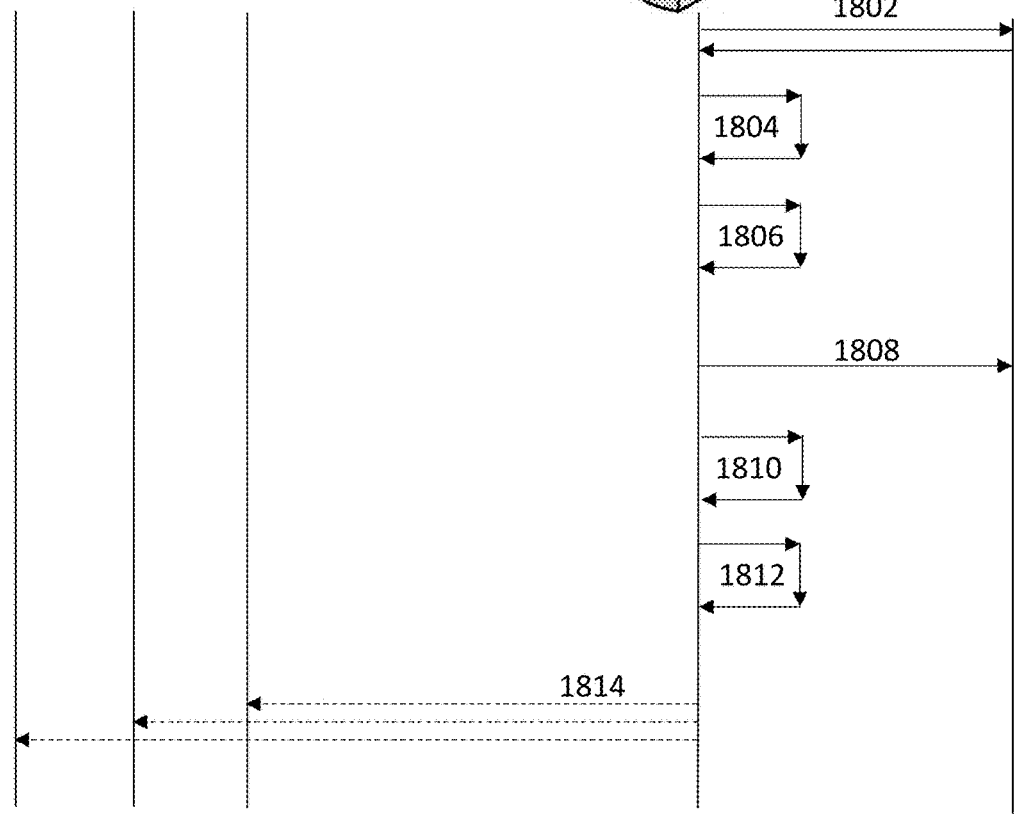

FIGS. 18A and 18B illustrate exemplary operations associated with the detection of data object classification label errors associated with data objects, for use with embodiments of the present disclosure.

Figure 19A:
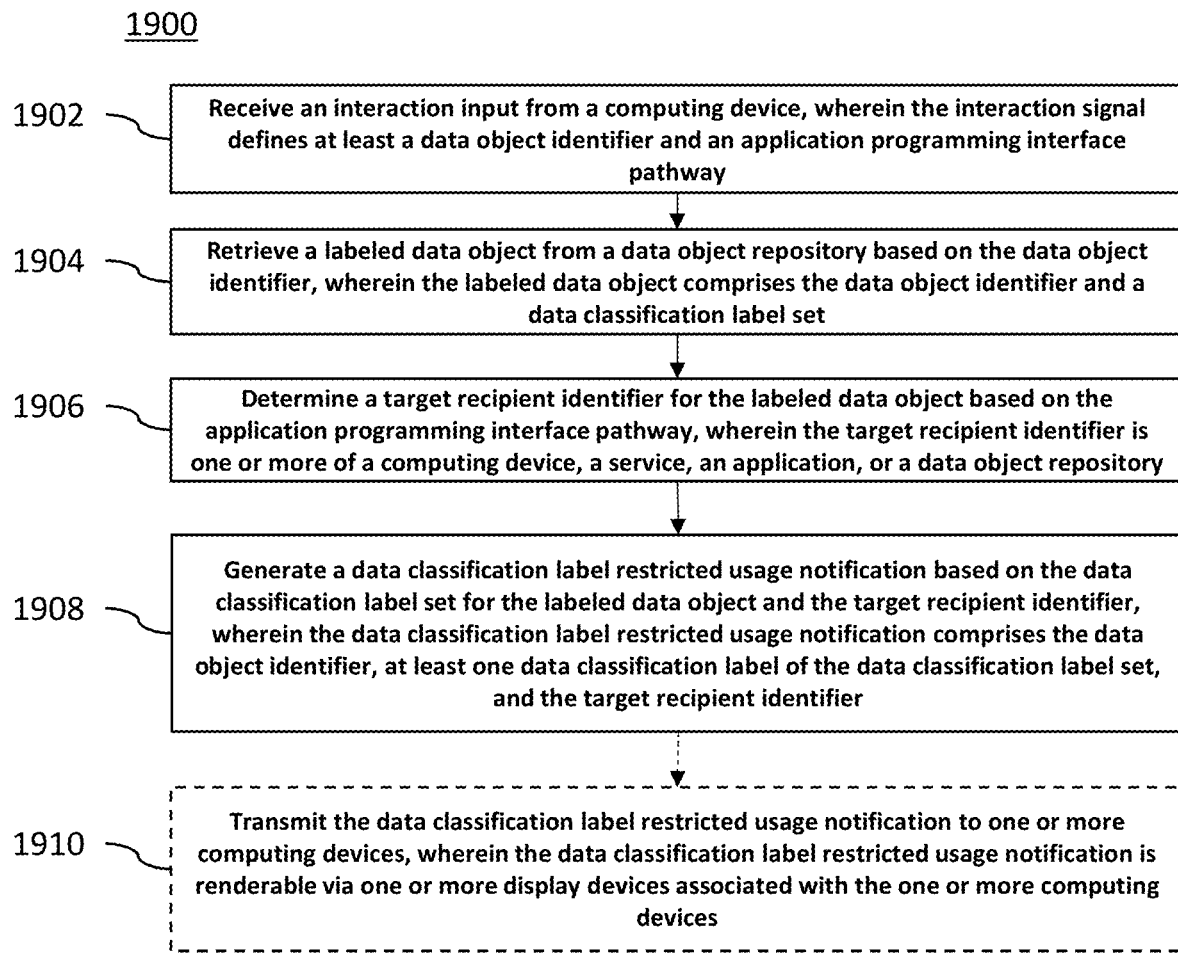
Figure 19B:
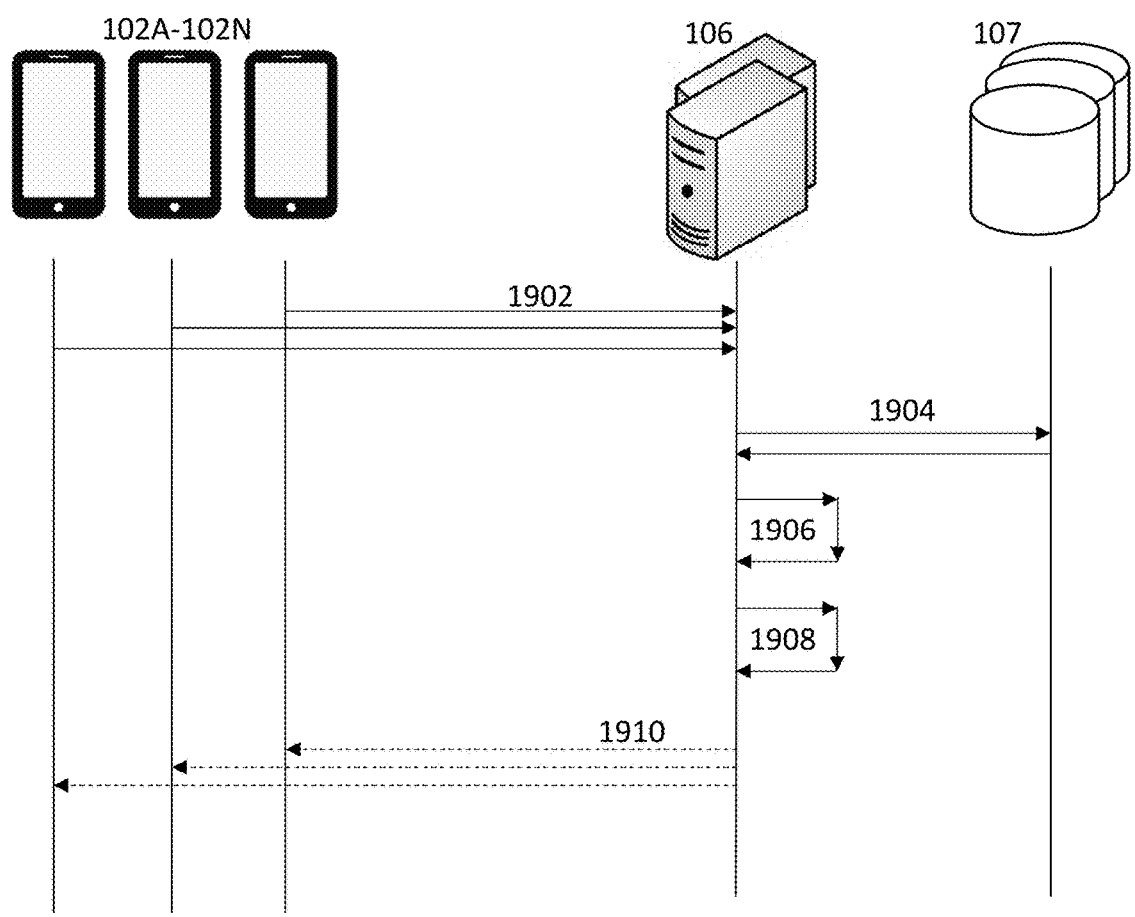

FIGS. 19A and 19B illustrate exemplary operations associated with the generation of notifications based on data object distribution events, for use with embodiments of the present disclosure.

Figure 20A:
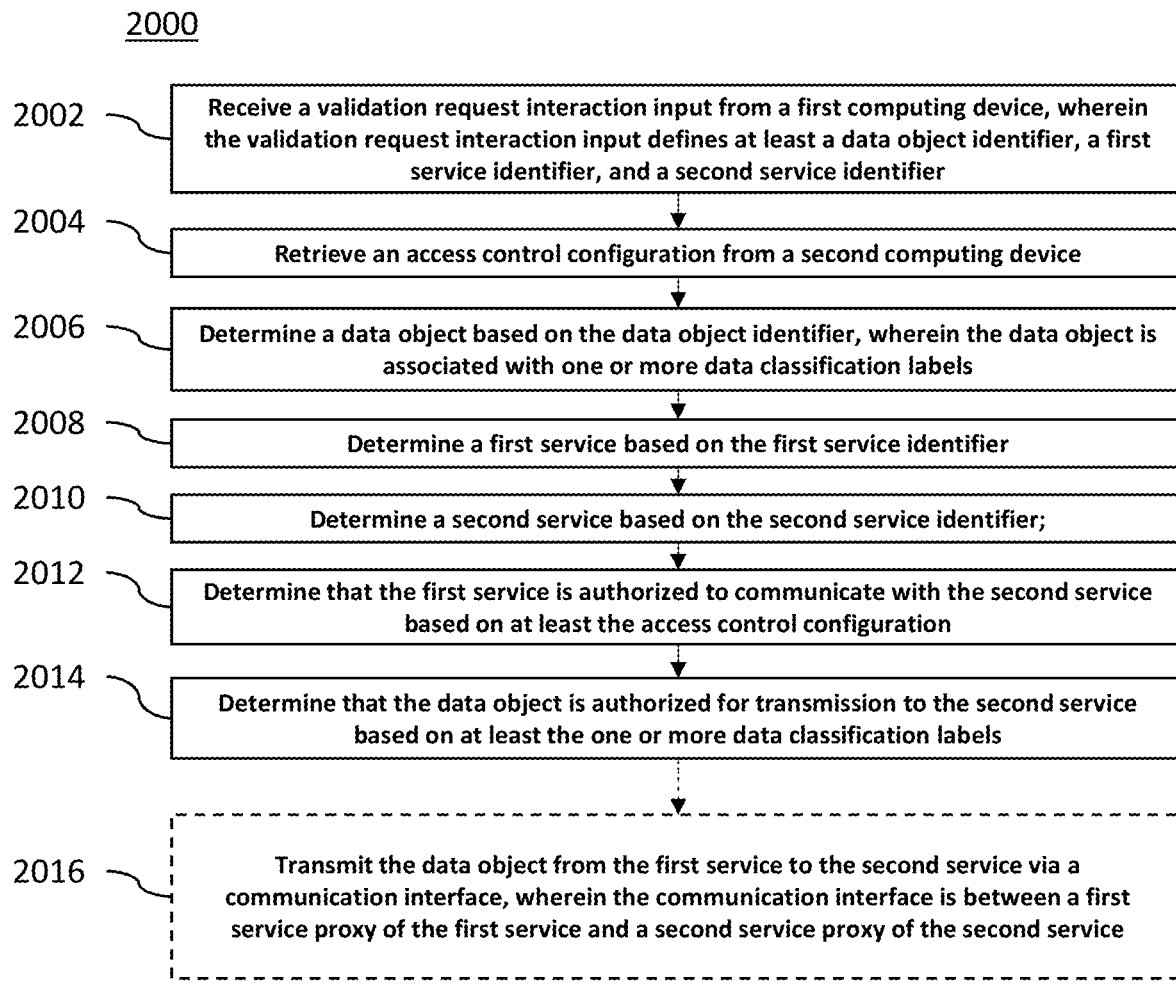
Figure 20B:
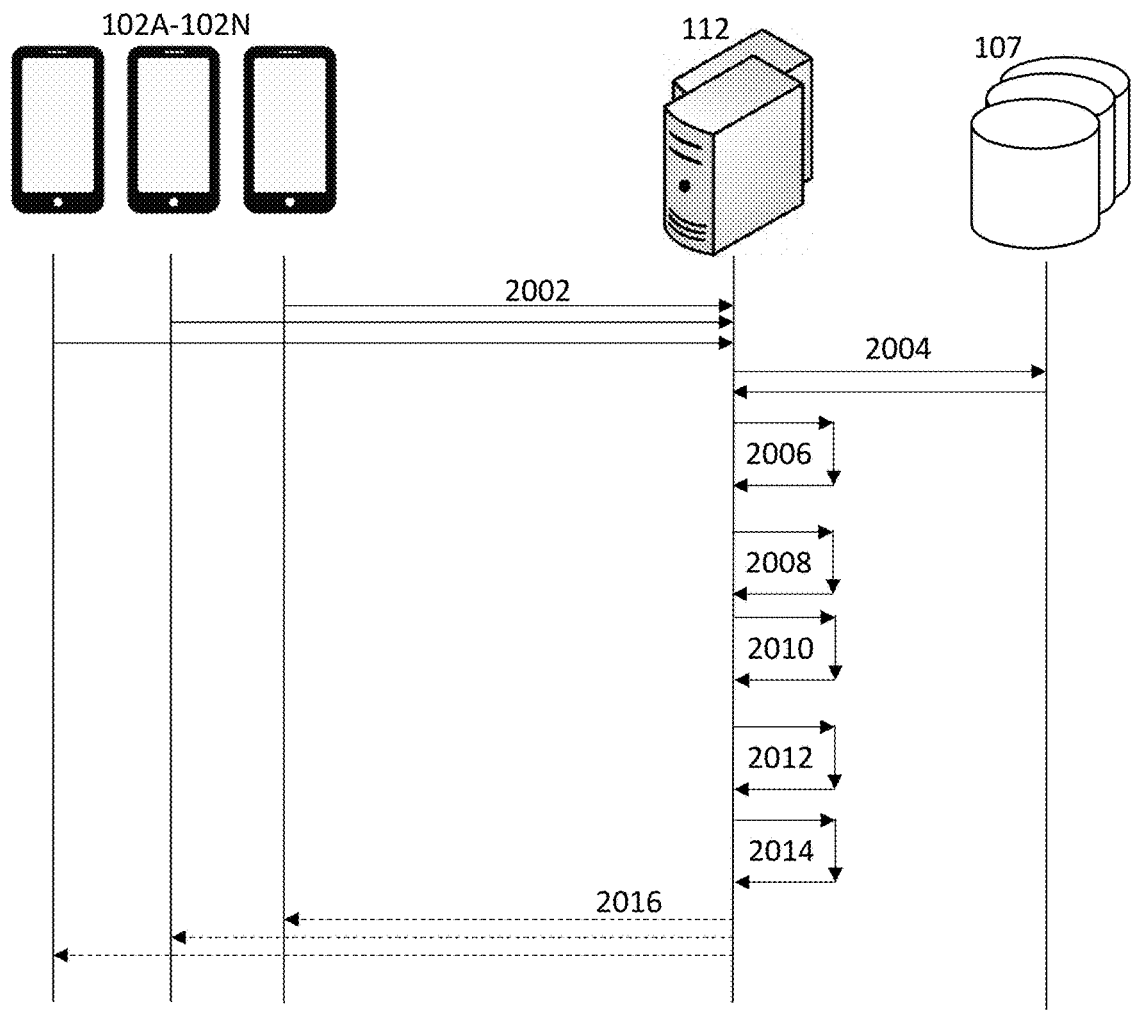

FIGS. 20A and 20B illustrate exemplary operations associated with data object request authorizations, for use with embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

The deployment of large multi-layer service oriented platforms involves interdependent services and microservices that support a myriad of software features and applications. Indeed, some large multi-layer service oriented platforms may be comprised of topologies of 1,500 or more interdependent services and microservices. Such multi-layer service oriented platforms are nimble, highly configurable, and enable robust collaboration and communication between users at the individual, team, and enterprise level.

Computing devices operating on, or otherwise supporting, such multi-layer service oriented platforms routinely generate, transmit, and store millions of data objects. Despite this volume, it can be important to understand various characteristics of such data objects for network security, privacy, regulatory, and geographic residency reasons. For example, enterprise owners of such multi-layer service oriented platforms must frequently certify compliance with data privacy and security regulations (e.g., Sarbanes-Oxley Act (SOX), Service Organization Control 2 (SOC2), International Organization for Standardization (ISO) certifications, etc.). Efficient and programmatic classification of the millions of data objects that are generated, stored, and transmitted through such multi-layer service oriented platforms supports and enhances such compliance certification efforts.

Understanding data object characteristics, and efficiently classifying such data objects, can also improve multi-layer service oriented platform reliability, standardization, scalability, and create a more consistent user experience. In one simple security focused example, a service that is called by a software application to provide data objects for transaction authentication may be required to identify, via a classification label, any and all personally identifiable information contained within any data objects that are generated by the service and transmitted to the requesting application to ensure proper handling (e.g., encryption, storage, dissemination, etc.).

Without proper classification and monitoring of data objects generated, received, stored, or otherwise managed by, for example, multi-layer service oriented platforms, sensitive information (e.g., user credentials, organizational secrets, etc.) or other important data can be vulnerable to hackers, unsecured services/applications, or accidental publication. Such multi-layer service oriented platforms might also fail to comply with detailed data handling requirements set by an administrator (e.g., collaboration software administrators, enterprise administrators, organization managers, etc.), a customer, or a regulatory agency.

Example embodiments discussed herein are directed to multi-layer service oriented platforms that are configured to include data classification systems that programmatically apply data classification labels to vast stores of data objects. The data classifications systems further manage (e.g., generate, store, transmit, block, or otherwise restrict) the distribution of such data objects based on the applied data classification labels. For example, in one embodiment, a data classification system may be configured to encrypt data objects that comprise sensitive information (e.g., personally identifiable information such as a user identity, etc.) before such data objects are transmitted over a public network (e.g., the Internet, etc.). In such embodiments, the data objects comprising the sensitive information are programmatically flagged for encryption prior to transmission based on, at least, a data classification label applied thereto and would only be approved for transmission after the applicable encryption was applied.

In another embodiment, data classification systems structured in accordance with one embodiment are configured to identify data objects via their data classification labels for scrubbing procedures (e.g., removal/deletion of sensitive data). For example, an application or service running on a multi-layer service oriented platform, such as a cloud-based multi-layer service oriented platform, may be configured, via the data classification system, to redact personally identifiable information automatically from data objects that comprise application logs. Additionally, an administrator user may configure the data classification system, or the applications or services themselves, to redact user passwords, application programming interface (API) keys, and/or similar security credentials from, for example, team collaboration pages or helpdesk incident tracking pages.

Large multi-layer service oriented platforms comprising a federated network of databases and computing devices can be difficult for administrator users to manage due to the sheer volume of information (e.g., data objects) that must be transmitted between collaborating applications, services, and computing systems. It would be desirable then to develop a data classification system that is configured to programmatically label, sort and transmit vast numbers of data objects to appropriate stakeholders (e.g., cloud collaboration software administrators, service providers, software users, etc.) instantly or at defined intervals. For example, an enterprise administrator user for a collaborative document management system (e.g., Confluence® by Atlassian, Inc.) may configure a data classification system structured as discussed herein to generate alerts or other periodic data object reports to identify any published user documents (e.g., Confluence® pages) that contain sensitive information such as enterprise passwords, credit card numbers, or other personally identified information.

Some processes for data classification utilize manual review of data objects with limited programmatic oversight to implement data classification and sorting. Such processes place excessive burdens on programmers and engineers to ensure data classification labels are kept up to date. The enforcement of data object transmission restrictions based on such manual data classification labels are susceptible to human errors and misclassification associated therewith.

These deficiencies are only made worse over time as large numbers of new applications, services, and database structures come online. The rapid growth of modern multi-layer service oriented platforms introduces an ever growing network of interdependencies and more complex data object traffic (e.g., transmission and receipt of one or more data objects, etc.), that need to be monitored for data object classification and access control compliance. For example, the introduction of a new service into an existing cloud-based instance of a multi-layer service oriented platform may trigger requests by the new service for data object sets that differ from those requested by other services associated with the multi-layer service oriented platform. Thus, data object usage and transmission patterns may be open to continuous change, can go out of date very quickly, and can rapidly overwhelm manual classification processes.

Given the breadth and scale of data objects handled by large cloud-based instances of multi-layer service oriented platforms, manual classification processes simply cannot keep up. Some attempts at data classification automation focus on applying general classification labels to high level data structure topographies. For example, a service may automatically apply a general classification label to all data objects generated by a particular service without considering specific characteristics of each constituent data object.

Various embodiments discussed herein are directed to improved data classification systems that are configured to retrieve one or more data objects from a data object repository, parse the data objects, or at least a portion thereof (e.g., metadata, programmer comments, file descriptions, file types, API documentation, API calls, API logs, data routing information, associated data objects, or the like), into independent text based data elements. The text based data elements are converted into word based data elements using natural language processing (NLP) tools. In some embodiments, the one or more data objects may be retrieved from at least a temporary data object repository (e.g., temporary memory allocated to hold one or more data objects after generation and before transmission, etc.). Moreover, in some embodiments, a multi-layer service oriented platform is configured to provide for the processing of, for example, API call information using predefined parameter terms (e.g., names or words associated with particular data classification label types, etc.) and/or descriptions (e.g., programmer comments describing the information contained within a data object, etc.) to identify the data within a data object and to apply particular data classification labels to such data objects. In some embodiments, predefined parameter terms may be weighted based on a probability of association with a particular data classification label or a particular data classification label type.

In one example, programmer comments associated with a data object that comprise application configuration settings can be utilized as 'hint words' for applying data classification labels. The programmer comments may be tokenized, in accordance with example embodiments, into individual word based data elements and the word based data elements may be vectorized for use with, for example, a natural language processing model. Such word based data elements are mapped to a repository of data classification validation data generated based on a data classification machine learning (ML) model to determine one or more data classification labels that are pertinent to the received data object.

In some embodiments, API documentation may be parsed to identify and extract parameter names, API call descriptions, schema descriptions, field names and the like for tokenization. The tokenized data may be converted, for example, into natural language processing vector data objects and training data may be generated from the natural language processing vector data objects. The natural language processing vector data objects may be used to generate a support vector machine learning model. In some embodiments, the support vector machine learning model may intake additional tokenized information (e.g., from additional data objects, etc.) and vectorize the tokenized information to output predicted data classification labels.

In some embodiments, the data classification labels are determined in real time or near real time as the data objects are generated by a software application, service, or microservice. Data classification systems structured according to various embodiments are configured to generate audit logs for new and existing services and allow engineers to monitor access patterns as new service requests are detected and/or introduced by new services. Moreover, because data objects are classified by the data classification system at the time they are generated, the enforcement of proper classifications and associated access controls can be implemented more quickly for services as new requirements are developed. Monitoring tools such as boundary maps and data flow maps may be updated automatically as new data classification labels are applied to data objects, new services come online, or service requests are redirected to alternative services (e.g., high performance services, backup services, etc.).

In addition to the providing automated application of data classification labels to outbound data objects generated and transmitted by services, data classification systems configured as described herein may also be configured to automatically validate data classification labels associated with received data objects. Validation of classification labels upon receipt provides for increased audit log security (e.g., ingress and egress data audit logs can be reconciled for accuracy between services, etc.). Such reconciliation between outbound data objects and inbound data objects can further improve mapping between interdependent services as each service monitors and reports on data flow communications.

It should be appreciated, in light of the present disclosure, that embodiments of the present disclosure can provide for improved productivity for engineering, risk management, and regulatory compliance teams. Time spent auditing and tracking data classification and label usage is dramatically reduced. Significant amounts of resources required by multi-layer service oriented platforms may also be freed up due to a reduction in service/application errors, classification related incidents, and undue device/server loading caused by constant manual error checking and reclassification. Further, by having automated access controls in place, risk management, and regulatory compliance teams can more easily ensure third party systems are handling and disseminating data appropriately.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS)

transmitter and receiver, a radio transmitter and receiver, a microphone, a camera, a biometric scanner (e.g., a fingerprint scanner, an eye scanner, a facial scanner, etc.), or the like. Additionally, the term client device, or the like, may refer to computer hardware and/or software that is configured to access one or more of an application, a service, or repository made available by a server. The server is often, but not always, on another computer system, in which case the client accesses the service by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of circuitry applies to all uses of this term herein, including in any claims. Additionally, the term circuitry may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "multi-layer service oriented platform" refers to a complex network computing environment associated with a multitude of computing devices, applications, services, and microservices. For example, in some embodiments, a multi-later service oriented platform includes dozens of applications that are supported by 1000+ services operating within a cloud based platform. Example multi-layer service oriented platforms may comprise a federated network of computing devices, and/or a plurality of database platforms (e.g., servers, hard-drives, etc.). Applications and services or microservices of example multi-layer service oriented platforms may be hosted by internal resources or external resources as further defined below.

Multi-layer service oriented platforms can include an application that is configured to generate and update a repository of collected information associated with each service (e.g., data classification labels associated with service generated outputs). Such multi-layer service oriented platforms can support an application or multiple applications that are configured for the collection of information, in the form of application data objects, to at least capture, classify, and structure such application data objects. In some embodiments, applications can compare information collected from an application data object with a trained and classified application data object set to identify an appropriate data classification label for the application data object and to thereby update a labeled application data object repository.

The term "application" refers to a computer program or a group of computer programs designed for use by and interaction with one or more networked or remote computing devices. Examples of an application comprise workflow engines, service desk incident management, team collaboration suites, cloud services, word processors, spreadsheets, accounting applications, web browsers, e-mail clients, media players, file viewers, videogames, and photo/video editors. An application can be supported by one or more services either via direct communication with the service or indirectly by relying on a service that is in turn supported by one or more other services. For example, an application may transmit an application data object, that requests particular information be returned to the application, to a service, the service in response transmits a service data object, containing the requested information, to the application. In some embodiments, an application may be supported by an internal resource or an external resource as defined below.

The term "service" refers to a computer program or a group of computer programs designed to provide a software functionality or a set of software functionalities via a multi-layer service oriented platform. For example, a service may be configured to retrieve specified information or to execute a set of operations aimed at a particular purpose. Applications and/or client devices may be configured to use such services to execute their respective purposes, together with the policies that control service usage, for example, based on the identity of the client (e.g., an application, another service, etc.) requesting the service. Additionally, a service may support, or be supported by, at least one other service via a service dependency relationship. For example, a translation application stored on a smartphone may call a translation dictionary service at a server in order to translate a particular word or phrase between two languages. In such an example, the translation application is dependent on the translation dictionary service to perform the translation task. In some embodiments, a service is offered by one computing device over a network to one or more other computing devices. Services may be supported by internal resources or external resources as defined below.

In some embodiments, services may be accessed by other services via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, services may be configured to capture or utilize database information and asynchronous communications via message queues (e.g., Event Bus). Non-limiting examples of services include an open source API definition format, an API logger, a network diagnostics tool, a geofencing service, a single sign-on enforcement service, an internal developer tool, web based HTTP services, databased services, asynchronous message queues which facilitate service-to-service communications, or the like. In some embodiments, a service can represent an operation with a specified outcome and can further be a self-contained software program. In some embodiments, a service from the perspective of the client (e.g., another service, application, etc.) can be a black box meaning that the client need not be aware of the service's inner workings. In some embodiments, a first service may transmit a service data object to one or more second services, and/or applications, via an API supported by communication circuitry. In some embodiments, a service may be an internal resource or an external resource.

The term "data object" refers to a data structure, associated with a value in a computer-readable storage medium and/or a computer-readable transmission medium, that represents content that is configured for use or display by one or more software applications, services, or microservices. The data object can take the structural form of a vector or other appropriate data structure for representing output data. The data object includes metadata and may be stored via computer-readable storage medium (e.g., with a repository associated with a server). The data object may be transmitted by a first service or software application and received by a second service or second software application by way of a computer-readable transmission medium (e.g., telecommunication signals, wired/wireless electrical signals, etc.). In some embodiments, a data object may comprise a plurality of other data objects. The data object may comprise one or more of a service data object, an application data object, a vector data object, or the like. A service data object, for example, may comprise any data object generated, or at least partially configured, by one or more services. An application data object, for example, may comprise a data object generated, or at least partially configured, by one or more applications. Data objects comprise one or more data elements including, without limitation, metadata such as data object identifiers and origin identifiers as discussed below.

Data objects disclosed herein are structured to include a data object identifier that serves as a unique identifier for the data object as further discussed below. Data objects structured as discussed herein may further include an origin identifier that serves as a unique identifier for the application or service that generated, hosts, or manages the data object. Data objects structured as described herein may further include one or more text based elements such as, for example, company name, username, password, message text, file text, or combinations thereof, and which are further defined below. In some embodiments, a data object can be a web service output provided by a server to a plurality of other computing devices over a wired and/or wireless network and, as such, the data object can contain one or more properties associated with the web service such as an IP address, API information, the like, or combinations thereof.

In some embodiments, data objects can be configured to follow a predefined format, such that an application can receive, manipulate, and/or store substantially similar data objects from a plurality of sources (e.g., applications, services, etc.). For example, an application may receive a plurality of data objects from a plurality of services, each service configured for the provision of particular functions. In such example embodiments, the application may be able to configure data objects in accordance with information received from a data classification system. For example, an application may be configured to sort data elements of a data object into a predefined order based on a particular data classification label, and/or access control configuration, received via the data classification system.

In some embodiments, a data object can be generated in accordance with instructions associated with one or more data classification systems (e.g., a data classification model and accuracy score threshold, etc.). In some embodiments, the data object may be one or more encrypted or unencrypted files, for example, JavaScript Object Notation (JSON) files, Extensible Markup Language (XML) files, Simple Object Access Protocol (SOAP) files, Hypertext Markup Language (HTML) files, the like, or combinations thereof. Data or metadata collected from each service, application, repository, or system user (e.g., developer, end-user, administrator, etc.) to be represented by an associated data object can be collected directly from the respective entity itself or a computing device associated with the entity (e.g., a hosting server, a user's computing device, etc.). In some embodiments, a data object may comprise a data object identifier and an attribute, the attribute comprising an array of name and value pairs with properties associated with one or more of a service, application, repository, or system user.

The term "vector data object" refers to a two-dimensional data structure comprising at least one row and at least one column of data elements. A vector data object may comprise a single data element representing one row with one column. In some embodiments, a vector data object may comprise a plurality of columns and each column is associated with a respective data element type. For example, a vector data object may comprise information representative of a user account profile wherein the first column is reserved for a username, the second column is reserved for a password, and the third column is reserved for an e-mail address. In some embodiments, a vector data object may comprise a plurality of rows wherein each row represents a respective data object. For example, the first row of a vector data object may comprise information representative of a first user account profile and the second row of the vector data object comprises information representative of a second user account profile.

In some embodiments, dissimilar data objects (e.g., data objects generated from different services, applications, interaction inputs, the like, or combinations thereof) may be converted to vector data objects that share a common data structure. In some embodiments, a vector data object may comprise null values for one or more data elements. For example, a vector data object representing a user account profile may have a null value (e.g., a zero, an underscore, etc.) in a data element that reflects an e-mail address value in an instance the represented user account profile is not associated with an e-mail address. In some embodiments, a vector data object may comprise binary code. Vector data objects as discussed herein may be mapped to one or more vector spaces. In some embodiments, such vector spaces may be populated with a trained data classification vector data set as defined below.

The term "data object identifier" refers to one or more data elements by which a data object may be uniquely identified. The data object identifier may include, for example, one or more of Internet Protocol (IP) addresses associated with an origination service, Uniform Resource Locators (URLs) associated with an origination service, numerical characters, alphabetical characters, alphanumeric codes, American Standard Code for Information Interchange (ASCII) characters, encryption keys, identification certificates, the like, or combinations thereof. In some embodiments, the data object identifier may include and/or point to, at least partially, one or more data classification labels associated with the data object based on the contents of the data object. The data object identifier may be randomly generated, pseudo randomly generated, time based, hardware based, or some combination thereof.

The term "origin identifier" refers to one or more data elements by which a service, external resource, application, or the like, which generated, transmitted, hosts, or manages an associated data object may be uniquely identified. The origin identifier may include, for example, one or more of Internet Protocol (IP) addresses, Uniform Resource Locators (URLs), numerical characters, alphabetical characters, alphanumeric codes, American Standard Code for Information Interchange (ASCII) characters, encryption keys, identification certificates, or the like. The origin identifier may be randomly generated, pseudo randomly generated, time based, hardware based, or some combination thereof.

An example embodiment of an origin identifier includes data provided by at least an originating service (e.g., a service that generated a data object, etc.). For example, an origin identifier may comprise a URL associated with a service. In some embodiments, the origin identifier comprises a JSON formatted text that is either posted, by way of an HTTP POST, to a data object during creation or when a data object is returned from another service, through an HTTP GET.

The term "target recipient identifier" refers to one or more data elements by which a recipient for a data object or interaction input transmission may be uniquely identified. The target recipient identifier may include, for example, one or more of numerical characters, alphabetical characters, alphanumeric codes, American Standard Code for Information Interchange (ASCII) characters, encryption keys, identification certificates, IP addresses, URLs, or the like. The target recipient identified by the target recipient identifier may include, without limitation, one or more of a network entity, a computing device, a server, a software application, a repository (e.g., service data object repository, etc.), a service (e.g., internal resource, external resource, etc.), or the like.

The term "data element" refers to a constituent component of a data object. In some embodiments, data elements may be grouped together according to a hierarchy within a data object. For example, a data object may comprise a string of words (e.g., a sentence, etc.) and each word of the string of words may define a respective data element. Further, each word of the string of words may comprise one or more letters which may each define a respective data element (e.g., an ASCII character code, etc.). Moreover, each ASCII character code, for example, may comprise a plurality of additional constituent data elements, such as, one or more binary codes (e.g., 0 or 1). In such embodiments, a binary character of 0 or 1 would define the smallest divisible data element of a data object. In some embodiments, a data element may comprise a text based data element, a word based data element, a time data element, a vector data element, a data object identifier, an origin identifier, all or some combination of these, as described in further detail below.

The term "text based data element" or the like refers to a data element that comprises one or more symbolic characters. A symbolic character may comprise one or more of numerical characters, alphabetical characters, alphanumeric codes, American Standard Code for Information Interchange (ASCII) characters. In some embodiments, a text based data element may be stored within a repository, such as by an application, as a separate data object from the data object from which it is associated. In some embodiments, a text based data element may be stored within the data structure of the data object (e.g., data object, vector data object, or the like) with which it is associated.

The term "word based data element" refers to a constituent component of a text based data element that comprises a string of characters representative of a word associated with a written language system. For example, a word based data element can be a company name, a username, a conjunctive word, a space, a period, a comma, a sentiment, or a user password.

The term "vector data element" refers to a constituent component of a vector data object. In some embodiments, a vector data element may be a text based data element. In some embodiments, vector data elements may be binary code (e.g., 0 or 1). In some embodiments, a vector data element may reflect the presence or absence of a data element (e.g., word based data element, or the like) within a data object (e.g., service data object, or the like). For example, a first data object comprising a company name, username, and IP address may be converted to a first vector data object comprising columns representative of company name, username, e-mail address, and IP address. In such an example, the first vector data object representative of the first data object may comprise because the service data object includes company name, username, and IP address values but does not include an e-mail address value. In some embodiments, a vector data element may be a stop word (e.g., space, period, comma, etc.) to indicate a column and/or row separation (e.g., [1,1,0,1]).

The term "time data element" refers to a constituent component of a data object that comprises a time stamp in order to reference when a data object was created and/or updated. For example, a first data object may be added to a data structure (e.g., a data object repository, a labeled data object repository, etc.) and tagged with a time stamp for 'Jan. 1, 2020 01:00:00 AM.' In such an embodiment, a data structure may be tracked for changes over time and, as such, the data structure can represent particular historical states for a given date and/or time based on one or more associated time stamps.

The terms "training data," "training data object," "validation data," "validation object data," "test data," "test data object," "training data set," or similar terms refer to one or more data objects that fit predefined or desired parameters and can operate as a source of truth for a machine learning model. In some embodiments, training data may be retrieved from a repository, or the like, by an application to train a data classification learning model that is used to apply one or more data classification labels to one or more received data objects.

In some embodiments, training data, or the like, may be generated, and/or updated, at least partially based on previously classified data objects or a particular application or service. In some embodiments, for example, a first data object generated by an application may be compared to training data (i.e., validation data) to determine an accuracy value for a predicted classification label for the first data object. For example, an application may apply data classification labels to a first data object, based on a data classification model, as the first data object is generated. Then, for example, the application may further compare the generated first data object with a substantially similar validation data object and, thereby, associate the first data object with an accuracy value based on how closely the suggested first data object classification label matches the classification label associated with the validation data object.

The term "data classification system" refers to an assembly of at least a computer program and computing device (e.g., server, etc.), including without limitation one or more of circuitry (e.g., data classification circuitry, data object retrieval circuitry, access control circuitry, etc.), a repository (e.g., data object repository, etc.), and computer program code instructions configured, when executed by at least a processor of the computing device, to at least retrieve a data object from the repository, parse the data object into one or more data elements, generate a vector data object using the one or more data elements, map the vector data object to a data classification vector data set to determine a data classification label, and apply the data classification label to the retrieved data object. In some embodiments, the data classification system is configured as part of a multi-layer service oriented platform. In some embodiments, the data classification system may be implemented as a computer program on a server associated with one or more of an application, a service, an internal resource, an external resource, or the like. In some embodiments, the data classification system may be implemented as a computer program on a server dedicated to data classification, such as, data classification server as shown in FIG. 1 and further described and illustrated with respect to FIG. 2.

The term "data classification model" refers to an application or service that is configured to apply a machine learning model to determine one or more suggested data classification labels for a selected data object or set of data objects. The data classification model can receive data objects, generate training data, transmit classification suggestions or predictions to one or more applications and/or services, generate accuracy values for such suggestions or productions, transform received data objects, and/or transform training data. For example, an application may retrieve a data object comprising one or more data elements and may determine one or more data classification labels for the one or more data elements of the data object based on application of the data classification model.

In some embodiments, a data classification model may apply one or more data classification labels to a data object. For example, data classification labels may be applied to individual data elements or to a data object as a whole. In some embodiments, the data classification model may be one or more of a natural language processing model, a machine learning pipeline, a linear regression model, a logistic regression model, a decision tree, a supervised learning model, an unsupervised learning model, a reinforcement learning model, or the like. In some embodiments, the data classification model can include one or more machine learning libraries, for example, scikit-learn for the Python programming language, the like, or combinations thereof.

The term "machine learning pipeline" refers to an automated set of operations for updating a data classification model. In some embodiments, a machine learning pipeline comprises a plurality of operations including one or more of a data compilation, processing the compiled data according to a learning model (e.g., a natural language processing model, etc.), a verification of categorization of data based on the model (e.g., running multiple iterations of the learning model with different but comparable variables, incorporating a manual user review of output data for at least some model outputs, etc.), a parameter adjustment (e.g., change threshold values, incorporate a feedback loop based on model outputs, etc.), monitoring long term model outputs, store new data (e.g., new model templates created by programmers, historical data, etc.), or the like. In embodiments, a machine learning pipeline can include a logical workflow between one or more operations comprising "if/then" sequences, "and/or" sequences, Boolean logic trees, the like, or combinations thereof.

For example, a machine learning pipeline configured for a natural language processing model can comprise data acquisition (e.g., receipt of a data object, etc.), text cleaning (e.g., parsing the data object into individual words or characters, etc.), identification of stop words or characters, determine dependency between words (e.g., connecting adjectives to appropriate nouns, connecting previously identified nouns with later substitute pronouns (e.g., "Ball" referred to later in a sentence as "it"), etc.), referencing words to a dictionary or category (e.g., London, New York, and Mexico may all be categorized as geographic locations, etc.), and outputting a data structure in a format that can be cross-referenced to a data classification repository. In some embodiments, a machine learning pipeline associated with a natural language processing model may be configured for lemmatization and/or stemming of words. In some embodiments, a machine learning pipeline associated with a natural language processing model may be configured for converting words into numerical values (e.g., vectorization, etc.).

The term "support vector classifier" refers to an example supervised machine learning data classification model that uses one or more hyper plane classification algorithms. A hyper plane classification algorithms can be used to identify one or more vector data objects that best represents a trained data classification vector data set within a shared vector space.

The term "linear support vector classifier" refers to an example supervised machine learning data classification model that uses one or more linear classification algorithms. A linear classification algorithm can be used to identify a vector data object that best represents a linearly separable trained data classification vector data set within a shared vector space.

The term "labeled data object corpus" refers to a set of training data associated with one or more data classification models (e.g., support vector classifier, linear support vector classifier, or the like). The labeled data object corpus comprises one or more of historical data objects, manually configured example data objects, vector data objects, or the like that are trusted to operate as a source for classification truth for training one or more data classification models. For example, a linear support vector classifier may access a labeled data object corpus that comprises example vector data objects configured by a programmer to include accurate or trusted classification labels.

The term "data cleaning operation" refers to one or more software operations that are configured to transform a data object from a first or native state to a second state that is better configured for further processing such as, for example, by an application associated with a data classification model. For example, an application may retrieve a first data object and parse the text elements of the first data object to remove stop words, split strings of text characters into words, and then convert the individual words to all lower case characters to, thereby, generate a second data object that better matches a data structure associated with one or more data classification models.

In some embodiments, data cleaning operations include conversion of a data object into a vector and/or matrix (e.g., vectorization of data, or the like). For example, a data object may comprise a plurality of ordered data elements and as such may be converted to a vector comprising numerical values based on the order and information associated with each data element.

The term "stop word" refers to a computing language indicator that indicates to a computing device that a string of one or more characters has ended. A stop word may include, without limitation, a period, a comma, an underscore, a space, a parentheses, a quotation mark, a string of characters (e.g., STOP, etc.), the like, or combinations thereof. In some embodiments, a stop word is one or more characters that are filtered out before or after processing of natural language data (e.g., text) by a computing device.

The term "data classification label" refers to an identifier associated with a data object. In some embodiments, the data classification label may comprise one or more categories of data classification. For example, a data classification label may comprise two parts, a first general classification (e.g., user generated content (UGC), etc.) and a second sub-classification label (e.g., company name, custom emoji name, etc.). In some embodiments, the second sub-classification label can be specific to the first general classification. In some embodiments, the first general classification may comprise one or more of user generated content (UGC), personally identifiable information (PII), usage related data (Usage), security related data (Security), specific related data (Specific), or the like (e.g., Commerce related data (Commerce) classifications can be added for shopping and monetary transactions for association with commercial retail applications).

A data object may be associated with an identifier that is further associated with a referential database of information. For example, a data object may contain a user name and password for authentication procedures with a cloud-based collaboration software and, in accordance with a data classification model, the data object may be associated with a label of "Security/Credential" to notify an application and/or user (e.g., an enterprise administrator of the collaboration software, etc.) to handle the data object according to pre-defined security procedures (e.g., encrypt the data object, do not make the data object publicly accessible, etc.). In some embodiments, the data classification labels may be compiled into a classification database stored on computer-readable storage medium (e.g., a server, etc.). In some embodiments, the data classification labels may be associated with one or more descriptions (e.g., a brief explanation of the types of data object to which the label should be applied, handling procedures for data objects associated with the label, etc.).

In some embodiments, a plurality of data classification labels can be associated with a data object. For example, a data object indicating a company name or an organization name may be associated with both the "PII/IndirectRestricted" label and the "UGC/Label" label because the indicated company or organization name may be used to indirectly identify one or more users associated therewith. For example, a data object (e.g., a Confluence® page, a published user document, etc.) may indicate the job title and company associated with an author which may then be used to identify the author. For example, a Confluence® page may indicate an author as the "Chief Operations Officer" of "Smith Industries, Inc." without directly naming the author. The data object may be associated with the "UGC/Label" label because the contents of "Chief Operations Officer" and "Smith Industries" are user generated content but they may also be utilized to indirectly identify the author as "John Smith" (e.g., via a user lookup, etc.). Thus, the data object associated with the contents of "Chief Operations Officer" and "Smith Industries" would also be associated with the "PII/IndirectRestricted" label because "John Smith" may be identified elsewhere (e.g., a company website, a collaboration software user directory, etc.) using such a data object.

Moreover, a data object may indicate a company name, job title, and location to further identify specific employees that share particular job titles. For example, a data object (e.g., a Confluence® page, a published user document, etc.) may indicate an associated user as the "Store Manager" of "Smith Industries Local" in "Atlanta, Georgia" and, therefore, the data object may be used to indirectly identify "Larry Locman" (e.g., via a Confluence® repository of users, etc.). In some embodiments, a data object may be associated with the "UGC/Label," "UGC/Primary," and one or more other labels (e.g., "PII/IndirectRestricted" label, etc.) because the user generated content (e.g., a user comment within a forum page, etc.) would be both the content label and the primary contents of the data object.

The term "candidate data classification label" refers to a data classification label that is selected by a data classification model for association with a data object (e.g., vector data object). For example, a support vector classifier may compare a received vector data object to a trained data classification vector data set and determine a data classification label to suggest to a user (e.g., a system administrator, etc.) for association with the received vector data object.

The terms "data classification label set," "data classification set," or the like, refer to a plurality of data classification labels associated based on a common characteristic. In some embodiments, the common characteristic may be that the data classification labels of the data classification label set are all associated with a single data object (e.g., via a data object identifier, etc.) or that they are all associated with a first general classification (e.g., Security, UGC, etc.). In some embodiments, a data classification label set may be defined by one or more user interaction inputs. For example, an application user may define a data classification label set by selecting (e.g., via mouse-click interactions, etc.) a plurality of data classification labels from a data classification label repository.

The term "descriptive term" refers to a word based data element associated with a data classification label. A descriptive term associated with a data classification label may be used as meta data for searching a repository that comprises data classification labels. A descriptive term may be used by a user or a data classification model to associate a plurality of data classification labels with a plurality of data object (e.g., vector data objects, etc.).

The term "amount of commonality" refers to a quantity of data object metrics that can be correlated to another data object. For example, a first vector data object and a second vector data object may comprise a common data structure of ten vector data elements and, of the ten vector data elements, seven are common vector data elements. Thus, the amount of commonality between the first vector data object and a second vector data object would, for example, be 70% commonality.

The term "data classification vector data set" refers to a vector space that comprises a plurality of vector data objects each associated with one or more respective data classification labels. In some embodiments, the plurality of vector data objects share a common characteristic (e.g., data structure, at least one data classification label, etc.). For example, a plurality of vector data objects may be stored within a repository, or within a partition of a repository, based on a shared data classification label and common data structure. In some embodiments, a data classification vector data set may comprise training data. In some embodiments, a trained data classification vector data set may be accessed to compare with a similarly structured vector data object for determining data classification labels for the similarly structured vector data object.

The terms "common data structure," "common vector data structure," or the like refer to a data structure shared by a plurality of data objects. A common data structure can comprise one or more of an ordered sequence of data elements, a shared file type, a shared API, a shared programming language, or the like.

The term "common vector data element" refers to a vector data element shared by a plurality of vector data objects. In some embodiments, the common vector data element may occupy the same position in each of the plurality of vector data objects (e.g., third column, second row). In some embodiments, the common vector data element may be a particular number, word, character, IP address, company name, phone number, e-mail, or the like present in each of the plurality of vector data objects.

The terms "user generated content," "UGC," or the like refer to a type of data classification that is associated with a data object created by one or more users of an application that generated the data object (e.g., free-form text, audio files, video files, the like, or combinations thereof). For example, a user of a cloud-based collaboration software can provide data objects, via at least a computing device to the software application, that are particular to their instance of the collaboration software. Such an example may include their company name (e.g., Joe's Café Company, etc.) or messages posted to the collaboration software for communication between users.

In some embodiments, the user generated content classification may be associated with one or more sub-classifications of Label, PrimaryIdentifier, Primary, Configuration, or the like (e.g., additional custom sub-classifications defined by a user, developer, company, standards organizations, or the like). In some embodiments, the "UGC/Label" data classification label may be associated with a data object that contains, at least in part, one or more of a company name, an organization name, an API key name, a custom emoji name, a connect application key, or the like. In some embodiments, the "UGC/PrimaryIdentifier" data classification label may be associated with a data object that contains, at least in part, one or more of a universally unique identifier (UUID), or the like. In some embodiments, the "UGC/Primary" data classification label may be associated with a data object that contains, at least in part, one or more of a user comment, an application error, a source code repo, an application page, an external content search index, or the like.

In some embodiments, the "UGC/Configuration" data classification label may be associated with a data object that contains, at least in part, one or more of an application workflow configuration, an application issue type definition, space metadata, time metadata (e.g., a date/time stamp, etc.), an application installation, an application permissions configuration, or the like.

The terms "personally identifiable information," "PII," or the like refer to a type of data classification that is associated with a data object that contains personal data associated with one or more users of an application that generated the data object (e.g., user name, e-mail, photo, the like, or combinations thereof). For example, a user of a cloud-based collaboration software can be associated with a user profile particular to at least their instance of the collaboration software. In some embodiments, the user profile comprises an account id and personal information associated with the user (e.g., name, date of birth, e-mail(s), education, etc.). In some embodiments, the personally identifiable information may be associated with one or more sub-classifications of DirectRestrictedIdentifier, DirectRestricted, IndirectRestricted, IndirectConfidential, or the like (e.g., additional custom sub-classifications defined by a user, developer, company, standards organizations, or the like).

In some embodiments, the "PII/DirectRestrictedIdentifier" data classification label may be associated with a data object that contains, at least in part, one or more of a username, a user identifier, an application account identifier, or the like. In some embodiments, the "PII/DirectRestricted" data classification label may be associated with a data object that contains, at least in part, one or more of a first name, a middle name, a surname/last name, a physical address, an e-mail address, a profile picture (e.g., a picture of the user, etc.), a phone number (e.g., landline, pager, cellular, fax, work/business, emergency contact, etc.), or the like. In some embodiments, the "PII/IndirectRestricted" data classification label may be associated with a data object that contains, at least in part, one or more of a team name, date of birth, Internet Protocol (IP) address, credit card expiration date, last four digits of a credit card, or the like. In some embodiments, the "PII/IndirectConfidential" data classification label may be associated with a data object that contains, at least in part, one or more of a company name, an organization name, geolocation data (e.g., country, zip code, time zone, region, etc.), or the like.

The terms "usage related data," "usage data," or the like refer to a type of data classification that is associated with a data object that contains user or application activity data (e.g., logs for interaction inputs, etc.). For example, the interaction received from a user, via at least a user interface of a computing device, associated with a cloud-based collaboration software can be logged by one or more applications. In some embodiments, the usage related data comprises one or more of direct interaction data, indirect interaction data, audit logs, application logs (i.e., data specific to a particular application, for example biometric data for a medical records software or location data for a mapping application), telemetry data, or the like. In some embodiments, direct interaction data may comprise interaction inputs received from a user, via at least a user interface, into an explicit application interface. For example, direct interaction data may include, without limitation, the number of times a user mouse-clicked on a particular graphical interface element associated with an application. In some embodiments, indirect interaction data may comprise interaction inputs received from a user, via at least a user interface, into a computing device associated with an application. For example, indirect interaction data may include, without limitation, the amount of time a user spends viewing particular application content (e.g., a mandatory employee training manual posted by a manager to a cloud-based collaboration software, etc.).

In some embodiments, audit logs can include, without limitation, immutable security audit logs for each user account associated with an application. For example, audit logs may be associated with one or more data objects containing UGC, PII, usage data, or the like for a particular user during each period they are active in a cloud-based collaboration software. In some embodiments, the usage related data may be associated with one or more sub-classifications of DirectAction, IndirectAction, AuditLog, ApplicationLog, or the like (e.g., additional custom sub-classifications defined by a user, developer, company, standards organizations, or the like). In some embodiments, the "Usage/DirectAction" data classification label may be associated with a data object that contains, at least in part, one or more of a user/application interaction, a user/application reaction, publishing content, a user account login, a user account logout, or the like. In some embodiments, the "Usage/IndirectAction" data classification label may be associated with a data object that contains, at least in part, one or more of background analytics, mouse movements, time spent on a particular page, or the like. In some embodiments, the "Usage/AuditLog" data classification label may be associated with a data object that contains, at least in part, one or more of transmission events (e.g., transmitting a data object between computing devices, etc.), receiving events (e.g., receiving a user interaction, receiving a data object, etc.), storing events (e.g., storing data within a data repository, etc.), or the like.

In some embodiments, the "Usage/ApplicationLog" data classification label may be associated with a data object that contains, at least in part, one or more of observability logs (e.g., reports generated for administrative users of a collaboration software, etc.), application usage logs for supporting applications and/or services (e.g., the number of times a user request a particular service for a defined time period, etc.), or the like. In some embodiments, the "Usage/Telemetry" data classification label may be associated with a data object that contains, at least in part, one or more of performance metrics (e.g., processor usage, memory allocation, storage usage, load time, etc.), observability stats (e.g., a number of data objects output by an application, a type of data object output by an application, an average accuracy value for all data objects output by an application over a defined period of time, etc.), or the like.

The terms "security related data," "security data," or the like refer to a type of data classification that is associated with a data object that contains user account credentials (e.g., account password, security question answer, etc.) and/or information that is determined, by a user, application, or organization to be sensitive (e.g., encryption keys, authentication certificates, trade secrets, patient medical information, etc.). In some embodiments, the security related data may be associated with one or more sub-classifications of Credentials, Secret, or the like (e.g., additional custom sub-classifications defined by a user, developer, company, standards organizations, or the like). For example, a government organization that uses a collaboration software may add additional custom sub-classifications for Confidential, Top-Secret, Sensitive Compartmented Information, and Special Access. In some embodiments, the "Security/Credential" data classification label may be associated with a data object that contains, at least in part, one or more of passwords, hashed passwords, encrypted passwords, API tokens, authorization bearer tokens (e.g., security assertions markup language (SAML) tokens, etc.), transport layer security (TLS) certificates, OAuth tokens, commerce tokens (e.g., credit card numbers, etc.), or the like. In some embodiments, the "Security/Secret" data classification label may be associated with a data object that contains, at least in part, one or more of private keys, secure shell (SSH) keys, device certificates, or the like. In some embodiments, the "Security/Secret" data classification label may be associated with a data object that contains sensitive words (e.g., social security number, etc.).

The terms "specific related data," "specific data," "application specific data," or the like refer to a type of data classification that is associated with a data object that contains information specific to a particular application (e.g., cloud-based collaboration software, project and issue tracking software, the like, or combinations thereof). In some embodiments, the application specific data may be associated with one or more sub-classifications of Configuration, Survey, Finance, Static, or the like (e.g., additional custom sub-classifications defined by a user, developer, company, standards organizations, or the like). For example, a mapping organization (e.g., geological mapping company associated with the mining industry) that uses a collaboration software (e.g., to facilitate communication with employees and customers) may add additional custom sub-classifications for Location, Land, Sea, and Topography that allow for data object reporting based on the location and/or type of map associated therewith. In some embodiments, the "Specific/Configuration" data classification label may be associated with a data object that contains configurations for internal resources provided by an application (e.g., collaboration software). For example, the "Specific/Configuration" data classification label may be associated with a data object that contains, at least in part, one or more settings, parameters, and/or configurations for application infrastructure, application feature flags, domain name system (DNS) lookups, account configurations, or the like. In some embodiments, the "Specific/Survey" data classification label may be associated with a data object that contains, at least in part, one or more of a question, a survey, a questionnaire, a satisfaction rating, a ballot, or the like. In some embodiments, the "Specific/Finance" data classification label may be associated with a data object that contains application specific internal financial information. For example, the "Specific/Finance" data classification label may be associated with a data object that contains, at least in part, one or more of a bank account number, a bank account record, a financial report (e.g., earnings report, etc.), an account balance, or the like. In some embodiments, the "Specific/Static" data classification label may be associated with a data object that contains internal resource static assets and/or external resource static assets. For example, the "Specific/Static" data classification label may be associated with a data object that contains, at least in part, one or more of frontend application code, public media, or the like.

The terms "input," "indication," "indication input," "interaction," "interaction input," or the like refer to an identifiable, non-transitory occurrence that has technical significance for system hardware and/or software. In some embodiments, an interaction input may be user-generated via at least a user interface associated with a computing device, such as keystrokes, mouse movements, voice commands, and/or the like. In some embodiments, an interaction input may be application-generated (i.e., automatically and/or dynamically internally generated by an application via at least computing circuitry), such as program loading, compiling a data object, errors, and/or the like. For example, an application function may be caused by, and/or a data object may be generated in response to, a user interface interaction input and/or an internal confirmation interaction input generated by the application or associated computing device(s).

The term "geolocation identifying data object" refers to a data object received from a computing device, associated with one or more applications for device/user tracking and location discovery, that indicates a geolocation of the computing device at a time interval indicated in the geolocation identifying data object and/or at a time interval deemed to be sufficiently close to a time of dispatch and/or a time of receipt of the geolocation identifying data object. Examples of geolocation identifying data objects include data objects that indicate global position system (GPS) coordinates of a data object, or computing device associated therewith, at a particular time. Other examples of geolocation identifying data objects may include data objects that indicate one or more IP addresses associated with an application or service host. In some embodiments, a geolocation identifying data object may be restricted to a predefined level of precision (e.g., in order of decreasing precisions: GPS coordinate, town, region, time zone, etc.).

The term "internal resource" refers to a software program, application, platform, or service that is configured by an organization (e.g., an enterprise owner of a multi-layer service oriented platform) to provide functionality to another one or more of the software programs, applications, platforms, or services operating on a multi-layer service oriented platform, either directly or indirectly, through one or more other services. Internal resources operate on a compiled code base and/or use data repositories that are at least partially shared by other software programs, applications, or services of the multi-layer service oriented platform. In some embodiments, application code bases, service code bases, and code bases that support an internal resource are hosted on common servers or using computing devices operating within a common intranet or network.

In some embodiments, an application or service is configured to communicate with internal resources within a shared architectural programming layer without external network or firewall separation. In some embodiments, an internal resource is used only within the application layer that utilizes the internal resources functionality. An example embodiment of an internal resource is a load balancer configured for routing and mapping API and/or service locations. Internal resources may be configured for information-based shard routing, or in other words, routing and mapping API and/or service locations based on predefined custom service requirements associated with an application. For example, an internal resource may be configured to identify where communication traffic originates from and then collect information, apply data classification labels based on the collected information to any data objects received from the identified traffic source, and/or reply to the communications utilizing another service for reply communication.

The term "external resource" refers to a software program, application, platform, or service that is configured to communicate with applications, services, software programs, and/or devices of a multi-layer service oriented platform but which operates on a compiled code base that is separate from code bases of the multi-layer service oriented platform. In some embodiments, communications between an external resource and an application or service calling the external resource takes place through a firewall and/or other network security features of the multi-layer service oriented platform. The external resource operates on a compiled code base or repository that is separate and distinct from that which supports the application or service of the multi-layer service oriented platform calling the external resource.

The external resources of some embodiments generate data or otherwise provide usable functionality to an application or service calling the external resource. In other embodiments, the application or service calling the external resource passes data to the external resource. In some embodiments, the external resource may communicate with an application or service calling the external resource, and vice versa, through one or more APIs. For example, the application or service calling the external resource may subscribe to an API of the external resource that is configured to transmit data objects. In some embodiments, the external resource receives tokens or other authentication credentials that are used to facilitate secure communication between the external resource and an application or service calling the external resource in view of defined network security features or protocols (e.g., network firewall protocols). An example embodiment of an external resource may include cloud services (e.g., AWS®), credential management services (e.g., Okta®), web browser services (e.g., Google Chrome®), and many others that will be apparent to one of ordinary skill in the art in view of this disclosure.

The term "repository" refers to a database stored on a memory device which is accessible by one or more computing devices for retrieval and storage of one or more data objects, the like, or combinations thereof. The repository may be configured to organize data objects stored therein in accordance with one or more particular data classification labels or other attributes attributed to the data object (e.g., a scoring metric, file size, file type, etc.). For example, a repository may be structured in accordance with one or more data objects associated with one or more services, applications, data classification labels, internal resources, external resources, network functions, APIs, the like, or combinations thereof. In some embodiments, a repository may be at least partially stored on one or more of a server, remotely accessible by a computing device, or on a memory device on-board the computing device.

The term "service data object repository" refers to a database stored on a memory device which is accessible by one or more computing devices for retrieval and storage of one or more of service data objects, labeled service data objects, the like, or combinations thereof. The service data object repository may be configured to organize service objects stored therein in accordance with service data object categories. For example, service data object categories may comprise one or more service data objects associated with one or more applications, services, network functions, APIs, geographical locations, data classification labels, the like, or combinations thereof. In some embodiments, the service data object repository may be stored on a server remotely accessible by a computing device or on a memory device on-board the computing device. The service data object repository may store data objects collected for a particular service (e.g., all data objects associated with an origin identifier unique to a respective service).

The term "application data object repository" refers to a database stored on a memory device which is accessible by one or more computing devices for retrieval and storage of one or more of application data objects, labeled application data objects, the like, or combinations thereof. The application data object repository may be configured to organize application objects stored therein in accordance with application data object categories. For example, application data object categories may comprise one or more application data objects associated with one or more applications, services, network functions, APIs, geographical locations, data classification labels, the like, or combinations thereof. In some embodiments, the application data object repository may be stored on a server remotely accessible by a computing device or on a memory device on-board the computing device. The application data object repository may store data objects collected for a particular application (e.g., all data objects associated with an origin identifier unique to a respective application).

The term "labeled service data object repository" refers to a service data object repository that comprises one or more labeled service data objects.

The term "labeled application data object repository" refers to an application data object repository that comprises one or more labeled application data objects.

The term "data classification label repository" refers to a database stored on a memory device which is accessible by one or more computing devices for retrieval and storage of one or more data classification labels, data classification label descriptions, the like, or combinations thereof. In some embodiments, the data classification label repository may be at least partially stored on one or more of a server, remotely accessible by a computing device, or on a memory device on-board the computing device.

The terms "data classification label accuracy score," "accuracy score," or the like refers to a numerical value associated with (e.g., assigned to, etc.) a data object, or data classification model, with one or more data classification labels associated therewith. The accuracy score may be based on a metric programmatically determined or defined by a comparison between the data object with one or more data classification labels and training data associated with a data classification model. For example, a data object that is associated with the "PII/DirectRestrictedIdentifier" data classification label may be given a higher accuracy score if the data object contains information associated with the "PII/DirectRestrictedIdentifier" label (e.g., user name, a user identifier, an application account identifier, etc.) as defined by at least training data associated with a data classification model.

In some embodiments, data classification labels can be manually, and/or dynamically, added to, and/or removed from, a data object based on a detected increase or decrease in an accuracy score associated with the data object in accordance with the data classification model. For example, a data object may be labeled initially when generated by an application, with a first data classification label(s), and assigned a first accuracy score based on the first data classification label(s). The data object may, for further example, be re-labeled, with a second data classification label(s), if the first accuracy score is below an accuracy score threshold (e.g., 70% accurate, etc.).

Additionally, the data object may be re-scored with a second accuracy score that is further compared to the accuracy score threshold. In accordance with such an example, the data object may be re-labeled and re-scored a plurality of times until a sufficient accuracy score is reached (e.g., above the accuracy score threshold). In some embodiments, the accuracy score for a data object is determined based on historical data associated with the data object. For example, a data object may be re-labeled by a data classification model and the re-labeled data object can be dynamically compared to a previous programmer generated copy of the data object. In some embodiments, differences detected between different instances of a data object may be flagged and presented to a programmer, or the like, by way of a truth interface for further review and correction of historical data.

In some embodiments, data classification label accuracy scores may be compared between data classification models to associate a respective data classification model with a respective data object, service, or the like. In some embodiments, data classification label accuracy scores may be provided for one or more of an ML model, an ExtraTrees classifier, an Adaboost classifier, a randomforest classifier, Naive Bayes (NB) classifier, Logreg classifier, support vector classifier, linear support vector classifier, or the like. For example, a first service may output a data object that is labeled in accordance with a randomforest classifier and an NB classifier. The predicted classification labels provided via the randomforest classifier and the NB classifier may be compared to a test data set and each associated with a respective accuracy score. The randomforest classifier may be, for example, assigned an accuracy score of 0.61 and the NB classifier may be assigned an accuracy score of 0.54 and as therefore the first service may select to utilize the randomforest classifier over the NB classifier. A second service may, for further example, receive an accuracy score of 0.84 with the NB classifier and a 0.25 accuracy score for the randomforest classifier and thus would be better served to utilize the NB classifier. In some embodiments, a confusion matrix may be used to test the precision and/or accuracy of one or more data classification models. In some embodiments, a data classification label accuracy score may be determined for a particular data classification model based on one or more data classification label accuracy scores associated with one or more data objects labeled via the particular data classification model.

The term "historical data" refers to one or more data objects associated with an application or service that comprises one or more of previous iterations of the application or service, outage logs, usage logs, application logs, message persistence, message acknowledgements, message resend attempts, duplicate message eliminations, priority message delivery order, sender delivery status, receiver delivery status, or the like. In some embodiments, historical data may be associated with one or more users (e.g., a log of past interactions with an application/service made by a user or group of users, previous login/logout times, etc.). For example, in a team collaboration software historical data for a user may include posts to a forum made/viewed by the user and/or messages sent to and/or received from other software users.

The term "accuracy score list" refers to a data object that contains one or more of an accuracy score, an accuracy score threshold, the like, or combinations thereof that corresponds to one or more respective data objects.

The terms "accuracy score threshold," "accuracy threshold," or the like refer to a threshold value used to measure the effectiveness of data classification labels associated with a data object to accurately reflect the contents of the data object. The accuracy score threshold may be determined based at least on a predefined threshold value set by a data classification model provider or third party thereto. In some embodiments, the accuracy score threshold may be a dynamically determined threshold value that is programmatically determined. For example, a accuracy score threshold may be initially set by a data classification model provider (i.e., developer, etc.) but as the data classification model receives additional live information (e.g., live data objects with assigned data classification labels and scores associated therewith) the accuracy score threshold may change overtime to match, for example, a moving average accuracy score threshold. In some embodiments, the dynamically determined accuracy score threshold is determined based at least on a plurality of accuracy score thresholds and may be automatically updated periodically and/or dynamically in real-time.

In some embodiments, the accuracy score threshold may be a static or fixed value assigned by one or more of a developer, application user, or the like. In some embodiments, the accuracy score threshold may comprise a range of threshold values (e.g., an upper and lower threshold value, etc.). For example, if an accuracy score falls below a lower accuracy score threshold then the associated data object may be re-labeled and if the accuracy score is above an upper accuracy score threshold then the associated data object may be flagged for use as training data for a data classification model.

The term "data classification label conflict" refers to a conflict between a data classification label associated with a data object and the contents of the data object. The data classification label conflict may be caused by one or more data elements within the data object not being associated with one or more data classification labels associated with the data object. For example, if a data object contains passwords but is only associated with the "UGC/Label" and "UGC/PrimaryIdentifier" data classification labels then a data classification label conflict has occurred. Additionally, an application associated with a data classification model may detect this data classification label conflict and in response apply the "Security/Credential" data classification label to the data object to resolve the detected data classification label conflict. In some embodiments, the data classification label conflict may be detected by a computing device that in response to the detection prevents an application executed by the computing device from using (e.g., reading, opening, transmitting, etc.) the data object associated with the conflict. In some embodiments, the data classification label conflict may be detected by a computing device that in response to the detection transmits a notification (e.g., text message, graphical display, sound alert, etc.) to an application user, developer, or the like. In some embodiments, the data classification label conflict may be detected by a computing device that in response to the detection processes (e.g., reads, perform data cleanup on.) the data object in accordance with a data classification model to associate and/or disassociate one or more data classification labels with the data object.

The term "refresh command" refers to an input which is configured to cause one or more services, applications, portions of computer program code, the like, or combinations thereof executed by, or run on, a computing device to re-run at least a portion of their program code. Additionally, the refresh command may be received by one or more computing devices via a communication interface, a user interface, application programming interface, the like, or combinations thereof. Additionally, the refresh command may be executed as a portion of computer program code in conjunction with a countdown timer such that the refresh command is automatically executed at least once. Additionally, the countdown timer portion of the computer program code may automatically reset after each iteration such that the refresh command is executed periodically. For example, a first application may be configured to dynamically and/or periodically fetch data objects associated with one or more second applications and/or services based on a push message or a pull notification. In some embodiments, a push/pull message may comprise data objects taken from (e.g., generated by, transmitted by, received from, etc.) one or more applications and/or services.

The term "application programming interface pathway" refers to a data object that defines one or more applications that can access, read, store, transmit, receive, or transform a particular data object. In some embodiments, the application programming interface pathway may define one or more of a point of origination (e.g., an application, service, and/or computing device that generated the data object, etc.), a point of termination (e.g., an application, service, and/or computing device targeted for receipt of the data object, etc.), or an intermediary point (e.g., an application, service, and/or computing device that at least temporarily stored the data object during transmission, etc.). For example, the application programming interface pathway may define a first service that generated a data object, a second service that transformed (e.g., added data to, removed data from, etc.) the data object, and an application that received the data object.

The term "truth interface" refers to a user interface configured to render information to a user and receive one or more truth selection indications associated with a determination made by the user based on the rendered information. For example, a support vector classifier may determine one or more candidate data classification labels for association with a vector data object, the one or more candidate data classification labels may be displayed to a user, via the truth interface, as individual graphical interface elements. The user may then click using a mouse or touch interface (i.e., provide an interaction input) to select the candidate data classification label(s) (i.e., the associated graphical interface elements) to assign to the vector data object or the like. In some embodiments, a selection of candidate data classification labels made via a truth interface may be stored as historical data in a labeled service data object corpus associated with a data classification model (e.g., support vector classifier, etc.).

In some embodiments, each candidate data classification label presented via a truth interface can be associated with a binary set of truth selection indications (e.g., a 'confirm' and 'deny' graphical interface element, etc.). For example, a programmer may confirm a first candidate data classification label's assignment to a data object and then deny a second candidate data classification label's assignment to the same data object via a single truth interface. In some embodiments, each candidate data classification label presented via a truth interface can be associated with a plurality of truth selection indication options (e.g., accept a label, delete a label, look up another label, forward to another user via another truth interface, save for later review, etc.). In some embodiments, each candidate data classification label may be rendered via a respective truth interface. In some embodiments, a truth interface may suggest one or more candidate data classification labels to replace a data classification label associated with a data object.

The term "truth selection indication" refers to an interaction input generated by a client device in response to user interaction with a truth interface. In some embodiments, the truth selection indication may provide indication or user confirmation of one or more of an acceptance/rejection of a candidate data classification label, an interaction to cause analysis of the candidate data classification label and data object with another data classification model, an interaction to store the candidate data classification label and data object in a repository (e.g., test data repository, etc.), a note (e.g., a text data object) to be associated with the candidate data classification label, a data object identifier, an origin identifier, another candidate data classification label (e.g., a manually chosen data classification label to be associated with an identified data object), or the like.

The term "data classification label restricted usage notification" refers to a computer renderable user interface indication or message configured to reflect a data object restriction. In embodiments, a data classification label restricted usage notification may be a text based message such as an e-mail, a pop-up message, a short message service (SMS) text message, or the like. The data classification label restricted usage notification defines at least a service data object identifier and a target recipient identifier. The data classification label restricted usage notification may further define a reason that the identified service data object cannot be accessed by, or transmitted to, the identified target recipient (e.g., the service object is associated with a restricted data classification label).

The term "data classification label error notification" refers to a computer renderable user interface indication configured to reflect a classifier error. The data classification label error notification defines at least a service data object identifier and a data classification label. The data classification label error notification may further define a reason that the data classification label should, or should not, be associated with the identified service data object.

The term "permission interface" refers to a user interface configured to render a data classification label restricted usage notification to a user and receive one or more permission selection indications associated therewith. For example, a data classification label restricted usage notification may be rendered with a plurality of graphical user interface elements. The plurality of graphical user interface elements may be configured to at least receive an interaction input to either accept that the identified target recipient cannot access or receive the identified service data object, or allow the identified target recipient to access, or receive, the identified service data object.

The term "permission selection indication" refers to an interaction input received by a permission interface. In embodiments, a permission selection indication may be received from a user interface device (e.g., mouse, touch screen, keyboard, microphone, etc.). In other embodiments, a permission selection indication may be generated internally by a computing device (e.g., a processor, etc.) based on one or more data classification models.

The terms "access control configuration," "service proxy configuration," or similar terms refer to a set of instructions for the communication of a data object. In some embodiments, the access control configuration may be implemented by one or more of a service, a service proxy, an application, or similar software program. In some embodiments, one or more service proxies, associated with one or more access control configurations, are automatically applied to a plurality of services associated with one or more multi-layer service oriented platforms. In some embodiments, the access control configuration may be configured to instruct a service, or the like, to restrict access to (e.g., transmission of, receipt of, storage of, etc.) a data object based on one or more predefined access parameters. In some embodiments, the access control configuration may define the one or more predefined access parameters. In some embodiments, a predefined access parameter may comprise one or more of a data object identifier, a service identifier, an API, a data classification label, or the like. For example, a service identifier may be associated with a particular service or type of service that is not authorized to access personally identifiable information and thus a service associated with the restricted service identifier may not receive data objects associated with the personally identifiable information classification label(s). In some embodiments, one or more access control configurations may be enforced by a service, the like, or portions thereof (e.g., service proxy, etc.), or by another service (e.g., a service sending, receiving, or relaying a data object, etc.). In some embodiments, one or more access control configurations may be enforced by a purpose built service and/or application configured specifically for implementing access control configurations between communicable services and/or applications.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 illustrates an example system architecture 100 within which embodiments of the present disclosure may operate. The example system architecture 100 includes a data classification system 105 configured to interact with one or more client devices, such as client device 102A, client device 102B, and client device 102C. The data classification system 105 may be configured to receive data objects from one or more origination sources (e.g., an application, a service, etc.) or data classification label requests from one or more client devices (e.g., client device 102A, etc.) that include a data object identifier associated with a data object stored in a data object repository (e.g., data object repository 107, etc.). The data classification system 105 may process the data classification label requests to generate one or more candidate data classification label predictions, to generated one or more user interfaces (e.g., a truth interface, etc.), or to dynamically associate a data classification label with a received data object.

The data classification system 105 may be communicably connected to one or more applications, services, servers, computing devices, or remote repositories either directly or indirectly. For example, data classification system 105 may be hosted on a computing device (e.g., data classification server 106) which further includes data object repository 107, as shown in FIG. 1. In some embodiments, the data classification system 105 may comprise access control server 112. In some embodiments, data classification server 106 may at least partially comprise access control server 112. In some embodiments, data classification server 106 and access control server 112 may be a plurality of servers in communication via an intranet, such that access control server 112 and data classification server 106 are internal resources relative to each other. In some embodiments, data classification server 106 and access control server 112 may be a plurality of servers in communication via network 104 such that they are external resource relative to each other. In other embodiments, data object repository 107 may be hosted on a separate server and accessible to the data classification server 106 and/or data classification system 105 via a connection facilitated by network 104 (e.g., local area network, virtual private network, the Internet, etc.). Moreover, the data classification system 105 may transmit or receive data objects, and other communication or interaction inputs, from an application server 108 or from a service server 110. In some embodiments, application server 108 and/or service server 110 may be associated with an application (e.g., enterprise system, cloud storage software, collaboration software, help desk software, or the like) for which data classification system 105 is specifically configured to provide data classification labeling operations. In embodiments, the data classification system 105 may be, at least partially, hosted on application server 108 and/or service server 110.

In some embodiments, the data classification system 105 may be, at least partially, integrated into an application or a service (e.g., such as via a service proxy or the like) and configured with data classification models trained for data objects pertinent to the particular application or service. For example, a collaboration software used by an engineering firm may comprise a data classification model that, through machine learning natural language processing operations, has been trained to recognize engineering terms (e.g., bill of material, schematic, computer aided design (CAD) model, injection molding, etc.). In embodiments, the data classification system 105 may be, at least partially, hosted on data classification server 106 (e.g., a data classification model not regularly accessed by a locally hosted version of the data classification system 105) and accessible to the application server 108 and/or service server 110 via a connection facilitated by network 104. In some embodiments, the data classification system 105 may be a plurality of locally and/or remotely hosted versions of the data classification systems (e.g., versions hosted in particular geolocations to conform to governmental or organizational data residency restrictions, purpose built versions (e.g., natural language processing, security data classification labeling, custom software specific data classification labeling, etc.), back up versions, high performance versions, controlled cost versions, the like, or combinations thereof).

In embodiments, the data classification system 105 may comprise a plurality of data classification models. In embodiments, the data classification system 105 may be distributed across a plurality of computing devices communicably connected with application server 108 and transmitting and/or receiving data objects pertinent to the application hosted thereon. For example, client device 102A, client device 102B, and client device 102C may each locally host a natural language processing data classification model for applying data classification labels to text based data objects generated via the client device and transmitted to the application server 108. Additionally, service server 110 may host a linear support vector classifier for applying data classification labels to data objects generated by the service in response to requests received from the application. Moreover, application server 108 may host a local support vector classifier for data classification of application specific data objects and application configuration data objects. Further, a backup data classification system (e.g., a back instance of the data classification system 105) may be available to client device 102A, client device 102B, and client device 102C, application server 108, and service server 110 that is hosted on data classification server 106. It will be appreciated in light of the present disclosure that such a data classification distribution scheme, and similar distributions, would reduce the overall network traffic required to facilitate data classification label requests to a centralized data classification system (e.g., an centralized server hosted instance of the data classification system 105, etc.) and would allow for more efficient data classification model training since each model is handling particular data objects of more consistent types and substantially similar formatting.

In some embodiments, the data classification model, utilized by data classification system 105, may comprise a classifier application (e.g., support vector classifier, linear support vector classifier, etc.), a data object repository (e.g., containing labeled data object corpus, and a learning algorithm (e.g., natural language processing or machine learning algorithms, etc.). The classifier application may comprise the learning algorithm directly. A support vector classifier, for example, can include supervised learning methods used for data object classification and statistical methods for sorting a data object corpus by way of linear regression and outlier detection (e.g., data objects within the repository that do not conform to aggregate metrics of a respective data object corpus). In embodiments, as a data classification model predicts data classification labels for data objects the metrics associated with a data object corpus may change over time as additional training data is stored to the repository. The learning algorithm, in response to changing data object corpus metrics, can dynamically adjust the data object corpus (e.g., by removing data objects defined as outliers or extreme outliers) to more accurately reflect current data objects and current data classification labels associated therewith.

The data classification system 105, or another network entity (e.g., client device 102B, application server 108, etc.) may be configured to detect the current geolocation of one or more computing devices, data objects (e.g., the hosting device, etc.), the like, or combination thereof. A computing device may transmit or receive location data via geolocation identifying data objects either as independent data objects or as an element within another data object (e.g., the data object requested from a service or a text based data object generated by a user via a client device, etc.). The geolocation identifying data objects provided being deemed relevant to the one or more services, applications, users, or the like identified via the data classification label request.

The data classification system 105 may communicate with the client device 102A, client device 102B, client device 102C, or other network entities (e.g., computing devices communicably connected to network 104), using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, switches, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JavaScript Object Notation (JSON) objects sent via a WebSocket channel. In some embodiments, the protocol is JSON over RPC, JSON over REST/HTTP, the like, or combinations thereof.

The data classification system 105 may include a data classification server 106 and a data object repository 107. The data classification server 106 may be configured to detect, retrieve, transmit, and/or receive data objects. The data classification server 106 may be configured to determine data elements, data classification labels, data classification label accuracy score, data classification label accuracy thresholds, an amount of commonality (e.g., between two data objects or classification labels, etc.), data classification label conflicts, rankings for candidate data classification labels (e.g., based on associated accuracy scores, etc.), data object residency requirements (e.g., geolocation restrictions placed on a data object by an organization or government), application programming interface pathways (e.g., origin identifiers, target recipient identifier, API types, etc.), truth selection indications, the like, or combinations thereof for data objects identified by a data classification label request from one or more computing devices.

The data classification server 106 may be configured to generate one or more data objects (e.g., application data objects, service data objects, vector data objects, etc.), labeled data objects, data object corpus, data classification label sets, data classification label accuracy scores, data classification label accuracy thresholds, ranking lists, data structures, user interfaces (e.g., truth interfaces, permission interfaces, data classification label restricted usage notifications, etc.), the like, or combinations thereof. The data classification server 106 may be configured to generate automatic and dynamic push notification user interfaces (e.g., truth interfaces, permission interfaces, data classification label restricted usage notifications, etc.) for one or more computing devices based on one or more data object attributes (e.g., accuracy score, detected conflicts, data residency requirement, data classification label errors, etc.) comprising information related to the particular data object and the one or more set criteria which may be predefined by one or more computing devices (e.g., client device associated with a system administrator, etc.).

The data object repository 107 may store data associated with one or more service objects associated with the data classification system 105. For example, the data object repository 107 may store data associated with one or more data objects, data object identifiers, the like, or combinations thereof. The data object repository 107 may include one or more storage units, such as multiple distributed storage units that are connected through a computer network. Each storage unit in the data object repository 107 may store at least one of one or more data assets (e.g., data objects and any data associated therewith) and/or one or more data about the computed properties of one or more data assets (e.g., metadata, accuracy scores, etc.). Moreover, each storage unit in the data object repository 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

The data classification server 106 may be embodied by one or more computing systems, such as apparatus 200 shown in FIG. 2. The apparatus 200 may include processor 202, memory 204, input/output circuitry 206, communications circuitry 208, data classification circuitry 210, data object retrieval circuitry 212, and access control circuitry 214. The apparatus 200 may be configured to execute the operations described herein. Although these components (e.g., processor 202, memory 204, etc.) are described with respect to functional limitations, it should be understood that the particular implementations necessarily include the use of particular hardware, software, and/or firmware. It should also be understood that certain of these components (e.g., processor 202, memory 204, etc.) may include similar or common hardware.

For example, two or more sets of circuitry may both leverage use of the same processor, network interface, storage medium, video card, motherboard, or the like to perform their associated functions, such that duplicate hardware is not required for each individual set of circuitry.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The data classification circuitry 210 may be any means such as a device or circuitry embodied in either hardware or a combination of hardware and software that is configured to receive a data classification label request and identify data objects, and data classification labels associated therewith, associated with one or more services, applications, client devices, or the like, each represented by their own respective data object identifier. In some embodiments, the data classification circuitry 210 may be configured to determine data elements, data classification labels, data classification label accuracy score, data classification label accuracy thresholds, an amount of commonality (e.g., between two data objects or classification labels, etc.), data classification label conflicts, rankings for candidate data classification labels (e.g., based on associated accuracy scores, etc.), data object residency requirements (e.g., geolocation restrictions placed on a data object by an organization or government), application programming interface pathways (e.g., origin identifiers, target recipient identifier, API types, etc.), truth selection indications, the like, or combinations thereof for data objects identified by a data classification label request received from one or more computing devices.

The data classification circuitry 210 may be configured to determine one or more of data elements, data classification labels, data classification label accuracy scores, data classification label accuracy thresholds, an amount of commonality (e.g., between two data objects or classification labels, etc.), data classification label conflicts, rankings for candidate data classification labels (e.g., based on associated accuracy scores, etc.), data object residency requirements (e.g., geolocation restrictions placed on a data object by an organization or government), application programming interface pathways (e.g., origin identifiers, target recipient identifier, API types, etc.), truth selection indications, the like, or combinations thereof for data objects detected or retrieved, by the data object retrieval circuitry 212, as being associated with users, services, and/or applications running on a computing device (e.g., by IP address, personally identifiable information, geolocation data, etc.).

The data classification circuitry 210 may be configured to generate one or more data objects (e.g., application data objects, service data objects, vector data objects, etc.), labeled data objects, data object corpus, data classification label sets, data classification label accuracy scores, data classification label accuracy thresholds, ranking lists, data structures, user interfaces (e.g., truth interfaces, permission interfaces, data classification label restricted usage notifications, etc.), the like, or combinations thereof. The data classification circuitry 210 may be configured to generate automatic and dynamic push notification user interfaces (e.g., truth interfaces, permission interfaces, data classification label restricted usage notifications, etc.) for one or more computing devices based on one or more data object attributes (e.g., accuracy score, detected conflicts, data residency requirement, data classification label errors, etc.) comprising information related to the particular data object and the one or more set criteria which may be predefined by one or more computing devices (e.g., client device associated with a system administrator, etc.). In some embodiments, to obtain data objects, or associated data (e.g., origin identifiers, data classification labels, etc.) from one or more computing devices associated with one or more users, services, and/or applications, the data classification circuitry 210 may utilize the communications circuitry 208 to transmit application programming interface (API) calls to one or more API servers associated with the noted computing devices (e.g., via network 104).

The data object retrieval circuitry 212 may be any means such as a device or circuitry embodied in either hardware or a combination of hardware and software that is configured to generate data classification label requests or data object retrieval requests (e.g., from a data object repository). In some embodiments the data object retrieval circuitry 212 is configured to ping (e.g., transmit an interaction input to) one or more computing devices associated with one or more users, applications, and/or services, such as via an internet control message protocol, to receive information related to the one or more data objects, users, applications, services, or computing devices (e.g., data classification label descriptive terms, geolocation data, API pathways, IP addresses, security credentials, encryption keys, etc.). In some embodiments the data object retrieval circuitry 212 is configured to store received information in the data object repository 107 or the like.

The access control circuitry 214 may be any means such as a device or circuitry embodied in either hardware (e.g., data classification server 106, access control server 112, service server 110, or the like) or a combination of hardware and software that is configured to allow or prevent access to a data object by a service, an application, or other network entity (e.g., hardware, software, circuitry, etc.). In some embodiments, access control circuitry 214 may be configured to receive a validation request identifying at least a data object and determine whether to allow access to the data object (e.g., allow a service, or the like, to transmit, receive, or store the data object, etc.). In some embodiments, the access control circuitry 214 may review one or more of a service-to-service allowability, an API-to-API allowability, a data classification label allowability, or the like based on one or more access control configurations (e.g., a set of rules predetermined by an engineer, a regulatory agency, or the like). In some embodiments, access control circuitry 214 may be configured to retrieve, access, update, or modify one or more access control configurations stored in a repository (e.g., data object repository 107, or the like) to determine whether a service, an application, or the like may access a data object. In some embodiments, access control circuitry 214 may be configured to process validation requests for data objects based on constituent data elements of the data object. For example, a service may be permitted to access a time data element and an origination identifier associated with a data object while being restricted from accessing a word data element of the data object. In some embodiments, access control circuitry 214 may be configured to encrypt or delete a data element, for which a service does not have permission to access, before allowing the service to access (e.g., receive, etc.) the data object. In some embodiments, access control circuitry 214 may be configured to generate a new data object comprising only those data elements that a service may be permitted to access. In some embodiments, access control circuitry 214 may comprise one or more service proxies associated with one or more services and/or applications.

In some embodiments, the data object repository 107 may comprise one or more of a single unified repository, a single partitioned repository, or a plurality of isolated repositories comprising one or more partitions (e.g., partitioned hard drives connected via a network, wired circuitry pathways, or the like). An example embodiment of data object repository 107 may comprise separate partitions for isolating sensitive information, for example, classified government data, authentication certificates, or medical data. In embodiments, the data classification model may partition a data object corpus, or repository associated therewith, based on particular data object origin identifiers or other data object attributes. For example, if a sufficiently large number of data objects within a corpus are marked as outliers or extreme outliers by a learning algorithm but the data objects identified are clusters in a statistically non-random group a new data object corpus may be compiled in the repository. In such an example, the new data object corpus may be further reviewed, by a user and/or learning algorithm, for use with one or more subsets of data objects. It will be appreciated, in light of the present disclosure, that subsets of data objects may share an amount of commonality with a larger data object corpus (e.g., all data objects output by a particular service) while also being statistically unique (e.g., all data objects output by a particular service for use by a particular custom application) enough to warrant a separate data object corpus for machine learning purposes.

According to some embodiments, the data object retrieval circuitry 212, with the data classification circuitry 210, determines scores (e.g., data classification accuracy scores, etc.) or conflicts (e.g., data classification label conflicts, etc.) for labeled data objects (e.g., historical data classification labeled data objects, candidate data classification labels predicted for associated data objects, etc.) stored in the data object repository 107 based on the data object received, or generated, at least partially, by the data classification circuitry 210.

The data object retrieval circuitry 212 may be further configured to retrieve data objects, and/or data classification label data, from the data object repository 107 based on the determined scores, or other information (e.g., a threshold value, origin identifier, etc.) associated with one or more data objects. The data object retrieval circuitry 212 may be further configured to retrieve user interfaces, generated by the data classification circuitry 210, that include graphical interaction elements (e.g., "Accept/Decline" graphical element buttons, etc.), accuracy scores, threshold values, or classifications associated with the retrieved data objects representing particular services. The data object retrieval circuitry 212 may also be configured to generate access logs and/or historical data including all information previously retrieved that is associated with a particular application user, computing device, application, service, data object, the like, or combinations thereof.

Historical data may include data classification labeling operation record logs for a particular time interval (e.g., data object identifiers and time stamps for data objects processed by a data classification model for a range of dates and/or times). For example, when the data classification model processes a data object, a classification data structure can be generated in relation to a respective entity (e.g., application, service, user, computing device, etc.) and this may be dynamically updated to include additional data structures each time a data classification label request is processed for a data object. The classification data structure generated for a respective entity may be periodically stored/logged to, for example, the data object repository 107 and marked (e.g., with a data object identifier, etc.) as historical data to be associated with one or more data objects, data classification labels, or respective entities. As the classification data structure is maintained and updated any modifications to the data classification data structure may be recorded with a time data element (e.g., a time stamp include a date, time, time zone, etc.). For example, if a data object is removed or replaced in the classification data structure the time at which this modification occurs would be associated with a respective time data element. This time data element can then be used to review a classification data structure for any given point in time (e.g., a user or system defined time of interest, such as 5:02 PM EST) in the past up to the initial creation time (e.g., the time the classification data structure is first generated and tracking of the data therein begins) associated with the classification data structure.

It is also noted that all or some of the information discussed herein can be based on data that is received, generated, and/or maintained (e.g., monitored by, stored in, transformed by, etc.) by one or more components of apparatus 200. In some embodiments, one or more external systems (e.g., a remote cloud computing and/or data storage system) may also be leveraged to provide, at least partially some of, the functionality discussed herein.

Referring now to FIG. 3, the client devices (e.g., client device 102A, client device 102B, client device 102C, etc.), application server 108, and service server 110, or the like, may be embodied by one or more computing systems, such as apparatus 300 shown in FIG. 3. The apparatus 300 may include processor 302, memory 304, input/output circuitry 306, communications circuitry 308, and geolocation circuitry 310. Although these components (e.g., processor 302, memory 304, etc.) are described with respect to functional limitations, it should be understood that the particular implementations necessarily include the use of particular hardware, software, and/or firmware. It should also be understood that certain of these components (e.g., processor 302, memory 304, etc.) may include similar or common hardware. For example, multiple sets of circuitry may both leverage use of the same processor, network interface, storage medium, or the like to perform their associated functions, such that duplicate hardware is not required for each set of circuitry.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, services, or the like for enabling the apparatus 300 to carry out various functions in accordance with example embodiments of the present disclosure.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry, etc.) capable of performing operations according to an embodiment of the present disclosure while configured accordingly. Alternatively, as another example, when the processor 302 is embodied as an executor of software instructions (e.g., computer program instructions, etc.), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, a camera, and/or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, universal serial bus (USB) ports, and supporting hardware and/or software, or any other device suitable for enabling communications between a plurality of computing devices (e.g., a network). Additionally or alternatively, the communications circuitry 308 may include the circuitry for interacting with the antenna/antennae to cause transmission of signals via the antenna/antennae or to handle receipt of signals received via the antenna/antennae. In some embodiments, the antenna/antennae may be, at least partially, replaced by a wired connection comprising a plurality of cables, wires, or circuitry pathways defining a physical connection between a plurality of computing devices.

The geolocation circuitry 310 may be any means such as a device or circuitry embodied in either hardware or a combination of hardware and software that is configured to report a current geolocation of the apparatus 300. In some embodiments, the geolocation circuitry 310 may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry 310 may be configured to infer an indoor geolocation and/or a sub-structure geolocation of the apparatus 300 using signal acquisition and tracking and navigation data decoding, where the signal acquisition and tracking and the navigation data decoding is performed using GPS signals and/or communication signals (e.g., cellular signals, 4G LTE, 5G, etc.) that may be used to infer a position relative to one or more network access nodes (e.g., cell, antenna, signal extender, etc.) either indoors or outdoors. Other examples of geolocation determination include Wi-Fi triangulation and ultra-wideband radio technology.

Moreover, a plurality of data classification models may be used simultaneously to properly classify all data objects associated with, for example, an application. Separate data classification models may be implemented for the detection and classification of data objects of one or more particular data object types such as geolocation identifying data object generated at least partially by geolocation circuitry 310. For example, IP address data objects have a strict standardized structure (e.g., 112.18.256.2 in IPV4, and 2012:db9:0:4567:0:567:8:3 in IPV6) may be efficiently detected by way of a linear support vector classifier because there would be little or no deviation from the standard data element formats and therefore any outliers detected by the linear support vector classifier could be determined to not be IP address data objects with a sufficiently high level of certainty.

Alternatively, written language does not have a strict standardized structure and may vary widely depending on context, language, subgroup (e.g., a social group, etc.) and dialect. For example, a text based data object (e.g., generated by a user via at least the input/output circuitry 206) or a text based data element in a larger data object (e.g., a collaboration forum page retrieved via communications circuitry 208, etc.), can include a plurality of sentences, words, abbreviations, or the like and thus would require more sophisticated learning algorithms then those used, for example, to detect and classify IP address data objects or GPS coordinate data objects (e.g., generated at least partially by geolocation circuitry 310).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein. In some embodiments, a plurality of computing devices (e.g., apparatus 300, 200, or the like) may be interconnected to provide at least some of the functionality discussed herein.

Example Service Architecture

FIG. 4 illustrates a block diagram of example services in accordance with at least some embodiments of the present disclosure. FIG. 4 illustrates a plurality of services communicably connected, for example, via at least a network and/or internal computing device pathways (e.g., APIs, etc.). It should be appreciated that each of the plurality of services may be configured to communicate with each other in accordance with a default configuration. In some embodiments, this default configuration may be restricted in accordance with one or more access control configurations. In some embodiments, the plurality of services may be associated with a service platform, a service bundle deployment, and/or a particular logical network architecture. In some embodiments, each of the plurality of services may be associated with one or more computing devices, such as, apparatus 200 and/or apparatus 300. For example, service A 402 may be hosted via a first server (e.g., service server 110, or the like) and service B 404 and service C 406 may be hosted together via a second server or other type of computing device (e.g., service server 110, or the like). Moreover, service A 402, service B 404, and service C 406 may be configured to communicate information via data objects between each other, as shown, and certain types of data may be restricted via access controls from one or more of the illustrated services.

For example, service A 402 may be configured to verify e-mail addresses during user registration with a cloud-based application (e.g., a team collaboration software, etc.) and therefore service A 402 is granted access to personally identifiable information (e.g., data objects associated with the "PII/DirectRestricted" data classification label, etc.). In some embodiments, service A 402 may be configured to apply the "PII/DirectRestricted" data classification label to any response messages returned to a requesting application that contain verification details for a request (e.g., verification of an e-mail address, etc.). In contrast, service B 404 and service C 406, for example, may not be authorized to access personally identifiable information according to one or more access control configurations. In accordance with example access control configurations, service A 402 can be configured to prevent transmission of all "PII/DirectRestricted" labeled data objects to either service B 404 or service C 406 while still allowing transmission of non-"PII/DirectRestricted" labeled data objects thereto.

FIG. 5 is a block diagram of an example service architecture in accordance with at least some embodiments of the present disclosure. In some embodiments, service 502 may be associated with one or more apparatuses (e.g., apparatus 200, apparatus 300, etc.) such as a server, for example, service server 110, access control server 112, data classification server 106, or the like, such that service proxy 514 may utilize one or more functionalities attributed thereto. For example functions associated with data classification circuitry 210, data object retrieval circuitry 212, and/or access control circuitry 214, such as the operations described further herein with respect to FIGS. 1-2 and FIGS. 8 and 15-21. In some embodiments, the service proxy 514 may be configured, at least partially, by the access control server 112 and/or data classification server 106 to operate in accordance with an access control configuration. In some embodiments, service 502 is configured in accordance with a service bundle deployment associated with a service platform (e.g., micros platform, or the like). As illustrated, service 502 includes, without limitation, application package 504 that comprises at least the application 506 and a plurality of sidecars (e.g., sidecar 508, 510, 512) and service proxy 514. In some embodiments, application package 504 is the main application package and, as such, contains the main service application (e.g., application 506, or the like) itself and any associated sidecars. In some embodiments, the sidecars are optional additions to the application. It should be appreciated that sidecars (e.g., sidecar 508, 510, 512) are minor applications that get deployed alongside the main application for additional capabilities and/or functionality.

As further illustrated by FIG. 5, service 502 includes service proxy 514 that may be configured for communication with other services (e.g., service A 402, service B 404, and service C 406). The service proxy 514 may be configured as a specialized request proxy that manages ingress and/or egress of all communication traffic for service 502. In some embodiments, service proxy 514 may be configured to receive and/or transmit data objects in accordance with one or more access control configurations. For example, service proxy 514 can be configured in association with at least the data classification system 105, or portions thereof described with respect to FIG. 1-2 (e.g., access control server 112, data object repository 107, data object retrieval circuitry 212, access control circuitry 214, etc.), to apply at least a data classification label to a data object generated by service 502 prior to transmission of the generated data object to another service or application. Moreover, service proxy 514 can be configured in association with at least the data classification system 105, the like, or portions thereof, to read (e.g., scan, analyze, review, process, etc.) any received communication signals (e.g., a data object, or the like) to apply at least a data classification label thereto. In some embodiments, the data classification system 105 may comprise at least an access control configuration to provide instructions, for allowing and/or restricting access to particular data objects based on one or more associated data classification labels, to one or more services (e.g., service 502, or the like). In some embodiments, the access control configuration may be stored separate from the data classification system 105. In some embodiments, service proxy 514 and/or service 502 may be associated with one or more internal resources and/or one or more external resources that, at least partially, provide functionality associated with data classification system 105. In some embodiments, service proxy 514 and/or service 502 may be configured to, at least partially, provide functionality associated with data classification system 105 to one or more internal resources and/or one or more external resources (e.g., another service, service proxy, application, etc.).

FIG. 6A is a block diagram of example services in accordance with at least some embodiments of the present disclosure. As shown in FIG. 6A, service 602A and service 602B may be configured to communicate via their respective service proxies (e.g., service proxy 614A and service proxy 614B respectively). In some embodiments, when services (e.g., 602A, 602B, etc.) are using service proxies to transmit and receive data objects then all data objects communicated between the services may be configured for transmission and/or receipt via the service proxy within each deployed service bundle, as shown in FIG. 6A. Service 602A and/or service 602B may be associated with one or more apparatuses, for example, any embodiment of apparatus 200 described with respect to FIG. 2 or apparatus 300 described with respect to FIG. 3. In some embodiments, service 602A and service 602B may be associated with a single apparatus or a plurality of apparatuses. In some embodiments, service 602A and service 602B may receive or transmit data objects in accordance with data classification system 105.

As shown in FIG. 6A, service proxy 614A may be associated with a local instance of the data classification system (e.g., data classification system 105A). In some embodiments, data classification system 105A may be a portion of a larger architecture associated with data classification system 105. In some embodiments, data classification system 105A may be an equivalent instance of data classification system 105. For example, data classification system 105A may be configured to perform some or all of the functionality described herein with respect to data classification system 105. As further shown in FIG. 6A, service proxy 614B may be associated with a local instance of the data classification system (e.g., data classification system 105B). In some embodiments, data classification system 105B may be a portion of a larger architecture associated with data classification system 105. In some embodiments, data classification system 105B may be an equivalent instance of data classification system 105. For example, data classification system 105B may be configured to perform some or all of the functionality described herein with respect to data classification system 105. In some embodiments, data classification system 105A and/or data classification system 105B may be configured for their respective services. For example, in an instance that service 602A is an email verification service then data classification system 105A may be, at least partially, configured for transmission and receipt of personally identifiable information (e.g., e-mail addresses, etc.).

FIG. 6B is a block diagram of example services in accordance with at least some embodiments of the present disclosure. As shown in FIG. 6B, service 602A and service 602B may be configured to communicate via their respective service proxies (e.g., service proxy 614A and service proxy 614B respectively) utilizing an intermediary entity (e.g., service 602C or the like). As shown, service proxy 614A and service proxy 614B may transmit and/or receive data objects via service 602C. Service 602C may be associated with service proxy 614C which may be associated with data classification system 105, or a portion thereof (e.g., data classification system 105A or the like). For example, a data object transmitted from service 602A may be relayed through access control server 112 and/or data classification server 106 to apply one or more data classification labels and authorize access to one or more data objects based on one or more access control configurations prior to transmission to service 602B. In some embodiments, service 602C may be associated with one or more apparatuses such as apparatus 200 or apparatus 300. For example, service 602C may be associated with one or more servers (e.g., data classification server 106, access control server 112, or the like) as described herein with respect to FIG. 1.

In some embodiments, service proxy 614C may provide, at least partially, features associated with data classification system 105 via service 602C for service 602A, service 602B, the like, or combinations thereof. For example, service proxy 614A may transmit a data object to service proxy 614C. Service proxy 614C may be associated with means (e.g., processor 202, memory 204, access control circuitry 214, etc.) to perform one or more features described herein with respect to, for example, flowchart 800 which is described in further detail below with respect to FIG. 8. Service proxy 614C may authorize service proxy 614A to transmit the data object to service proxy 614B after performing one or more features associated with data classification system 105. In some embodiments, service proxy 614C may separately authorize service proxy 614B to receive the data object from service proxy 614A by performing another one or more features associated with data classification system 105 (e.g., features described further below with respect to flowchart 1500 of FIG. 15, or the like). Once authorization for the transmission and receipt of the data object by the respective services is approved by service proxy 614C then service 602C, or a portion thereof, may transmit the data object to 602B.

In some embodiments, service 602C, or a portion thereof, may authorize service 602A to transmit the data object directly to service 602B without relaying the data object through service 602C. In such embodiments, service 602C may authorize the transmission and receipt of the data object by communicating with service 602A and service 602B without directly receiving the data object identified for transmission. For example, service 602A may provide service 602C with a data object identifier, origin identifier, recipient identifier, and/or other pertinent information associated with the data object identified for transmission to service 602B without transmitting the data object identified for transmission to service 602C. Service 602C may then authorize service 602A to transmit the data object identified for transmission to service 602B, for example, by comparing the data object identifier, origin identifier, recipient identifier, and/or other pertinent information associated with the data object identified for transmission to one or more access control configurations stored in data object repository 107 or the like. In some embodiments, service 602C may simultaneously authorize service 602B to receive the data object identified for transmission. In some embodiments, service 602C may authorize service 602B to receive the data object from service 602A after service 602B provides service 602C with a data object identifier, origin identifier, recipient identifier, and/or other pertinent information associated with the data object received from service 602A.

Exemplary Service Configuration Details

FIG. 7 is a block diagram of an example service proxy architecture in accordance with at least some embodiments of the present disclosure. FIG. 7 further shows an example embodiment of an access control configuration for regulation of service dependencies (e.g., determination of which service may communicate data objects therebetween, etc.) and data object validation (e.g., determine whether a data object may be accessed, sent, and/or received by a service, etc.) that may be used in the service-to-service request authorization workflow. As illustrated, service proxy 614A and service proxy 614B are communicably connected to application 606A and application 606B respectively. Moreover, service proxy 614A and 614B are communicably connected to each other such that data objects may be transferred therebetween.

As further shown, service proxy 614A is communicably connected to access control configuration 702A and service proxy 614B is communicably connected to access control configuration 702B. In some embodiments, access control configuration 702A and access control configuration 702B may comprise data repositories stored within the infrastructure (e.g., service server 110, etc.) associated with their respective associated services (e.g., service 602A, 602B, etc.). In some embodiments, access control configuration 702A and access control configuration 702B may be associated with data repositories stored on one or more computing devices (e.g., apparatus 200, apparatus 300, access control server 112, data classification system 105, or the like) separate from the one or more computing devices (e.g., service server 110, or the like) associated with their respective associated services. In some embodiments, one or more access control rules associated with access control configuration 702A and/or access control configuration 702 may be enforced/executed by one or more embodiments of processor 202, access control server 112, and/or access control circuitry 214.

The access control configuration 702A and access control configuration 702B may be at least partially associated with data object repository 107 of data classification system 105 and may be associated with one or more aspects of data object repository 107 described by the present disclosure (e.g., without limitation, the hardware, software, and functional embodiments described for data object repository 107 may apply equally with respect to access control configuration 702A and access control configuration 702B). In some embodiments, access control configuration 702A and/or access control configuration 702B may be associated with a single repository. For example, access control configuration 702A and/or access control configuration 702B may be associated, at least partially, with partitions of data object repository 107 of data classification system 105. In some embodiments, data object repository 107 of data classification system 105 may comprise a plurality of access control configurations. In some embodiments, access control configuration 702A or access control configuration 702B may comprise a plurality of access control configurations. For example, an access control configuration associated with a respective service may include, without limitation, an access control configuration indicating a set of instructions for transmission of data objects, a set of instructions receipt of data objects, a set of instructions for APIs, a set of instructions indicating restricted services (e.g., blocked recipient services, blocked origin services, etc.), a set of instructions indicating permissible services (e.g., allowed recipient services, allowed origin services, etc.).

In some embodiments, access control configuration 702A and access control configuration 702B may comprise one or more access control configurations for controlling the ingress and/or egress of data objects associated with one or more services. In some embodiments, access control configuration 702A and access control configuration 702B may comprise one or more access control configurations for one or more data classification labels. For example, the "PII/

DirectRestricted" data classification label may have different restrictions and/or allowances than does the "UGC/PrimaryIdentifier" data classification label and, as such, each data classification label may be associated with a respective access control configuration that reflects the different restrictions and/or allowances for each classification label. In some embodiments, access control configuration 702A and access control configuration 702B may comprise a single configuration and/or a single repository, for example, hosted via access control server 112. In some embodiments, a single access control repository may comprise a plurality of partitions or sub-repositories that comprise access control configuration 702A, access control configuration 702B, and/or the like. In some embodiments, access control configuration 702A and access control configuration 702B may comprise additional service proxy information, such as, service settings, identifiers (e.g., IP addresses, etc.), or the like.

FIG. 8 is a flowchart 800 of a request authorization workflow in accordance with at least some embodiments of the present disclosure. FIG. 8 illustrates exemplary processes associated with the request authorization flow performed by, for example, an example service proxy 514, or the like (e.g., service proxy 614A, service proxy 614B, service proxy 614C, etc.), associated with access control server 112, or the like (e.g., access control circuitry 214, etc.), during an outbound request for communications (e.g., transmission of a data object at least partially generated by a service associated with the service proxy, etc.). In some embodiments, one or more process steps associated with flowchart 800 of FIG. 8 may be performed during an inbound request for communications (e.g., authorization to receive a data object, etc.). In some embodiments, one or more process steps associated with flowchart 800 of FIG. 8 may be performed during a request to store communications (e.g., authorization to write a data object, or at least a partial copy thereof, to a repository and/or a non-transitory computer readable medium, etc.).

The flowchart 800, illustrated in FIG. 8, may be performed by, for example, the apparatus 200 or the like (e.g., apparatus 300, etc.) which, in some embodiments, may be embodied by access control server 112 or the like (e.g., a service server 110 associated with access control circuitry 214 and hosting one or more services associated with service proxies that are associated with one or more access control configurations). The apparatus (e.g., access control server 112, etc.), in turn, may include a computer program product, associated with a data classification system 105, comprising a non-transitory computer readable medium storing computer program code executed by at least one or more of processor 202, data classification circuitry 210, data object retrieval circuitry 212, and/or access control circuitry 214. The non-transitory computer readable medium may be configured to store one or more access control configurations and/or operations associated therewith. In some embodiments, the apparatus may comprise one or more apparatuses of a plurality of apparatuses (e.g., data classification server 106, access control server 112, service server 110, application server 108, client device 102A, etc.) associated with one or more multi-layer service oriented platforms.

At block 802, a request for validation is submitted to service proxy 514, or the like, for example, by an associated service executing internal processes (e.g., generating a data object for transmission to an external resource or application, etc.). In some embodiments, the request for validation may be internally generated by service proxy 514 based on a determination that a service associated with service proxy 514 (e.g., service 502 or the like) may be generating, causing transmission of, receiving, reading, writing, retrieving, and/or otherwise interacting with one or more data objects. In some embodiments, the service, or service proxy, will have already applied a data classification label in accordance with one or more data classification models to the generated data object and the service proxy may utilize these one or more data classification labels for selection of an access control configuration. In response to the validation request, the service proxy is configured to load a predefined service configuration (e.g., an access control configuration such as access control configuration 702A, access control configuration 702B, or the like) for the current service bundle, see block 804.

At block 806, the executing service proxy determines if the service-to-service (S2S) transmission and receipt of one or more data objects is allowed for the defined receiving service. For example, the service proxy may check a configuration repository for determining if a first service (e.g., the transmitting service associated with the service proxy) is allowed to transmit the data object to a second service (e.g., the service receiving one or more data objects) based on, for example, a data classification label applied thereto. Moreover, at block 806, the service proxy may further determine if the second service is defined/configured as a dependent service of the first service. In an instance the service proxy determines that the defined S2S communication flow is not permitted the service proxy logic continues to block 806B and then to block 814 because the validation request is subsequently rejected. In an instance the service proxy determines that the defined S2S communication flow is allowed (e.g., based on an access control configuration, or the like) the proxy service logic continues to block 806A and then to block 808. At block 808, the service proxy determines whether the API being called is allowed to be communicated with based on defined configuration parameters. In an instance the API being called is restricted the service proxy logic continues to block 806B and then to block 814 because the validation request is subsequently rejected. In an instance the service proxy determines that the defined API may be communicated with (e.g., to receive the data object transmission, etc.) then the service proxy logic continues to block 808A and further to block 810.

At block 810, the service proxy determines the contents of the data object (e.g., based on at least one or more of a data classification label applied thereto, a scan of the data object, metadata, and/or the like) and based on at least the contents of the data object the service proxy determines whether the data object may be transmitted to the service targeted to receive the data object. In some embodiments, the service proxy determines whether the data object may be received by a respective service associated with the service proxy. For example, the service proxy may determine that the data object is associated with non-sensitive information (e.g., a public website address, etc.) and therefore allows the data object to be transmitted to, or received from, the service. In an instance the data object is determined to be restricted then the service proxy logic continues to block 810B and then to block 814 because the validation request is subsequently rejected (e.g., the data object is blocked from being received or transmitted). In an instance the service proxy determines that the data object may be transmitted or received then the service proxy logic continues to block 812 because the validation request is approved.

It should be appreciated, in light of the present disclosure, that for the request authorization flow to reach approval the S2S, API, and/or data object contents must be checked against a service proxy's associated configuration (e.g., access control configuration, or the like) and each must be approved thereby for communication between the first service and the second service. In some embodiments, the validation request may be processed both by a first service (e.g., the transmitting service) and a second service (e.g., the receiving service) to ensure proper handling of the data object. In some embodiments, the service proxy may further provide information to a centralized computing device to track and maintain data object validation requests, approvals, denials, and/or the like (e.g., data object identifiers, etc.) to map out service-to-service communications and service dependencies.

Exemplary Data Classification Implementation Details

Referring now to FIGS. 9A and 9B, an example data object output by an example application or service is illustrated in accordance with at least some embodiments of the present disclosure. The data object 902 and data object 904 illustrated in FIG. 9A and FIG. 9B respectively may be one or more output data objects generated by an application or a service such as in response to an interaction input received from one or more computing devices. In embodiments, data object 902 and data object 904 may be one or more of an encrypted file, unencrypted file, JavaScript Object Notation (JSON) file, Extensible Markup Language (XML) file, Simple Object Access Protocol (SOAP) file, Hypertext Markup Language (HTML) file, or similar data object file types. In some embodiments, data object 902 and/or data object 904 may be a subset of a larger data object. For example, data object 902 and data object 904 may be metadata tags within a description of a team collaboration software page. For additional example, data object 902 and data object 904 can be programmer comments associated with one or more application configuration files that were added in by a programmer to cause the dynamic application of one or more data classification labels during data classification labeling operations to the larger data object that comprises at least the subset of data object 902 and data object 904.

As illustrated, data object 902, at least partially, includes a company name data element and a "UGC/Label" data classification label data element. Moreover, example data object 904, as depicted, at least partially, includes a policy name data element followed by the "UGC/Label" data classification label data element. In some embodiments, data object 902 and data object 904 may comprise one or more additional data elements including, without limitation, another text based data element, a numerical based data element, an application configuration element, or the like. For example, data object 902 may include specific details related to a particular company in an instance that data object 902 represents an entry in a company's contact directory associated with a team collaboration software application.

In accordance with such an example, data object 902 can include, without limitation, [["Tom's Company", "UGC/Label"], ["Director of Sales", "UGC/Label"], ["Steven Tomson", "PII/DirectRestricted"], ["StevenT@tomscompany.com", "PII/DirectRestricted"], ["37rh4f4h7dh38ry", "Security/Credential"]]. Data object 902 comprises a plurality of information contained in the company directory which is accessible to authorized employees (e.g., users of the collaboration software). As illustrated, data object 902 is formatted into a plurality of data elements within a larger data object. Each data element comprises two sub-data elements the first being the pertinent data to be displayed, for example, via a graphical user interface and the second being the associated data classification label for the preceding data.

For example, in the data element of ["Tom's Company", "UGC/Label"], "Tom's Company" is the data element identified as the "Company name" and is thus associated with the "UGC/Label" for classification within the associated application's repository. Additionally, "Director of Sales" is a position name and is also classified under "UGC/Label," while "Steven Tomson" is the employee's name and is thus classified under "PII/DirectRestricted" along with the identified contact e-mail "StevenT@tomscompany.com." The ["37rh4f4h7dh38ry", "Security/Credential"] data element represents an encryption key utilized, at least in part, by the application to secure the contact details in the directory and ensure that only authorized users can access the sensitive details associated therewith. In some embodiments, similar data elements may be grouped into a single data element to be associated with a single data classification label data element. For example, in such embodiments, the ["Tom's Company", "UGC/Label"] data element and the ["Director of Sales", "UGC/Label"] data element can be combined into ["Tom's Company", "Director of Sales", "UGC/Label"]. Such data element combinations reduce the need for duplicate "UGC/Label" data classification label elements and thus reduce overall data object size and application/service data object read time.

Referring now to FIG. 9C, an example data object (e.g., data object 905) output by an example application or service is illustrated in accordance with at least some embodiments of the present disclosure. Data object 905, of FIG. 9C, illustrates a content data object generated by an application or a service such as in response to an interaction input (e.g., user generated comments associated with a file uploaded to a collaboration page) received from one or more computing devices. In embodiments, data object 905 may be one or more of an encrypted file, unencrypted file, JavaScript Object Notation (JSON) file, Extensible Markup Language (XML) file, Simple Object Access Protocol (SOAP) file, Hypertext Markup Language (HTML) file, or similar data object file types. In some embodiments, data object 905 may comprise one or more data elements (e.g., data object 902 and data object 904).

As shown, data object 905 comprises metadata associated with, for example, user generated comments associated with a file uploaded to a collaboration page. In some embodiments, the comments posted/uploaded to the collaboration page may be one or more of an image title, a subject line, a forum message post, or the like. In some embodiments, data object 905 may comprise the comments and the metadata associated therewith.

As shown, data object 905 comprises metadata divided into at least two portions. The first portion of data object 905 is identified as 'status' metadata via name data element 906A. For example, a status field may be associated with a comment data object and the status types may be one or more of a deleted comment, a current comment, a draft comment, a hidden comment, a public post, or the like. As illustrated in FIG. 9C the enumerated status types are 'current' and 'draft' associated with the first portion of data object 905. The first portion of data object 905 further comprises a description data element 908A that comprises, for example, a programmer comment related to the usage of the status field within the software application (i.e., the collaboration software comprising at least the collaboration page to which the comments are posted). The status metadata of data object 905 further indicates a data type 910 which is shown to be a 'string' (e.g., a sequence of characters). For example, the status field within the collaboration software can be represented by a word associated with a post via a graphical user interface (e.g., the word 'current' or 'draft') and therefore within the associated programming language (e.g., HTML, etc.) the 'status' would be represented by a string data object.

The second portion of data object 905 is identified as a 'comment' via name data element 906B. It should be appreciated, in light of the present disclosure, that the name data element 906B indicates that the data object 905 is metadata associated with a comment data object made by a user and that data object 905 is not necessarily the comment data object itself. Description data element 908B comprises, for example, a programmer's written explanation of what the comment data object is utilized for within the collaboration software. For example, the comment may or may not be applied when files are uploaded to the collaboration page, however, if comments are added they must be added for all files or a user can choose not to specify comments for any of the uploaded files.

In some embodiments, a data classification model (e.g., as described below with respect to FIG. 10) may perform one or more operations using the metadata contained in data object 905 to apply one or more data classification labels to the comment data object (i.e., the data object that data object 905 is metadata thereto). For example, data classification server 106 may utilize a natural language processing algorithm to detect key words in data object 905. For example, the word 'status' in name data element 906A and description data element 908A may be associated with the "Specific/Configuration" data classification label because the status is automatically applied to a user post via the collaboration application's configuration settings. Moreover, for example, the word 'comment' in name data element 906B and description data element 908B may be associated with the "UGC/Label" data classification label (e.g., in a data classification repository, etc.) because the natural language processing algorithm is configured to detect the 'comment' metadata tag as associated with user generated content. Further, the natural language processing algorithm may detect the phrase 'added by a user' within description data element 908B and may further increase the probability that the associated content should be classified under the "UGC/Label" data classification label.

Referring now to FIG. 10, an operational example of a data object vectorization operation performed in accordance with at least some embodiments of the present disclosure is illustrated. The data object vectorization operation may be performed by one or more computing devices (e.g., data classification server 106) associated with a data classification model (e.g., natural language processing). An input data object is depicted in block 1002 and comprises training data configured into a text based data object. The data classification server 106, for example, may parse the data elements from ["company name", "organization name"] into individual recognized words, as depicted in block 1004, ["company", "name", "organization", "name"]. The individually recognized words may then be compared, for example, to descriptive terms found in a vocabulary repository or a data classification label repository.

The data classification server 106 can then generate a vocabulary vector data object as shown in block 1006 to produce a vector data element conforming to a common data structure associated with one or more data classification label repositories. As shown the "company name" and "organization name" are both recognized as being associated with the descriptive terms "A company name parameter" as identified, at least in part, through a data classification label repository. In some embodiments, additional terms may be identified and configured into one or more additional vector data elements. The new text data object is then converted to a simplified vector format, as shown in block 1008, thus producing the [0, 1, 1, 0] vector data object.

It will be appreciated, in light of the present disclosure, that the simplified data format may improve search times, particularly, in an instance a data classification repository is sorted into common data structures. For example, all data elements/objects stored within a data classification repository and identified as containing at least one company name can be associated with a vector data element of the same [0, 1, 1, 0] vector data object containing the same binary values in the same ordered sequence. In some embodiments, the [0, 1, 1, 0] may be associated with, for example, all data object identifiers within a repository that are associate with "UGC/Label" data classification labels because they contain at least one identified company or organization name (e.g., terms associated with the second and third vector element columns). In some embodiments, the [0, 1, 1, 0] vector data element may be differentiated from other vector data elements that may also be associated with the "UGC/Label" data classification label. For example, another type of data object under the "UGC/Label" data classification label can contain a custom emoji name which may be associated with a dissimilar vector data object (e.g., [0, 0, 1, 0]). In some embodiments, the [0, 1, 1, 0] vector data element or the like may be a portion of a larger vector data object.

In some embodiments, under sampling and/or oversampling may be utilized to differentiate between a plurality of data objects that may be associated with the same data classification label. For example, the "UGC/Label" data classification label may be applied to both a custom emoji name and text of a subject line (e.g., in a forum post, etc.). The number of custom emoji names may be a much smaller portion of the total number of data objects labeled under the "UGC/Label" data classification label and to reduce the probability that the custom emoji name data objects are not mislabeled (e.g., due to a lack of comparability with the subject line data objects, etc.) oversampling may be utilized to increase the custom emoji name data objects within a test data set for equivalent sampling. In some such embodiments, undersampling may be applied to the test data set to reduce the proportion of subject line data objects within the UGC/Label" data classification label test data.

Referring now to FIGS. 11A and 11B, multiple operational examples are illustrated for data classification label predictions applied to data objects in accordance with at least some embodiments of the present disclosure. Block 1102 of FIG. 11A illustrates org-policy predictions as executed by, for example, data classification server 106 configured with an example data classification model. The data classification server 106, as shown, generates, at least partially via an example API, data classification predictions associated with one or more of "PII/DirectRestricted," "PII/DirectRestrictedIdentifier," "UGC/Primary," "UGC/Label," and "UGC/PrimaryIdentifier."

The predictions may be associated with a received data object output by a service or application (e.g., data object 902, data object 904, etc.) that is processed with a data classification model trained using training input data (e.g., the input data object depicted in block 1002 of FIG. 5). Block 1104 of FIG. 11B illustrates the removal of the "PII/DirectRestrictedIdentifier" and a duplicate "UGC/Label" data classification label. Block 1104 further shows that the processed data object is associated with the "UGC/

PrimaryIdentifier" and "UGC/Label" data classification labels predicted via the operations illustrated in block 1102 of FIG. 11A.

Exemplary Word Association Distributions

Example embodiments of the present disclosure provide for a data classification label accuracy score that may be determined based on an F-score measure of a plurality of data objects associated with a data classification model (e.g., generated training data sets, etc.). For example, during a binary classification analysis, the F-score may be used to measure the accuracy of a data classification model based on a plurality of data objects labeled by the data classification model. In some embodiments, the data classification model may be measured via the F-score using a precision value and a recall value associated with a plurality of data objects labeled by the data classification model. The precision value may be a ratio of true positives ($t_p$) to all predicted positives ($t_p+f_p$), including false positives ($f_p$). The precision value may be represented as: precision=$(t_p)/(t_p+f_p)$.

In some embodiments, the recall value is the ratio of true positives ($t_p$) to all actual positives ($t_p+f_n$), including false negatives ($f_n$). The recall value may be represented as: recall=$(t_p)/(t_p+f_n)$. The plurality of data objects utilized by the F-score may be at least a partial sample of data objects labeled by the data classification model. The sample of data objects labeled by the data classification model may be selected based on one or more predefined criteria (e.g., data objects labeled within a particular time period, associated with a particular data classification label, associated with a particular word and/or word frequency, etc.). In some embodiments, the sample of data objects labeled by the data classification model may be selected based on one or more word distribution charts (e.g., as described in further detail below with respect to FIGS. 12-14).

In some embodiments, the F-score may be determined via one or more associated formulas. For example, the F-score may be calculated via the formula of: $F_\beta=(1+\beta^2)$(precision·recall)/[$(\beta^2$·precision)+recall], wherein $\beta$ is a positive real number (e.g., 1, 2, 3, etc.). The F-score may be an $F_2$-score, wherein $\beta$ is equal to 2.

It should be appreciated, in light of the present disclosure, that the $F_2$-score may be more suitable to determine a measure of an accuracy score associated with a particular data classification model, or the like (e.g., a particular type of data object, data classification label, etc.). The $F_2$-score may be advantageous for applications where it is more important to correctly determine as many positive samples as possible instead of maximizing the total number of correctly labeled data objects. For example, it may be more important to determine all of the data objects properly labeled for the correct reason via a data classification model instead of determining a total number of data objects properly labeled via the data classification model because the total number of data objects properly labeled may include a subset of data objects properly labeled based on an incorrect determination.

Moreover, the total number of data objects properly labeled may include false positives or data objects that were incorrectly labeled but incorrectly determined to be properly labeled (e.g., via human error, via an inaccurate data classification model, etc.).

In some embodiments, the one or more words (e.g., "email," "receives," etc.) associated with the data object and utilized to apply the "PII/DirectRestricted" data classification label may be contained within the data object or within metadata (e.g., programmer commentary, etc.) associated with the data object. For example, the word count frequency information of word distribution chart 1200 shown in FIG. 12, reflecting the number of occurrences of words associated with the "PII/DirectRestricted" data classification label (e.g., via one or more user interaction inputs or the like), may be used by a data classification model to determine whether to apply the "PII/DirectRestricted" data classification label to data object 905 as shown in FIG. 9C. In some embodiments, the information shown in exemplary word distribution chart 1200, or the like, may be stored as part of data classification system 105 (e.g., in a repository therewith) and updated periodically based on iterative cycles of a machine learning pipeline process.

For example, a natural language processing algorithm may scan a data object, or associated data objects (e.g., metadata, etc.), and utilize one or more discovered words (e.g., "email," etc.) as an input. The one or more discovered words are then processed by the natural language processing algorithm and compared to the repository containing, at least partially, the information shown in exemplary word distribution chart 1200, and/or the like (e.g., exemplary word distribution chart 1300, 1400, etc.). In an instance the discovered word (e.g., "email") is identified in association with a data classification label based on accuracy score information, or the like, (e.g., determined at least partially based on exemplary word distribution chart 1200, or the like) and the discovered word has a sufficient accuracy score (e.g., above a predefined threshold value) the data classification label may be applied. For example, if "email" is discovered in a data object and the predefined threshold value, associated with the natural language processing algorithm, is 70% then the "PII/DirectRestricted" data classification label may be applied based on the word "email" having an 78% accuracy score in relation to the "PII/DirectRestricted" data classification label. In some embodiments, an accuracy score may be at least partially determined based on word count frequency information of one or more word distribution charts.

FIG. 12 illustrates an exemplary word distribution chart 1200 for the "PII/DirectRestricted" data classification label in accordance with some embodiments of the present disclosure. As shown in FIG. 12 the top 20 words (e.g., listed along the x-axis) are listed from highest frequency to lowest frequency (e.g., listed along the y-axis showing the number of occurrences of particular words) for association with the "PII/DirectRestricted" data classification label. The frequency of a word associated with a data classification label (e.g., "PII/DirectRestricted" or the like) may be determined, for example, based on one or more user interaction inputs received via a user interface associated with a client device or the like. Moreover, the frequency of a word associated with a data classification label (e.g., "PII/DirectRestricted" or the like) may be dynamically determined based on at least an internally generated determination (e.g., via a processor based on one or more predefined trigger conditions or learning models, etc.). For example, a data classification label (e.g., "PII/DirectRestricted" or the like) may be associated, or disassociated, with a data object associated with a particular word (e.g., "email" or the like) after reviewing (e.g., scanning, reading, parsing, etc.) the data object, or metadata associated therewith, for particular data elements (e.g., "@" and ".com" or the like) and determining that one or more of the particular data elements are present, or absent, from the data object or metadata associated therewith.

FIG. 13 illustrates an exemplary word distribution chart 1300 for the "UGC/Primary" data classification label in accordance with some embodiments of the present disclosure. As shown in FIG. 13 the top 20 words (e.g., listed along the x-axis) are listed from highest frequency to lowest frequency (e.g., listed along the y-axis showing the number of occurrences of particular words) for association with the "UGC/Primary" data classification label category. For example, exemplary word distribution chart 1300 may be configured to represent the top 20 most frequently input words associated with the "UGC/Primary" data classification label that were previously indicated (e.g., received via a client device input, etc.) by a programmer or engineer (e.g., to configure training data, in response to a truth interface, etc.) during a particular time period (e.g., past month, past year, etc.). In some embodiments, a plurality of words may be associated with the same word frequency value. In some embodiments, a word distribution chart (e.g., described herein with respect to FIGS. 12-14 or the like) may comprise any word distribution (e.g., top 20, 50, or 100 most frequently used words, least frequently used words, or the like) associated with a data classification label category (e.g., "UGC/Primary" or the like). For example, a user upon manually reviewing training data (e.g., via a truth interface or the like) associated with a client device may mark (e.g., indicate a selection via user interaction inputs, etc.) the word "project," or a data object associated therewith, a total of two times, within the past week, for association with the "UGC/Primary" data classification label and this information may be rendered for display via one or more word distribution charts (e.g., 1200-1400 or the like) or interfaces associated with embodiments of data classification system 105.

FIG. 14 illustrates an exemplary word distribution chart 1400 for the "UGC/Label" data classification label in accordance with some embodiments of the present disclosure. As shown in FIG. 14 the top 20 words (e.g., listed along the x-axis) are listed from highest frequency to lowest frequency (e.g., listed along the y-axis showing the number of occurrences of particular words) for association with the "UGC/Label" data classification label. For example, exemplary word distribution chart 1400 may be configured to represent the top 20 most frequently input words associated with the "UGC/Label" data classification label that were previously indicated (e.g., received via a client device input, etc.) by a programmer or engineer (e.g., to configure training data, in response to a truth interface, etc.) during a particular time period (e.g., past month, past year, etc.). In some embodiments, exemplary word distribution chart 1400, or the like (e.g., 1200, 1300, etc.), may be utilized to generate training data sets for one or more data classification labels. In some embodiments, a frequency associated with a particular word may be dynamically determined (e.g., by embodiments of data classification system 105 associated with a client device or the like) based on one or more of a user interaction input, an internally generated determination (e.g., via a processor based on one or more predefined trigger conditions or learning models, etc.), or the like. For example, a user via a truth interface associated with a client device may mark the word "names" a total of seven times for association with the "UGC/Label" data classification label within the past month and this metric may be reflected in one or more word distribution charts (e.g., 1200-1400 or the like). In some embodiments, one or more word distribution charts may be generated for non-word based data elements. For example, one or more word distribution charts may be generated to reflect the frequency of symbols (e.g., "@" or the like), numbers, or the like associated with a data classification label.

FIG. 15 illustrates a flowchart 1500 associated with a machine learning pipeline workflow in accordance with some embodiments of the present disclosure. In some embodiments, the flowchart 1500 may utilize data from one or more word distribution charts (e.g., 1200, 1300, 1400, or the like) to process a data object (e.g., in accordance with a natural language processing algorithm or the like) and associate one or more data classification labels therewith in accordance with, for example, embodiments of data classification system 105.

Flowchart 1500, illustrated in FIG. 15, may be performed by, for example, the apparatus 200 or the like (e.g., apparatus 300, etc.) which, in some embodiments, may be embodied by data classification server 106 or the like (e.g., access control server 112, etc.). The apparatus, in turn, may include a computer program product, associated with a data classification system 105, comprising a non-transitory computer readable medium storing computer program code executed by at least one or more of processor 202, data classification circuitry 210, and/or data object retrieval circuitry 212. In some embodiments, the apparatus configured to execute features of flowchart 1500, or steps thereof, may be configured with access control circuitry 214 that may be configured to operate in accordance with one or more access control configurations or operations associated therewith. In some embodiments, the apparatus may comprise one or more apparatuses of a plurality of apparatuses (e.g., data classification server 106, access control server 112, service server 110, application server 108, client device 102A, etc.) associated with one or more multi-layer service oriented platforms.

The process shown in flowchart 1500 begins at block 1508 where the data ingestion service of data classification system 105 receives input information from one or more of load balancer logs 1502, API tracing system 1504, or diagnostics 1506. In some embodiments, one or more of load balancer logs 1502, API tracing system 1504 (e.g., API traces or the like), or diagnostics 1506 may be incorporated into data classification system 105. The data ingestion service compiles the information provided via the one or more input sources and outputs a compiled data object, see block 1510. At block 1512, the compiled data object is parsed into individual words such as described above with respect to FIG. 10. Once the compiled data object is parsed into individual data elements the parsed individual data elements are stored, such as in a data object repository, see block 1514. In some embodiments, the parsed individual data elements may be associated with or added into one or more training data sets. At block 1516, the exemplary apparatus (e.g., 200, etc.) executing the processes of the flowchart further reads the training data set associated with the parsed individual data elements. In accordance with the training data set a tokenizer processes the parsed individual data elements, see block 1518. At block 1520, the parsed individual data elements are vectorized, by the tokenizer, and one or more vector data objects are produced for one or more of the individual data elements.

The one or more vector data objects are processed by a linear support vector model, or another data classification model algorithm, at block 1522. The linear support vector model, or the like, based on the received one or more vector data objects then makes a prediction for which data classification labels should be applied to the one or more vector data objects, see block 1524. At block 1528, one or more data classification labels are applied to the one or more vector data objects based on the data classification model predictions. In some embodiments, data classification labels are applied to the one or more vector data objects further based on additional review of one or more of the data classification labels, associated data objects, or the like. For example, an engineer may perform a manual review of the predicted data classification label(s) applied to one or more vector data objects at block 1526.

In some embodiments, the review of classifications (e.g., at block 1526) may be carried out by another data classification model (e.g., a randomforest classifier, etc.). In some embodiments, one or more data classification review processes associated with block 1526 may be associated with data classification system 105 (e.g., via a user interface, programmatically via another data classification model, etc.). At block 1530, incorrectly applied data classification labels may be removed (e.g., based on an engineer's review of the data classification labels, a programmatic review of the data classification labels, etc.) from the vector data object to generate training data. The updated training data set, or newly generated training data set, may be applied to the data store, see block 1514. The data store application then stores and/or updates the training data, see block 1532. At block 1534, the new and/or updated training data is stored as part of one or more training data sets (e.g., associated with data object repository 107, an access control configuration, or the like).

Exemplary User Interface Configurations

FIGS. 16A and 16B each illustrate an exemplary interface, each configured in accordance with at least some embodiments of the present disclosure. The exemplary interfaces shown with respect to FIGS. 16A and 16B may be renderable via one or more display devices associated with one or more computing devices. For example, graphical user recommendation data classification accessibility interface 1600A of FIG. 16A and graphical user recommendation acceptance data classification accessibility interface 1600B of FIG. 16B may be configured to display via a liquid crystal display associated with client device 102A or the like.

In some embodiments, graphical user recommendation data classification accessibility interface 1600A and/or graphical user recommendation acceptance data classification accessibility interface 1600B may be associated with one or more apparatuses described herein with respect to FIGS. 1-3. In some embodiments, graphical user recommendation data classification accessibility interface 1600A and/or graphical user recommendation acceptance data classification accessibility interface 1600B may be associated with one or more features described herein with respect to a truth interface and/or a permission interface. In some embodiments, graphical user recommendation data classification accessibility interface 1600A and/or graphical user recommendation acceptance data classification accessibility interface 1600B may be associated with one or more of a service, an application, or a data classification system 105 (e.g., access control server 112, data classification server 106, data object repository 107, etc.) to facilitate one or more features described herein with respect to flowchart 800, flowchart 1500, example process 1700, example process 1800, example process 1900, example process 2000, the like, or combinations thereof.

As shown in FIG. 16A, graphical user recommendation data classification accessibility interface 1600A is associated, without limitation, with a plurality of graphical interface elements. The plurality of graphical interface elements comprises a title element 1602, an API pathway element 1604, a response data type recommendations element 1606, a response data type recommendations user input element 1606A, an API pathway element 1608, a request data type recommendations element 1610, a request data type recommendations set element 1612, a request data type recommendations user input element 1612A, 1612B, 1612C, 1612D, and an update user input element 1614.

In some embodiments, graphical user recommendation data classification accessibility interface 1600A may be displayed to a user via a display device in response to one or more determinations associated with a data classification system 105. For example, an administrator, via a client device, may input one or more search criteria related to one or more keywords of a cloud collaboration software associated with a multi-layer service oriented platform and, upon receipt of the one or more search criteria, the client device may render one or more results via graphical user recommendation data classification accessibility interface 1600A, based upon at least a determination of data objects associated with the one or more search criteria. The one or more search criteria may be associated with one or more of a keyword, a user identifier (e.g., a username or the like), an origin identifier, a data object identifier, a target recipient identifier, a data classification label, or the like.

As shown, graphical user recommendation data classification accessibility interface 1600A is illustrated with a title element 1602 that displays the title as "Recommendations" to inform the user that data classification system 105 has made one or more determinations in relation to the results retrieved in response to the user's input (e.g., the one or more search criteria). The API pathway element 1604 displays the API pathway associated with the user input requesting one or more search criteria (e.g., keyword, identifier, time, etc.) and one or more response results (e.g., one or more data objects associated with a collaboration software page such as a Confluence® page, etc.). In some embodiments, a respective graphical user interface (e.g., graphical user recommendation data classification accessibility interface 1600A, etc.) may be generated and rendered/displayed for each response result of a plurality of response results (e.g., data objects associated with one or more Confluence® pages, etc.). A respective response result may include without limitation one or more of a user identifier (e.g., a user name or the like), an origin identifier, a data object identifier, a target recipient identifier, a data classification label, or the like that is programmatically identified (e.g., by the API pathway associated therewith, etc.) and/or retrieved from an associated repository by the data classification system 105 in response to one or more user inputs received via graphical user recommendation data classification accessibility interface 1600A or the like.

The response data type recommendations element 1606 is associated with the data classification labels recommended by the data classification system 105 and with the response data type recommendations user input element 1606A. As shown, the recommended data classification label is "UGC/Primary" as determined, at least partially, by the data classification system 105. The response data type recommendations user input element 1606A may be configured to receive one or more user inputs via input/output circuitry 306 (e.g., mouse, keyboard, touchscreen, microphone, or the like). For example, a user associated with the client device of graphical user recommendation data classification accessibility interface 1600A may provide a positive input (e.g., mouse click once to enter a check mark to accept the recommendation), a negative input (e.g., mouse click twice to enter an X-mark to reject the recommendation), or a neutral input (e.g., leave the box unmarked to passively accept the recommendation) via the response data type recommendations user input element 1606A.

In some embodiments, the positive input, the negative input, and/or the neutral input may be associated with one or more of a truth selection indication input or a permission selection indication input. In some embodiments, response data type recommendations element 1606 may be associated with one or more of a user identifier, an origin identifier, a data object identifier, a target recipient identifier, a data classification label, or the like and the response data type recommendations user input element 1606A may be configured to receive a positive input, a negative input, or a neutral input, via a client device associated with a user, that causes the data classification system 105 to authorize or restrict (e.g., allow or deny, etc.) access to a data object (e.g., by one or more services, applications, or users, etc.).

The API pathway element 1608 displays the API pathway associated with the user input requesting one or more requested search criteria (e.g., Confluence® page title and content terms, etc.) and one or more response results (e.g., one or more data objects associated with a Confluence® page title and content, etc.). The request data type recommendations element 1610 indicates one or more data classification labels for association with the one or more response results (e.g., one or more data objects associated with a Confluence® page title and content, etc.). The one or more data classification labels for association with the one or more response results are illustrated as request data type recommendations set element 1612 which indicates additional and/or alternative data classification labels (e.g., "UGC/Primary," "UGC/Label," "UGC/PrimaryIdentifier," "PII/IndirectRestricted," etc.) for association with one or more response results or portions of response results (e.g., page content, page title, identifier, geographic location, or the like). In some embodiments, the request data type recommendations set element 1612 may be at least partially defined by data classification system 105 and/or a user defined input (e.g., via a keyboard, repository lookup and selection via a mouse, etc.).

In some embodiments, the request data type recommendations set element 1612 may be associated with one or more of a user identifier, an origin identifier, a data object identifier, a target recipient identifier, or the like. The request data type recommendations set element 1612 may be retrieved from a repository (e.g., dynamically from a data classification label repository by at least data classification system 105, etc.) in response to one or more user inputs. The request data type recommendations user input element 1612E may receive a user interaction input (e.g., via a mouse, touchscreen, keyboard, etc.) that facilitates a user to further edit a data classification label associated therewith (e.g., render a plurality of alternative data classification labels to select, facilitate freestyle typing via a keyboard of a data classification, etc.). It should be appreciated, in light of the present disclosure, that the request data type recommendations user input element 1612E, or the like, may facilitate the correction, updating, or editing of incorrectly recommended data classification labels by a user (e.g., programmer, administrator, engineer, system operator, etc.), such as via a truth interface that is generated and rendered to the user in response to an interaction received by the request data type recommendations user input element 1612E or the like. The request data type recommendations user input element 1612E may be associated with one or more of a user interface, a repository, a client device, or the like configured to facilitate the rendering and selection of one or more data objects and/or data classification labels for association therewith.

For example, a user may disagree with one or more data classification labels indicated via the request data type recommendations set element 1612 (e.g., data classification labels dynamically selected by the data classification system 105, etc.), such as the "PII/IndirectRestricted" data classification label associated with the {geo location} and the request data type recommendations user input element 1612E. The user may then provide a user interaction input associated with one or more data classification labels, for example, the user interaction input may be associated with a window/menu that allows the user to select one or more data classification labels from a repository for association with the {geo location}. For example, the user may utilize the request data type recommendations user input element 1612E to replace the recommended "PII/IndirectRestricted" data classification label with the "PII/DirectRestricted" data classification label or the like.

In response to receipt of the user interaction input associated with one or more data classification labels and/or the request data type recommendations user input element 1612E, the data classification system 105 may cause the request data type recommendations set element 1612 to render, or re-render, in accordance with the user interaction input associated with one or more data classification labels, for example, such that the user may further provide a truth selection indication input or the like. In some embodiments, response data type recommendations element 1606 may be associated with a request data type recommendations user input element 1612E to facilitate user edits to the recommended data classification label.

The request data type recommendations user input element 1612A, 1612B, 1612C, and 1612D are each associated with a respective additional and/or alternative data classification label (e.g., "UGC/Primary," "UGC/Label," "UGC/PrimaryIdentifier," "PII/IndirectRestricted," etc.) indicated by request data type recommendations set element 1612.

The request data type recommendations user input element 1612A, 1612B, 1612C, and 1612D may be configured to receive one or more user inputs via input/output circuitry 306 (e.g., mouse, keyboard, touchscreen, microphone, or the like). For example, a user associated with the client device of graphical user recommendation data classification accessibility interface 1600A may provide a positive input (e.g., mouse click once to enter a check mark to accept the recommendation), a negative input (e.g., mouse click twice to enter an X-mark to reject the recommendation), or a neutral input (e.g., leave the box unmarked to passively accept the recommendation) via each of the request data type recommendations user input element 1612A, 1612B, 1612C, and 1612D.

In some embodiments, the positive input, the negative input, and/or the neutral input may be associated with one or more of a truth selection indication input or a permission selection indication input. Once the user associated with the client device of graphical user recommendation data classification accessibility interface 1600A has made one or more selections via the graphical user recommendation data classification accessibility interface 1600A the user may accept the associated configurations by providing an input (e.g., a mouse click, etc.) via an update user input element 1614. In some embodiments, the data classification system may automatically update one or more recommendations of graphical user recommendation data classification accessibility interface 1600A based on an internal determination via processor 202 (e.g., after a predefined amount of time has passed after display of graphical user recommendation data classification accessibility interface 1600A, etc.). For example, if a user does not provide truth selection indication input, or the like, within a predefined time threshold then the data classification system 105 may be configured to automatically update a repository (e.g., data classification label repository, data object repository, etc.) to reflect the automatic recommendations indicated via the response data type recommendations element 1606. In some embodiments, if a user does not provide, for example, a truth selection indication input, or the like, within a predefined time threshold then the data classification system 105 may be configured to automatically re-render graphical user recommendation data classification accessibility interface 1600A, or the like, at a later time based on a predefined time interval (e.g., after 1 hour, after 24 hours, etc.) or based on a determination of a predefined criteria (e.g., when a user next logs into an application associated with the data classification system 105, etc.).

As shown in FIG. 16B, graphical user recommendation acceptance data classification accessibility interface 1600B is associated, without limitation, with a plurality of graphical interface elements. The plurality of graphical interface elements comprises a title element 1616, an API pathway element 1618, an accepted response data types element 1620, an API pathway element 1622, an accepted request data types element 1624, an accepted data types set element 1626, an accept user input element 1628, and an edit user input element 1630.

In some embodiments, graphical user recommendation acceptance data classification accessibility interface 1600B may be displayed to a user via a display device in response to one or more determinations associated with a data classification system 105. In some embodiments, graphical user recommendation acceptance data classification accessibility interface 1600B may be displayed via a display device associated with a client device in response to the user providing an input (e.g., a mouse click, etc.) via an update user input element 1614 of graphical user recommendation data classification accessibility interface 1600A. As shown in FIG. 16B, graphical user recommendation acceptance data classification accessibility interface 1600B includes without limitation a title element 1616 that displays the title as "Recommendations Accepted" to inform the user that one or more of the recommendations of data classification system 105 are accepted in response to the user's input (e.g., received via an update user input element 1614). The API pathway element 1618 displays the API pathway associated with the accepted recommendations indicated by the user input requesting the one or more search criteria (e.g., keyword, identifier, time, etc.) and the one or more response results (e.g., a collaboration software page such as a Confluence® page, etc.). In some embodiments, a respective graphical user interface (e.g., graphical user recommendation acceptance data classification accessibility interface 1600B, etc.) may be generated and displayed for each response result of a plurality of response results (e.g., multiple data objects associated with one or more Confluence® pages, etc.).

The accepted response data types element 1620 is associated with the data classification labels accepted by the user via the data classification system 105 (e.g., recommended and updated via at least graphical user recommendation data classification accessibility interface 1600A). As shown, the accepted data classification label is "UGC/Primary" as determined, at least partially, by the data classification system 105. The API pathway element 1622 indicates the API pathway associated with the one or more requested search criteria (e.g., one or more data objects associated with a Confluence® page title and content terms, etc.) and one or more response results (e.g., one or more data objects associated with a Confluence® page title and content, etc.). The accepted request data types element 1624 indicates one or more accepted data classification labels associated with the one or more response results (e.g., one or more data objects associated with a Confluence® page title and content, etc.).

The one or more accepted data classification labels for association with the one or more response results are indicated via accepted data types set element 1626 which indicates the additional and/or alternative data classification labels (e.g., "UGC/Primary" and "UGC/Label") accepted (e.g., via graphical user recommendation data classification accessibility interface 1600A) for association with one or more indicated data objects. In some embodiments, the accepted data types set element 1626 may be at least partially defined by data classification system 105 and/or a user defined input (e.g., via a keyboard, etc.). Once the user associated with the client device of graphical user recommendation acceptance data classification accessibility interface 1600B has reviewed the one or more accepted selections via the graphical user recommendation acceptance data classification accessibility interface 1600B the user may accept the associated configurations by providing an input (e.g., a mouse click, etc.) via the accept user input element 1628.

Moreover, the user associated with the client device of graphical user recommendation acceptance data classification accessibility interface 1600B may provide an input to the edit user input element 1630 and transition to (e.g., to edit and/or update such as via request data type recommendations user input element 1612E or the like) another graphical user interface (e.g. a previously displayed instance of graphical user recommendation data classification accessibility interface 1600A, a newly rendered instance of graphical user recommendation acceptance data classification accessibility interface 1600B, or the like) to provide further updates, recommendations, or the like via one or more user inputs. In some embodiments, the data classification system may automatically accept the one or more associated configurations of graphical user recommendation acceptance data classification accessibility interface 1600B based on an internal determination via processor 202 (e.g., after a predefined amount of time has passed after display of graphical user recommendation acceptance data classification accessibility interface 1600B, etc.).

In some embodiments, graphical user recommendation data classification accessibility interface 1600A and/or graphical user recommendation acceptance data classification accessibility interface 1600B may be configured to display one or more access control configuration elements (not shown). For example, graphical user recommendation data classification accessibility interface 1600A may indicate one or more graphical user interface elements representative of a data object identifier, an origin identifier, a recipient identifier, and/or other pertinent information associated with one or more data objects. In such embodiments, the user associated with the client device of graphical user recommendation data classification accessibility interface 1600A and/or graphical user recommendation acceptance data classification accessibility interface 1600B may indicate one or more user inputs to at least partially allow or block the data object associated with the indicated data object identifier from being transmitted, received, retrieved, and/or stored by one or more services, applications, or the like (e.g., in accordance with flowchart 800, flowchart 1500, or other embodiments of data classification system 105 described herein).

Moreover, graphical user recommendation data classification accessibility interface 1600A and/or graphical user recommendation acceptance data classification accessibility interface 1600B may be configured to, for example, receive, via processor 302, one or more user inputs via input/output circuitry 306 (e.g., mouse, keyboard, touchscreen, microphone, or the like) associated with client device 102A or the like. In some embodiments, graphical user recommendation data classification accessibility interface 1600A and/or graphical user recommendation acceptance data classification accessibility interface 1600B may be configured, upon receipt of one or more user inputs by an associated client device associated with at least a user, to cause an association between a data object and a data classification label. For example, a data object may be associated, via a data classification system, with a particular data classification label within a data object repository in response to a user input received by a client device via graphical user recommendation data classification accessibility interface 1600A. A data classification system may be authorized to associate (e.g., write, copy, link, etc.) the data object associated with the data classification label to another data object repository associated with an application (e.g., a Confluence® page for access by one or more Confluence® users, etc.) in response to a user input received by a client device via graphical user recommendation acceptance data classification accessibility interface 1600B.

In some embodiments, graphical user recommendation data classification accessibility interface 1600A and/or graphical user recommendation acceptance data classification accessibility interface 1600B may be configured, upon receipt of one or more user inputs by an associated client device, to cause a disassociation between a data object and a data classification label. For example, a data object may be removed (e.g., deleted, unlinked, etc.) from a particular labeled data object corpus associated with a particular data classification label within an associated repository (e.g., data classification label repository, etc.) based, at least partially, on a user input received by a client device via graphical user recommendation data classification accessibility interface 1600A. In some embodiments, graphical user recommendation data classification accessibility interface 1600A and/or graphical user recommendation acceptance data classification accessibility interface 1600B may be configured, upon receipt of one or more user inputs by an associated client device, to cause the data classification system 105 to grant or restrict access (e.g., provide authorization, etc.) to one or more portions of an application (e.g., Confluence® page, a data object configured for transfer to one or more services, etc.) by one or more users, applications, services or the like.

In some embodiments, access may be granted to, or restricted from, one or more of an application, a user, a service, or the like with respect to one or more portions of an application or data object. For example, a data object accessible to one or more users via a Confluence® page may be associated with a "Security/Secret" label and, upon detection of the "Security/Secret" label and/or a request to access the data object (e.g., a user providing input to open the associated Confluence® page, etc.), a data classification system may render graphical user recommendation acceptance data classification accessibility interface 1600B, via a display device, to an administrative user. The administrative user may review the data object, the associated Confluence® page, or other associated information and determine to replace the "Security/Secret" label with a "UGC/Label" label. Thus, the administrative user may provide one or more inputs via graphical user recommendation acceptance data classification accessibility interface 1600B that causes the data classification system to disassociate the data object with the "Security/Secret" label and associate the data object with the "UGC/Label" label within a repository associated with the Confluence® page. Moreover, the removal of the "Security/Secret" label from association with the data object can cause the associated Confluence® page, or other portion of the application, to render the data object to one or more users upon receipt of one or more user inputs from the one or more users.

In some embodiments, graphical user recommendation acceptance data classification accessibility interface 1600B may be configured to receive a selection via a user input to allow one or more users to access a data object while maintaining a data classification label. For example, graphical user recommendation acceptance data classification accessibility interface 1600B may be configured to identify a restricted Confluence® page, one or more users, and a data object associated with the "Security/Secret" label to an administrative user via one or more graphical user interface elements. The graphical user recommendation acceptance data classification accessibility interface 1600B may be further configured to receive from the administrative user a user input to allow or deny access to the restricted Confluence® page and/or data object associated with the "Security/Secret" label by the one or more users. In some embodiments, a user profile may be programmatically updated, or otherwise altered, by an application, (e.g., Confluence®, etc.) in response to an interaction input received via graphical user recommendation acceptance data classification accessibility interface 1600B to allow or deny access to one or more portions of the application (e.g., a restricted Confluence® page, etc.). In some embodiments, an access control configuration may be programmatically updated, or otherwise altered, by an application or service (e.g., associated with data classification system 105, a service proxy, etc.) in response to an interaction input received via graphical user recommendation acceptance data classification accessibility interface 1600B to allow or deny access to one or more portions of the application or service (e.g., a data object, etc.) by one or more services or the like.

Exemplary Implementation Operations and Signal Diagrams

FIGS. 17A and 17B illustrate exemplary operations for the determination of data classification labels associated with data objects, for use with embodiments of the present disclosure. FIG. 17A is a flowchart diagram of an example process 1700, for associating data classification labels with a data object by way of a data classification model, in accordance with a data classification system 105. FIG. 17B illustrates a signal diagram for example process 1700 described with regards to FIG. 17A. Via the various operations of process 1700, the data classification server 106, or the like, of the data classification system 105 can enhance efficiency and effectiveness of data classification architectures and better conform to data classification labeling requirements for proper data object monitoring and distribution (e.g., security of sensitive data, etc.) by dynamically determining any pertinent relationships between data object contents and one or more data classification schemes.

The flowchart diagram, illustrated in FIG. 17A, showing the example process 1700 may be performed by, for example, the apparatus 200 or the like (e.g., apparatus 300, etc.) which, in some embodiments, may be embodied by data classification server 106 or the like (e.g., access control server 112, etc.). The apparatus, in turn, may include a computer program product, associated with a data classification system 105, comprising a non-transitory computer readable medium storing computer program code executed by at least one or more of processor 202, data classification circuitry 210, and/or data object retrieval circuitry 212. In some embodiments, the apparatus configured to execute process 1700, or steps thereof, may be configured with access control circuitry 214 that may be configured to operate in accordance with one or more access control configurations or operations associated therewith. In some embodiments, the apparatus may comprise one or more apparatuses of a plurality of apparatuses (e.g., data classification server 106, access control server 112, service server 110, application server 108, client device 102A, etc.) associated with one or more multi-layer service oriented platforms.

The process 1700 begins at operation 1702 when the data classification server 106 retrieves one or more data objects from a data object repository (e.g., 107), wherein the one or more data objects each comprise a data object identifier, an origin identifier, and one or more text based data elements. In embodiments, the retrieved data object may be transformed, at least partially, in accordance with one or more data cleaning operations (e.g., parsing, data element removal, tokenization of word elements, etc.). At operation 1704, the data classification server 106, parses the one or more text based data elements into a plurality of word based data elements. In some embodiments, operation 1704 may further comprise removal of one or more stop word based data elements (e.g., a period, comma, underscore, space, etc.).

In some embodiments, operation 1704 may further comprise generation of a second plurality of word based data elements. The second plurality of word based data elements may comprise only lower case text and may be used as an alternative to the first plurality of word based data elements in applicable operations. At operation 1706, the data classification server 106, generates a vector data object from the plurality of word based data elements, the vector data object comprising one or more vector data elements. At operation 1708, the data classification server 106, maps the vector data object to a trained data classification vector data set, such as stored in a labeled/trained data object corpus, to determine a data classification label for the vector data object. At operation 1710, the data classification server 106, updates a labeled data object repository to associate the data classification label for the vector data object with the plurality of word based data elements, the data object identifier, and the origin identifier.

For example, the data classification server 106, in accordance with an example embodiment of process 1700, retrieves a data object from a queue that holds all outbound messages generated via a user interface. The queue (e.g., an outbound messages mailbox) may be configured as a partition of a data object repository associated with a client device (e.g., client device 102A, etc.) connected to a cloud collaboration software via a network (e.g., 104). The data classification server 106 then parses the text message stored in the retrieved data object into individual word based data elements (e.g., a tokenization process). The message in the data object is "Please review the budget" and is parsed into individual elements of "Please," "review," "the," "budget." The parsed word based data elements are then converted into a vector format and are compared to a data classification label repository of descriptive terms to identify pertinent words and remove stop words (e.g. "the"). The vector data object generated is [please, review, the, budget] and is further vectorized as [0, 1, 0, 1] because "review" and "budget" are identified as relevant terms according to a natural language processing data classification model associated with financial terminology.

The terms "review" and "budget" are then mapped to trained data classification vector data objects containing the same or similar terms. Based on the data classification labels associated with the trained data classification vector data objects one or more candidate data classification labels are selected for the retrieved data object (e.g., the message data object text message containing "Please review the budget"). The retrieved data object may be further analyzed by the data classification model based on its origin identifier (e.g., the user account associated with the message or the associated client device), or for example its target recipient identifier (e.g., an accounting department project page in the collaboration software), to better understand the context of the message. The data classification model then determines that the retrieved data object is user generated content (UGC) and assigns the "UGC/Primary" to the data object because it contains a user comment without other personally identifiable, security, or other types of information. The data classification server 106 may then update the appropriate data classification repository associated with the cloud collaboration software (e.g., allow the data object to post to a discussion board, update the training data utilized to determine the label, etc.). Additionally, the data classification server 106 may apply an appropriate accuracy score to the labeled data object.

For additional example, the data classification server 106, in accordance with an example embodiment of process 1700, may utilize a natural language processing data classification model to parse a text based data element containing physical address details. In accordance with such embodiments, individual words may be assigned accuracy score values associated with particular data classification labels. For example, the data classification server 106 may associate the word "street" with the "PII/DirectRestricted" data classification label because there is a sufficiently high probability (e.g., greater than or equal to 90%) that a text message data object containing the word "street" will contain a physical address. Moreover, the example data classification model can, in response to the word "street," further search for descriptive terms within the text data object that increase the likelihood of a physical address being present when used in conjunction with "street," for example, the data classification model may be cause to search for a string of numbers (e.g., a zip code 12345-6789, or a street number #456 Walnut Street). As additional associated terms are detected (e.g., detecting a city name, a zip code, the term "my address is," etc.) the probability that the data object contains a physical address may be increased by the data classification model (e.g., from 90% to 99%). In embodiments, the data classification model may only predict or apply data classification labels when a certain threshold percentage is met (e.g., 95% probable certainty or greater).

In embodiments, natural language processing data classification models may predict data classification labels based on one or more of the order of parsed words, the combination of parsed words, word context, or the like. For example, a collaboration team member may post to a companywide forum "My address is in the company directory but not my Social Security Number." The natural language processing data classification model may be configured to detect "My address is" to identify "PII/DirectRestricted" data objects but does not automatically assign this label because no additional word based elements are detected that would provide the physical address of the employee which is targeted by the "PII/DirectRestricted" label. Moreover, the natural language processing data classification model may confirm that "PII/DirectRestricted" label is not appropriate by further analyzing the context of the "My address is" term in the context of "My address is in the company directory." The term "is in the company directory" may provide an indication to the natural language processing algorithm that the subject of interest "My address" is only being identified by the user as being in another location and that the address data is not present in the current text based data object (i.e., the forum post).

Additionally, the term "Social Security Number" may be detected and cause a search for a numerical data element (e.g., 123-123-1234, 1231231234, ****** 1234, etc.) that follows one or more known social security number formats. Even though the term "Social Security Number" is associated by the data classification model with the "Security/Secret" label, the "Security/Secret" label is not applied because an actual social security number is not detected. Moreover, the natural language processing data classification model may confirm that "Security/Secret" label is not appropriate by further analyzing the context of the "Social Security Number" term in the context of "not my Social Security Number."

The order of words in a text based data object may provide further context for natural language processing. For example, "I live at 3 Roses Road" can be identified as an address because of the order and format and the indicator word "Road" present in the sentence. The natural language processing model may be configured to, at least partially, identify a physical address as a number (e.g., "3") followed by a word or name (e.g., "Roses") followed by a specific indicator word (e.g., road, Rd., street, St., lane, Ln., etc.). Further, the term "I live at," which precedes the ordered address data element(s), may be determined, by the natural language processing model, based on historical data associated with providing physical address information to increase the probability of a sentence to contain a physical address. In embodiments, detection of one or more of a word, combination of words, or order of words or term may increase or decrease a probability (e.g., data classification label accuracy score) that a particular data classification label will be selected as a candidate data classification label for a particular data object.

FIGS. 18A and 18B illustrate exemplary operations associated with the detection of data object classification label errors associated with data objects, for use with embodiments of the present disclosure. FIG. 18A is a flowchart diagram of an example process 1800, for detecting and transmitting a notification to a user (e.g., system administrator, etc.) that associates one or more data classification labels and data objects with a data classification error, in accordance with a data classification system 105. FIG. 18B illustrates a signal diagram for example process 1800 described with regards to FIG. 18A. Via the various operations of process 1800, the data classification server 106, or the like, of the data classification system 105 can enhance efficiency and effectiveness of data classification architectures and better conform to data classification labeling requirements for proper data object monitoring and distribution (e.g., security of sensitive data, etc.) through the dynamic detection, notification, and correction of mislabeled data objects. In some embodiments, the notification and information associated (e.g., any user interaction inputs received in response thereto) therewith may be stored as historical data to further train a data classification model and prevent future data classification label errors of the same or similar type.

The flowchart diagram, illustrated in FIG. 18A, showing the example process 1800 may be performed by, for example, the apparatus 200 or the like (e.g., apparatus 300, etc.) which, in some embodiments, may be embodied by data classification server 106 or the like (e.g., access control server 112, etc.). The apparatus, in turn, may include a computer program product, associated with a data classification system 105, comprising a non-transitory computer readable medium storing computer program code executed by at least one or more of processor 202, data classification circuitry 210, and/or data object retrieval circuitry 212. In some embodiments, the apparatus configured to execute process 1800, or steps thereof, may be configured with access control circuitry 214 that may be configured to operate in accordance with one or more access control configurations or operations associated therewith. In some embodiments, the apparatus may comprise one or more apparatuses of a plurality of apparatuses (e.g., data classification server 106, access control server 112, service server 110, application server 108, client device 102A, etc.) associated with one or more multi-layer service oriented platforms.

The process 1800 begins at operation 1802 when the data classification server 106 retrieves a labeled data object from a data object repository, wherein the labeled data object comprises a data object identifier, an origin identifier, one or more text based data elements, and a first data classification label set. At operation 1804, the data classification server 106, parses the one or more text based data elements into a plurality of word based data elements. At operation 1806, the data classification server 106, generates a vector data object from the plurality of word based data elements, the vector data object comprising one or more vector data elements. At operation 1808, the data classification server 106, maps the vector data object to a trained data classification vector data set to determine a second data classification label set for the vector data object. At operation 1810, the data classification server 106, determines at least one missing data classification label defined by the second data classification label set and not defined by the first data classification label set. At operation 1812, the data classification server 106, generates a data classification label error notification based on the at least one missing data classification label, wherein the data classification label error notification comprises the service data object identifier, the origin identifier, and the at least one missing data classification label. At operation 1814, the data classification server 106 may be further configured to transmit the data classification label error notification to one or more computing devices, wherein the data classification label error notification is renderable via one or more display devices associated with the one or more computing devices.

For example, the data classification server 106, in accordance with an example embodiment of process 1800, retrieves, for example randomly or semi-randomly, a data object from an application server (e.g., 108) or a repository associated therewith. The random, or semi-random, retrieval of data objects associated with an application (e.g., a help desk incident tracking software) may be performed periodically as a quality control measure implemented by the application management team (e.g., developer team) to ensure the proper data classification labels are being applied. The data object retrieved may, at least partially, contain a customer satisfaction survey response filled out by a customer that was helped by a help desk employee (i.e., a help desk incident tracking software user). In such an embodiment, the data object may comprise a plurality of numerical values associated with known questions such that the numerical values may be compared to a survey database in vector form because each vector element position is associated with a known question.

For example, questions may be measured on a scale from 1 to 10, wherein 1 is least satisfactory and 10 is most satisfactory, and a customer satisfaction survey response data object may be in a vector format of [9, 8, 10, 10, 9] wherein each response value corresponds to five known survey questions stored in a repository. The customer satisfaction survey response data object may further comprise a text message portion for a written explanation. For example, the written customer explanation may be "Very satisfied with Representative Steven." The data classification server 106, in accordance with, for example, operation 1804 to operation 1814, may process and determine that the customer satisfaction survey response data object is incorrectly labeled as "PII/IndirectRestricted" and "Security/Credential." The data classification server 106 then generates a data classification label error message that indicates the customer satisfaction survey response data object identifier and that the "PII/IndirectRestricted" was applied to vector elements [9, 8, 10, 10, 9] because they were previously misread as an IP address. The notification may further indicate that the text elements were improperly processes and stored as a single word element "verysatisfiedwithrepresentativesteven" which was mislabeled as "Security/Credential" because the extended string of characters were interpreted as a password because it could not be matched to any known word databases.

The data classification label error notification may also indicate the correct label, determined based on the most updated data classification model, should be "Specific/Survey." The classification label error notification may be transmitted to a system administrator or developer via a client device along with a truth interface to automatically correct the classification error identified. Upon receipt of a truth selection indication from the system administrator or developer, the data classification server 106 updates the appropriate application repository (e.g., survey database) and data classification label repositories (e.g., labeled data object corpus).

In some embodiments, the truth selection indication may provide indication of one or more of an acceptance/rejection of a candidate data classification label, an interaction to cause re-analysis of the data object (e.g., using another data classification model, etc.), an interaction to cause storage of the candidate data classification label with the data object identifier in a repository (e.g., test data repository, etc.), a note (e.g., a text data object), a data object identifier, an origin identifier, an alternative candidate data classification label (e.g., selected by the user, alternatively generated by a data classification model, or a data classification label with a different accuracy score, etc.), or the like.

In embodiments, the data classification model, or application/service associated therewith, may provide a notification (e.g., e-mail, text message, graphical user interface, or the like) to a user (e.g., application administrator, data classification model developer, service provider, etc.) to prompt receipt of an indication of whether to associate a data classification label with a data object. For example, if a data classification threshold is set to 90% and a data classification model predicts a data classification label to a probability (e.g., a data classification accuracy score, or the like) of 89.67% then the data classification model, or program associated therewith, may transmit a truth interface to a computing device associated with one or more users. The one or more users, via the truth interface and associated computing device(s), can transmit a truth selection indication to the data classification model, or the associated program.

In embodiments, a truth interface may be generated if an accuracy score associated with a candidate, or predicted, data classification label is within a range of an accuracy score threshold value (e.g., +/−5% of the threshold value. For example, a truth interface may be generated to prompt user review of a candidate, or predicted, data classification label because a threshold value is defined as 85% (e.g., by a data classification model developer, or a running average determined from aggregated historical data, etc.) and the predicted accuracy score of the model is determined to be 88.4%.

FIGS. 19A and 19B illustrate exemplary operations associated with the generation of data object/data classification label notifications based on data object distribution events (e.g., the transmission of a "Security/Credential" labeled data object to an unsecured environment, such as a public webpage) associated with data objects, for use with embodiments of the present disclosure. FIG. 19A is a flowchart diagram of an example process 1900, for detecting a distribution event and transmitting a notification to a user (e.g., system administrator, etc.) that associates one or more data classification labels and data objects with a data classification label restricted usage notification, in accordance with a data classification system 105. FIG. 19B illustrates a signal diagram for example process 1900 described with regards to FIG. 19A. Via the various operations of process 1900, the data classification server 106, or the like, of the data classification system 105 can enhance efficiency and effectiveness of data classification architectures and better conform to data classification labeling requirements for proper data object monitoring and distribution (e.g., security of sensitive data, etc.) through the dynamic detection, notification, and correction of incorrectly distributed data objects.

The flowchart diagram, illustrated in FIG. 19A, showing the example process 1900 may be performed by, for example, the apparatus 200 or the like (e.g., apparatus 300, etc.) which, in some embodiments, may be embodied by data classification server 106, access control server 112, the like, or combinations thereof. The apparatus, in turn, may include a computer program product, associated with a data classification system 105, comprising a non-transitory computer readable medium storing computer program code executed by at least one or more of processor 202, data classification circuitry 210, data object retrieval circuitry 212, and/or access control circuitry 214. The non-transitory computer readable medium may be configured to store one or more access control configurations and/or operations associated therewith. In some embodiments, the apparatus may comprise one or more apparatuses of a plurality of apparatuses (e.g., data classification server 106, access control server 112, service server 110, application server 108, client device 102A, etc.) associated with one or more multi-layer service oriented platforms.

The process 1900 begins at operation 1902 when the data classification server 106 receives an interaction input from a computing device, wherein the interaction input defines at least a data object identifier and an application programming interface pathway. At operation 1904, the data classification server 106, retrieves a labeled data object from a data object repository based on the data object identifier, wherein the labeled data object comprises the data object identifier and a data classification label set. At operation 1906, the data classification server 106, determines a target recipient identifier for the labeled data object based on the application programming interface pathway, wherein the target recipient identifier is one or more of a computing device, a service, an application, or a data object repository. At operation 1908, the data classification server 106, generates a data classification label restricted usage notification based on the data classification label set for the labeled data object and the target recipient identifier, wherein the data classification label restricted usage notification comprises the data object identifier, at least one data classification label of the data classification label set, and the target recipient identifier. At operation 1910, the data classification server 106 may be configured to transmit the data classification label restricted usage notification to one or more computing devices, wherein the data classification label restricted usage notification is renderable via one or more display devices associated with the one or more computing devices.

For example, the data classification server 106, in accordance with an example embodiment of process 1900 retrieves a data object from a queue (e.g., stored in a partition of a repository) that holds all outbound messages generated by an application to request functionality from one or more services. The queue (e.g., an outbound data object set) may be configured as a partition of a data object repository associated with an application server (e.g., 108) connected to a cloud collaboration software via a network (e.g., 104). The application may be configured to receive an approval from a third entity (e.g., the data classification server 106) before transmitting the outbound data objects to, for example, one or more service servers (e.g., 110). The data classification server 106, based on the retrieved data object, determines an origin identifier, a target recipient identifier and one or more data classification labels associated with the retrieved data object identifier (e.g., by cross-referencing the data object identifier with a labeled data object repository). A first retrieved data object is determined to be associated with the "Specific/Configuration" data classification label because the first retrieved data object contains a domain name system (DNS) lookup request. The target recipient identifier is further determined, by data classification server 106, to be a DNS lookup service and based on a cross-referencing the target recipient identifier with a service data object repository is determined to be an approved target recipient of "Specific/Configuration" data objects. Therefore, the data classification server 106 allows (e.g., by transmitting an internally generated permission selection indication) the application server to transmit the first retrieved data object to the target recipient specified.

Additionally, a second data object is retrieved by data classification server 106 from the outbound queue. The same target recipient identifier is associated with the second retrieved data object but a "Security/Credential" is applied to the second retrieved data object. The data classification server 106 determines that the target recipient service is not authorized to receive "Security/Credential" labeled data objects and the transmission permission request for the second retrieved data object is denied by the data classification server 106 (e.g., by transmitting an internally generated permission selection indication to the application server). In some embodiments, the data classification server 106 may perform secondary operations, triggered in response to the denial indication. For example, the data classification server 106 may analyze the second retrieved data object in accordance with process 1800 and subsequently generate a data classification label error notification if the second retrieved data object was incorrectly labeled. In such embodiments, the data classification server 106 may automatically resubmit the second retrieved data object to the outbound queue for further processing with process 1900 after the proper data classification labels have been applied to the second retrieved data object.

In accordance with another example embodiment of process 1900, a notification may be generated, based at least on the detection of one or more data classification labels, and transmitted to an associated system user (e.g., collaboration software administrator, etc.). For example, a system (e.g., a team collaboration software, help desk incident tracking application, or the like) may monitor externally received data objects (e.g., from a service, etc.), or internally generated data objects (e.g., automatically generated based on internally executed procedures, generated in response to user interactions, etc.), for association with a predefined data classification set (e.g., a predefined list of data classification labels) to generate one or more system notifications (e.g., security violation messages, offensive language warning messages, usage data based reports, etc.). For example, a system user may request a report for all user generated content (e.g., publicly posted messages, system pages they previously viewed, etc.) associated with their user account (e.g., an origin identifier associated with the user account). As an additional example, a system administrator for a service desk and incident management software suite may request a report of all incidents handled by a particular help desk employee and sorted based on particular key terms identified in the employee's incident notes. In such an example, the data object containing the incident notes would be associated with data classification labels based on the contents of the notes allowing the system administrator to, via a user interface, define data classification labels for detection to include in the requested report.

FIGS. 20A and 20B illustrate exemplary operations associated with data object request authorizations, such as those described with respect to a request authorization workflow of FIG. 8, for use with embodiments of the present disclosure. FIG. 20A is a flowchart diagram of an example process 2000 for making determinations based on at least a validation request interaction input as to whether one or more services, or the like (e.g., applications, etc.), are authorized to transmit, receive, retrieve, and/or store a data object (e.g., associate with a data classification label, a particular service, an API, etc.), in accordance with a data classification system 105. FIG. 20B illustrates a signal diagram for example process 2000 described with regards to FIG. 20A. Via the various operations of process 2000, the access control server 112, or the like, of the data classification system 105 can enhance efficiency and effectiveness of data object transmissions associated with one or more multi-layer service oriented platforms. Further, the access control server 112 can better conform to data restriction requirements associated with proper data object monitoring and distribution through the dynamic detection, allowance or restriction (e.g., in whole or in part), and transmission of data objects between services of multi-layer service oriented platforms.

The flowchart diagram, illustrated in FIG. 20A, showing the example process 1900 may be performed by, for example, the apparatus 200 or the like (e.g., apparatus 300, etc.) which, in some embodiments, may be embodied by access control server 112 or the like (e.g., a service server 110 associated with access control circuitry 214 and hosting one or more services associated with service proxies that are associated with one or more access control configurations). The apparatus (e.g., access control server 112, etc.), in turn, may include a computer program product, associated with a data classification system 105, comprising a non-transitory computer readable medium storing computer program code executed by at least one or more of processor 202, data classification circuitry 210, data object retrieval circuitry 212, and/or access control circuitry 214. The non-transitory computer readable medium may be configured to store one or more access control configurations and/or operations associated therewith. In some embodiments, the apparatus may comprise one or more apparatuses of a plurality of apparatuses (e.g., data classification server 106, access control server 112, service server 110, application server 108, client device 102A, etc.) associated with one or more multi-layer service oriented platforms.

In some embodiments, the operations described with respect to the example process 2000 may be at least partially carried out by a service proxy (e.g., service proxy 514, service proxy 614A, service proxy 614B, etc.) associated with one or more services. For example, a data object may be transmitted between two services each configured with a service proxy associated with the necessary hardware (e.g., processor 202, etc.) and software (e.g., access control configuration, etc.). The transmitting service (e.g., the service sending the data object) may be configured with a transmitting service proxy that determines whether the data object may be transmitted based on an access control configuration. The recipient service (e.g., the service receiving the data object) may be configured with a recipient service proxy that determines whether the data object may be received, read, or stored in association with the recipient service based on an access control configuration. In some embodiments, an intermediary service (e.g., a go-between service, a relay service, etc.) may be configured to receive a data object from a first service, make one or more determination based on the data object and an access control configuration, and then transmit/block the data object with respect to transmission to the second service.

The process 2000 begins at operation 2002 when the access control server 112 comprising means, such as processor 202, memory 204, input/output circuitry 206, communications circuitry 208, data object retrieval circuitry 212, data classification circuitry 210, and/or the like, for receiving a validation request interaction input from a first computing device, wherein the validation request interaction input defines at least a data object identifier, a first service identifier, and a second service identifier. At operation 2004, the access control server 112, retrieves an access control configuration from a second computing device. At operation 2006, the access control server 112, determines a data object based on the data object identifier, wherein the data object is associated with one or more data classification labels. At operation 2008, the access control server 112, determines a first service based on the first service identifier. At operation 2010, the access control server 112, determines a second service based on the second service identifier. At operation 2012, the access control server 112, determine that the first service is authorized to communicate with the second service based on at least the access control configuration. At operation 2014, the access control server 112, determines that the data object is authorized for transmission to the second service based on at least the one or more data classification labels. At operation 2016, the access control server 112 may be configured transmit the data object from the first service to the second service via a communication interface, wherein the communication interface is between a first service proxy of the first service and a second service proxy of the second service.

Additional Exemplary Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, application, script, code, service, or the like) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for detection of data object classification label errors, the apparatus comprising at least one processor and at least one memory including program code that with the at least one processor, cause the apparatus to:
   retrieve a labeled data object from a data object repository, wherein the labeled data object comprises a data object identifier, an origin identifier, one or more text based data elements, and a first data classification label set;
   parse the one or more text based data elements into a plurality of word based data elements;
   generate a vector data object from the plurality of word based data elements, the vector data object comprising one or more vector data elements;
   map the vector data object to a trained data classification vector data set to determine a second data classification label set for the vector data object;
   determine at least one missing data classification label defined by the second data classification label set and not defined by the first data classification label set; and
   generate a data classification label error notification based on the at least one missing data classification label, wherein the data classification label error notification comprises the data object identifier, the origin identifier, and the at least one missing data classification label.

2. The apparatus according to claim 1, wherein the at least one memory including the program code that with the at least one processor, further cause the apparatus to:
   transmit the data classification label error notification to one or more computing devices, wherein the data classification label error notification is renderable via one or more display devices associated with the one or more computing devices.

3. The apparatus according to claim 1, wherein the at least one memory including the program code that with the at least one processor, further cause the apparatus to:
   output the at least one missing data classification label to a truth interface;
   receive a truth selection indication in response to outputting the at least one missing data classification label to the truth interface; and
   determine to update a labeled data object repository to associate the at least one missing data classification label for the vector data object with the plurality of word based data elements, the data object identifier, and the origin identifier.

4. The apparatus according to claim 3, wherein the data object repository is the labeled data object repository.

5. The apparatus according to claim 4, wherein the data classification label error notification comprises a descriptive text message.

6. The apparatus according to claim 1, wherein the vector data object and the trained data classification vector data set each define a common vector data structure.

7. The apparatus according to claim 1, wherein the vector data object and the trained data classification vector data set each define one or more common vector data elements.

8. The apparatus according to claim 1, wherein the trained data classification vector data set is generated by training a support vector classifier with a labeled data object corpus.

9. The apparatus according to claim 1, wherein the trained data classification vector data set is generated by training a linear support vector classifier with a labeled data object corpus.

10. The apparatus according to claim 1, wherein the at least one memory including the program code that with the at least one processor, further cause the apparatus to:
    generate an access control configuration, wherein the access control configuration is generated based on one or more predefined access parameters comprising one or more of the data object identifier, the origin identifier, one or more data classification labels, one or more service identifiers, or one or more application programming interfaces, and wherein the access control configuration comprises one or more rules to instruct at least a service proxy to allow or restrict access to a labeled data object based on the one or more predefined access parameters.

11. A computer implemented method for detection of data object classification label errors, the method comprising:
    retrieving a labeled data object from a data object repository, wherein the labeled data object comprises a data object identifier, an origin identifier, one or more text based data elements, and a first data classification label set;
    parsing the one or more text based data elements into a plurality of word based data elements;
    generating a vector data object from the plurality of word based data elements, the vector data object comprising one or more vector data elements;
    mapping the vector data object to a trained data classification vector data set to determine a second data classification label set for the vector data object;
    determining at least one missing data classification label defined by the second data classification label set and not defined by the first data classification label set; and
    generating a data classification label error notification based on the at least one missing data classification label, wherein the data classification label error notification comprises the data object identifier, the origin identifier, and the at least one missing data classification label.

12. The computer implemented method according to claim 11, the method further comprising:
    transmitting the data classification label error notification to one or more computing devices, wherein the data classification label error notification is renderable via one or more display devices associated with the one or more computing devices.

13. The computer implemented method according to claim 11, the method further comprising:
    outputting the at least one missing data classification label to a truth interface;
    receiving a truth selection indication in response to outputting the at least one missing data classification label to the truth interface; and
    determining to update a labeled data object repository to associate the at least one missing data classification label for the vector data object with the plurality of word based data elements, the data object identifier, and the origin identifier.

14. The computer implemented method according to claim 13, wherein the data object repository is the labeled data object repository.

15. The computer implemented method according to claim 14, wherein the data classification label error notification comprises a descriptive text message.

16. The computer implemented method according to claim 11, wherein the vector data object and the trained data classification vector data set each define a common vector data structure.

17. The computer implemented method according to claim 11, wherein the vector data object and the trained data classification vector data set each define one or more common vector data elements.

18. The computer implemented method according to claim 11, wherein the trained data classification vector data set is generated by training a support vector classifier with a labeled data object corpus.

19. The computer implemented method according to claim 11, wherein the trained data classification vector data set is generated by training a linear support vector classifier with a labeled data object corpus.

20. The computer implemented method according to claim 11, the method further comprising:

generating an access control configuration, wherein the access control configuration is generated based on one or more predefined access parameters comprising one or more of the data object identifier, the origin identifier, one or more data classification labels, one or more service identifiers, or one or more application programming interfaces, and wherein the access control configuration comprises one or more rules to instruct at least a service proxy to allow or restrict access to a labeled data object based on the one or more predefined access parameters.

21. A non-transitory computer readable storage medium comprising instructions for detection of data object classification label errors, when executed by a processor, cause an apparatus comprising at least one processor and at least one memory to:

retrieve a labeled data object from a data object repository, wherein the labeled data object comprises a data object identifier, an origin identifier, one or more text based data elements, and a first data classification label set;

parse the one or more text based data elements into a plurality of word based data elements;

generate a vector data object from the plurality of word based data elements, the vector data object comprising one or more vector data elements;

map the vector data object to a trained data classification vector data set to determine a second data classification label set for the vector data object;

determine at least one missing data classification label defined by the second data classification label set and not defined by the first data classification label set; and generate a data classification label error notification based on the at least one missing data classification label, wherein the data classification label error notification comprises the data object identifier, the origin identifier, and the at least one missing data classification label.

* * * * *